US012236913B2

(12) United States Patent
Yang et al.

(10) Patent No.: US 12,236,913 B2
(45) Date of Patent: Feb. 25, 2025

(54) DRIVING METHOD FOR DISPLAY PANEL INCLUDING SUB-PIXEL ROWS DIVIDED INTO SUB-PIXEL ROW GROUPS AND DISPLAY APPARATUS INCLUDING DISPLAY PANEL

(71) Applicants: Beijing BOE Display Technology Co., Ltd., Beijing (CN); BOE Technology Group Co., Ltd., Beijing (CN)

(72) Inventors: Tao Yang, Beijing (CN); Yingmeng Miao, Beijing (CN); Dongchuan Chen, Beijing (CN); Yanping Liao, Beijing (CN); Jiantao Liu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/044,428

(22) PCT Filed: Mar. 22, 2022

(86) PCT No.: PCT/CN2022/082286

§ 371 (c)(1),
(2) Date: Mar. 8, 2023

(87) PCT Pub. No.: WO2023/178515

PCT Pub. Date: Sep. 28, 2023

(65) Prior Publication Data

US 2024/0296809 A1 Sep. 5, 2024

(51) Int. Cl.
*G09G 3/36* (2006.01)

(52) U.S. Cl.
CPC ......... *G09G 3/3677* (2013.01); *G09G 3/3688* (2013.01); *G09G 2310/0286* (2013.01); *G09G 2310/08* (2013.01); *G09G 2330/021* (2013.01)

(58) Field of Classification Search
CPC ............... G09G 3/3677; G09G 3/3688; G09G 2310/0286; G09G 2310/08; G09G 2330/021
See application file for complete search history.

(56) References Cited

U.S. PATENT DOCUMENTS

| | | | | |
|---|---|---|---|---|
| 10,878,749 B2 * | 12/2020 | Lee | ...................... | G09G 3/3266 |
| 2019/0355309 A1 * | 11/2019 | Miwa | .................... | G09G 3/3233 |
| 2020/0043420 A1 * | 2/2020 | Kang | .................... | G09G 3/3291 |
| 2020/0152128 A1 * | 5/2020 | Kim | ...................... | G09G 3/3266 |
| 2021/0150989 A1 * | 5/2021 | Shi | ....................... | G09G 3/3225 |

* cited by examiner

*Primary Examiner* — Afroza Chowdhury
(74) *Attorney, Agent, or Firm* — Workman Nydegger

(57) ABSTRACT

A driving method for a display panel and a display apparatus. The driving method includes: obtaining original display data of a current display frame; and when it is determined to adopt a first driving mode, loading first gate scanning signals (GA1_1-GA12_1) to gate lines (GA, GA1-GA12) in the display panel, and loading a data voltage to data lines (DA, DA1-DA7) in the display panel according to target display data obtained by removing a part of data from the original display data, so as to charge each sub-pixel in the display panel with the data voltage.

20 Claims, 23 Drawing Sheets

DRIVING METHOD FOR DISPLAY PANEL INCLUDING SUB-PIXEL ROWS DIVIDED INTO SUB-PIXEL ROW GROUPS AND DISPLAY APPARATUS INCLUDING DISPLAY PANEL

The present application is a National Stage of International Application No. PCT/CN2022/082286, filed on Mar. 22, 2022, which is hereby incorporated by reference in its entirety.

FIELD

The present disclosure relates to the technical field of display, in particular to a driving method for a display panel and a display apparatus.

BACKGROUND

A liquid crystal display (LCD) panel and an organic light-emitting diode (OLED) display generally include a plurality of pixel units. Each pixel unit may include: a plurality of sub-pixels in different colors. By controlling brightness corresponding to each sub-pixel, a color required to be displayed is mixed to display a color image.

SUMMARY

A driving method for a display panel provided by an embodiment of the present disclosure includes: obtaining original display data of a current display frame; and loading first gate scanning signals to gate lines in the display panel in a condition that it is determined to adopt a first driving mode, and loading a data voltage to data lines in the display panel according to target display data obtained by removing a part of data from the original display data, so as to charge each sub-pixel in the display panel with the data voltage; wherein the display panel includes a plurality of gate lines, for at least one gate line of the plurality of gate lines, an effective pulse of a first gate scanning signal loaded to the gate line is provided with a first overlapping duration with an effective pulse of a first gate scanning signal loaded to a previous gate line adjacent to the gate line, the effective pulse of the first gate scanning signal loaded to the gate line is provided with a second overlapping duration with an effective pulse of a first gate scanning signal loaded to a next gate line adjacent to the gate line, and the first overlapping duration is different from the second overlapping duration.

In some examples, for the $2k^{th}$ gate line, the first overlapping duration corresponding to a $2k^{th}$ gate line is less than the second overlapping duration corresponding to the $2k^{th}$ gate line; wherein k is an integer greater than 0.

In some examples, first overlapping durations corresponding to gate lines of $\mathbf{2}k$ numbers are the same; and/or the second overlapping durations corresponding to gate lines of $\mathbf{2}k$ numbers are the same.

In some examples, the second overlapping duration corresponding to the $2k^{th}$ gate line is an even multiple of the first overlapping duration corresponding to the $2k^{th}$ gate line.

In some examples, for the $(2m+1)^{th}$ gate line, the first overlapping duration corresponding to a $(2m+1)^{th}$ gate line is greater than the second overlapping duration; wherein m is an integer greater than 0.

In some examples, first overlapping durations corresponding to the gate lines of (2m+1) numbers the same; and/or second overlapping durations corresponding to gate lines of (2m+1) numbers the same.

In some examples, the first overlapping duration corresponding to the $(2m+1)^{th}$ gate line is an even multiple of the second overlapping duration corresponding to the $(2m+1)^{th}$ gate line.

In some examples, the display panel includes a plurality of gate lines, at least four gate lines in the plurality of gate lines are one gate line group, and starting time points of effective pulses of first gate scanning signals loaded to gate lines in each gate line group sequentially occur according to an order of a first gate line, a third gate line, a second gate line and a fourth gate line in the gate line group.

In some examples, the display panel includes a plurality of sub-pixel rows; the plurality of sub-pixel rows are divided into a plurality of sub-pixel row groups, and each of the sub-pixel row groups includes sub-pixel rows spaced by N sub-pixel rows; N is an integer greater than 0; and the target display data includes display data corresponding to sub-pixels in one sub-pixel row group.

In some examples, the plurality of sub-pixel row groups include a first sub-pixel row group and a second sub-pixel row group; the first sub-pixel row group includes the sub-pixel rows of odd numbers, and the second sub-pixel row group includes the sub-pixel rows of even numbers; the current display frame is an (odd number)$^{th}$ display frame in a plurality of consecutive display frames, and the target display data includes display data corresponding to sub-pixels in the first sub-pixel row group or the second sub-pixel row group; and/or the current display frame is an (even number)$^{th}$ of display frame in the plurality of consecutive display frames, and the target display data includes display data corresponding to sub-pixels in the first sub-pixel row group or the second sub-pixel row group.

In some examples, every two adjacent sub-pixels in the same column share one data voltage.

In some examples, the loading first gate scanning signals to gate lines in the display panel includes: inputting a plurality of different first clock signals to a gate driving circuit in the display panel to load effective pulses in the first clock signals as the effective pulses of the first gate scanning signals to the gate lines.

In some examples, the gate driving circuit includes a plurality of shifting register circuits; the shifting register circuits are provided with clock signal output terminals; and the plurality of different first clock signals are divided into three clock signal groups; and in three adjacent gate line groups, a clock signal output terminal of a shifting register circuit corresponding to a first gate line group is coupled with a first clock signal group in the three clock signal groups, a clock signal output terminal of a shifting register circuit corresponding to a second gate line group is coupled with a second clock signal group in the three clock signal groups, and a clock signal output terminal of a shifting register circuit corresponding to a third gate line group is coupled with a third clock signal group in the three clock signal groups.

In some examples, the plurality of different first clock signals include 12 first clock signals; the 12 first clock signals are divided into three clock signal groups, and in each clock signal group, an effective pulse of each of first clock signals sequentially occurs according to an order of a $1^{st}$ first clock signal, a $3^{rd}$ first clock signal, a $2^{nd}$ first clock signal and a $4^{th}$ first clock signal in the clock signal group; and a starting time point of an effective pulse of a $4^{th}$ first clock signal in the first clock signal group is earlier than a starting time point of an effective pulse of a $1^{st}$ first clock signal in the second clock signal group; and a starting time point of an effective pulse of a $4^{th}$ first clock signal in the second clock signal group is earlier than a starting time point of an effective pulse of a 1st first clock signal in the third clock signal group.

In some examples, in the same clock signal group, the 1st first clock signal and the 4th first clock signal are opposite in phase.

In some examples, clock signals occurring in the same order in the first clock signal group and the second clock signal group differ in phase by $2\pi/3$; and clock signals occurring in the same order in the second clock signal group and the third clock signal group differ in phase by $2\pi/3$.

In some examples, each shifting register circuit is further provided with a clock signal controlling terminal; and in every three adjacent gate line groups, a clock signal controlling terminal of the shifting register circuit corresponding to the first gate line group is coupled with a 1st first clock signal in the first clock signal group, the clock signal controlling terminal of the shifting register circuit corresponding to the second gate line group is coupled with the 1st first clock signal in the second clock signal group, and a clock signal controlling terminal of the shifting register circuit corresponding to the third gate line group is coupled with the 1st first clock signal in the third clock signal group.

In some examples, each shifting register circuit is further provided with a clock signal controlling terminal; and the driving method further includes: inputting a plurality of different first clock control signals into clock signal controlling terminal of the gate driving circuit while inputting a plurality of different first clock signals into the gate driving circuit in the display panel.

In some examples, in three adjacent gate line groups, a clock signal controlling terminal of the shifting register circuit corresponding to the first gate line group is coupled with a 1st first clock control signal in the plurality of different first clock control signals, a clock signal controlling terminal of the shifting register circuit corresponding to the second gate line group is coupled with a 2nd first clock control signal in the plurality of different first clock control signals, and a clock signal controlling terminal of the shifting register circuit corresponding to the third gate line group is coupled with a 3rd first clock control signal in the plurality of different first clock control signals: and the 1st first clock control signal is the same as a 1st first clock signal in the first clock signal group in timing, the 2nd first clock control signal is the same as the 1st first clock signal in the second clock signal group in timing, and the 3rd first clock control signal is the same as the 1st first clock signal in the third clock signal group in timing.

In some examples, loading second gate scanning signals to the gate lines in the display panel in a condition that it is determined to adopt a second driving mode, and loading a data voltage to the data lines directly according to the original display data to charge each sub-pixel in the display panel with the data voltage; wherein starting time points of effective pulses of the second gate scanning signals loaded to every two adjacent gate lines are provided with the same difference.

A display apparatus provided by an embodiment of the present disclosure includes: a display panel; and a controller, configured to obtain original display data of a current display frame; and load, in a condition that it is determined to adopt a first driving mode, first gate scanning signals to gate lines in the display panel, and load a data voltage to data lines in the display panel according to target display data obtained by removing a part of data from the original display data, so as to charge each sub-pixel in the display panel with the data voltage; wherein the display panel includes a plurality of gate lines, for at least one gate line of the plurality of gate lines, an effective pulse of a first gate scanning signal loaded to the gate line is provided with a first overlapping duration with an effective pulse of a first gate scanning signal loaded to a previous gate line adjacent to the gate line, the effective pulse of the first gate scanning signal loaded to the gate line is provided with a second overlapping duration with an effective pulse of a first gate scanning signal loaded to a next gate line adjacent to the gate line, and the first overlapping duration is different from the second overlapping duration.

In some examples, the controller includes: a system controller and a timing controller; the system controller is configured to obtain the original display data of the current display frame; and send, in the condition that it is determined to adopt the first driving mode, the target display data obtained by removing a part of data from the original display data to the timing controller; the timing controller is configured to send the received target display data to a source driving circuit; and the source driving circuit is configured to load the data voltage to the data lines in the display panel according to the received target display data.

In some examples, the controller includes: a system controller and a timing controller; the system controller is configured to obtain the original display data of the current display frame; and send the original display data to the timing controller; the timing controller is configured to send, in the condition that it is determined to adopt the first driving mode, the target display data obtained by removing a part of data from the original display data to a source driving circuit; and the source driving circuit is configured to load the data voltage to the data lines in the display panel according to the received target display data.

In some examples, the controller includes: a system controller and a timing controller; the system controller is configured to obtain the original display data of the current display frame; and send the original display data to the timing controller; the timing controller is configured to send the received original display data to a source driving circuit; and the source driving circuit is configured to load, in the condition that it is determined to adopt the first driving mode, the data voltage to the data lines in the display panel according to the target display data obtained by removing a part of data from the original display data.

In some examples, the display panel further includes: a gate driving circuit receiving a plurality of different first clock signals; the plurality of different first clock signals are divided into three clock signal groups; the gate driving circuit includes a plurality of shifting register circuits; wherein one shifting register circuit is coupled with a plurality of adjacent gate lines; and in every three adjacent shifting register circuits, a clock signal output terminal of a first shifting register circuit is coupled with a first clock signal group in the three clock signal groups, a clock signal output terminal of a second shifting register circuit is coupled with a second clock signal group in the three clock signal groups, and a clock signal output terminal of a third shifting register circuit is coupled with a third clock signal group in the three clock signal groups.

In some examples, in every three adjacent shifting register circuits, a clock signal controlling terminal of the first shifting register circuit is coupled with a 1st first clock signal in the first clock signal group, a clock signal controlling terminal of the second shifting register circuit is coupled with a 1st first clock signal in the second clock signal group, and a clock signal controlling terminal of the third shifting register circuit is coupled with a $1^{st}$ first clock signal in the third clock signal group.

In some examples, in every three adjacent shifting register circuits, a clock signal controlling terminal of the first shifting register circuit is coupled with a $1^{st}$ first clock control signal in a plurality of different clock control signals, a clock signal controlling terminal of the second shifting register circuit is coupled with a $2^{nd}$ first clock control signal in the plurality of different clock control signals, and a clock signal controlling terminal of the third shifting register circuit is coupled with a $3^{rd}$ first clock control signal in the plurality of different clock control signals.

In some examples, each shifting register circuit includes: a pull-up circuit, connected to an input signal terminal, a master pull-up node and a pull-down node of the shifting register circuit, wherein the pull-up circuit is configured to provide a signal of the input signal terminal to the master pull-up node and pull-down, under the control of a potential of the pull-down node, a potential of the master pull-up node; a control circuit, connected to the master pull-up node and the pull-down node, wherein the control circuit is configured to control the potential of the pull-down node according to the potential of the master pull-up node; a cascade circuit, connected to the master pull-up node, the pull-down node and the clock signal controlling terminal of the shifting register circuit, wherein the cascade circuit is configured to provide a signal of the clock signal controlling terminal to the master pull-up node under a control of the potential of the master pull-up node and pull-down the potential of the master pull-up node under the control of the potential of the pull-down node; and N output circuits, connected to the input signal terminal, the pull-down node, N clock signal output terminals, N sub-pull-up nodes and N output signal terminals of the shifting register circuit respectively, wherein an $n^{th}$ output circuit is connected to the input signal terminal, the pull-down node, an $n^{th}$ output signal terminal and an $n^{th}$ sub-pull-up node and is configured to input a signal of the input signal terminal to the $n^{th}$ sub-pull-up node. provide a signal of the $n^{th}$ clock signal output terminal to the $n^{th}$ output signal terminal under a control of a potential of the $n^{th}$ sub-pull-up node and pull-down a potential of the $n^{th}$ output signal terminal under the control of the potential of the pull-down node, wherein N is an integer greater than 1, n is an integer, and $1 \leq n \leq N$.

In some examples, the display panel further includes: a gate driving circuit receiving a plurality of different first clock signals; the plurality of different first clock signals are divided into three clock signal groups; the gate driving circuit includes a plurality of shifting register circuits; wherein one shifting register circuit is coupled with one gate line; a plurality of adjacent shifting register circuits are one circuit group; and in every three adjacent circuit groups, clock signal output terminals of shifting register circuits of a first circuit group are coupled with a first clock signal group in the three clock signal groups, clock signal output terminals of shifting register circuits of a second circuit group are coupled with a second clock signal group in the three clock signal groups, and clock signal output terminals of shifting register circuits of a third circuit group are coupled with a third clock signal group in the three clock signal groups.

In some examples, each shifting register circuit includes: a pull-up circuit, connected to an input signal terminal, a master pull-up node and a pull-down node of the shifting register circuit, wherein the pull-up circuit is configured to provide a signal of the input signal terminal to the master pull-up node and pull-down, under a control of a potential of the pull-down node, a potential of the master pull-up node; a control circuit, connected to the master pull-up node and the pull-down node, wherein the control circuit is configured to control the potential of the pull-down node according to the potential of the master pull-up node; a cascade circuit, connected to the master pull-up node, the pull-down node and the clock signal controlling terminal of the shifting register circuit, wherein the cascade circuit is configured to provide a signal of the clock signal controlling terminal to the master pull-up node under the control of the potential of the master pull-up node and pull-down the potential of the master pull-up node under the control of the potential of the pull-down node; and an output circuit, connected to the input signal terminal, the pull-down node, a clock signal output terminals, a sub-pull-up node and an output signal terminal of the shifting register circuit, wherein the output circuit is configured to input a signal of the input signal terminal to the sub-pull-up node, provide a signal of the clock signal output terminal to the output signal terminal under the control of a potential of the sub-pull-up node and pull-down a potential of the output signal terminal under the control of a potential of the pull-down node.

In some examples, the display panel includes: a plurality of sub-pixels, wherein the plurality of sub-pixels are divided into a plurality of sub-pixel groups, and each sub-pixel group includes two adjacent sub-pixels in the same row; a plurality of gate lines, wherein each sub-pixel row corresponds to two gate lines, and in each sub-pixel group, one sub-pixel is coupled with one of the two corresponding gate lines, and the other sub-pixel is coupled with the other one of the two corresponding gate lines; and a plurality of data lines, wherein a column of sub-pixel groups is disposed between every two adjacent data lines, and for the two adjacent data lines, the first data line is coupled with a column of sub-pixels, close to the second data line, in the column of sub-pixel groups between the two data lines, and the second data line is coupled with a column of sub-pixels, close to the first data line, in the column of sub-pixel groups between the two data lines.

DETAILED DESCRIPTION OF THE EMBODIMENTS

Figure 1:
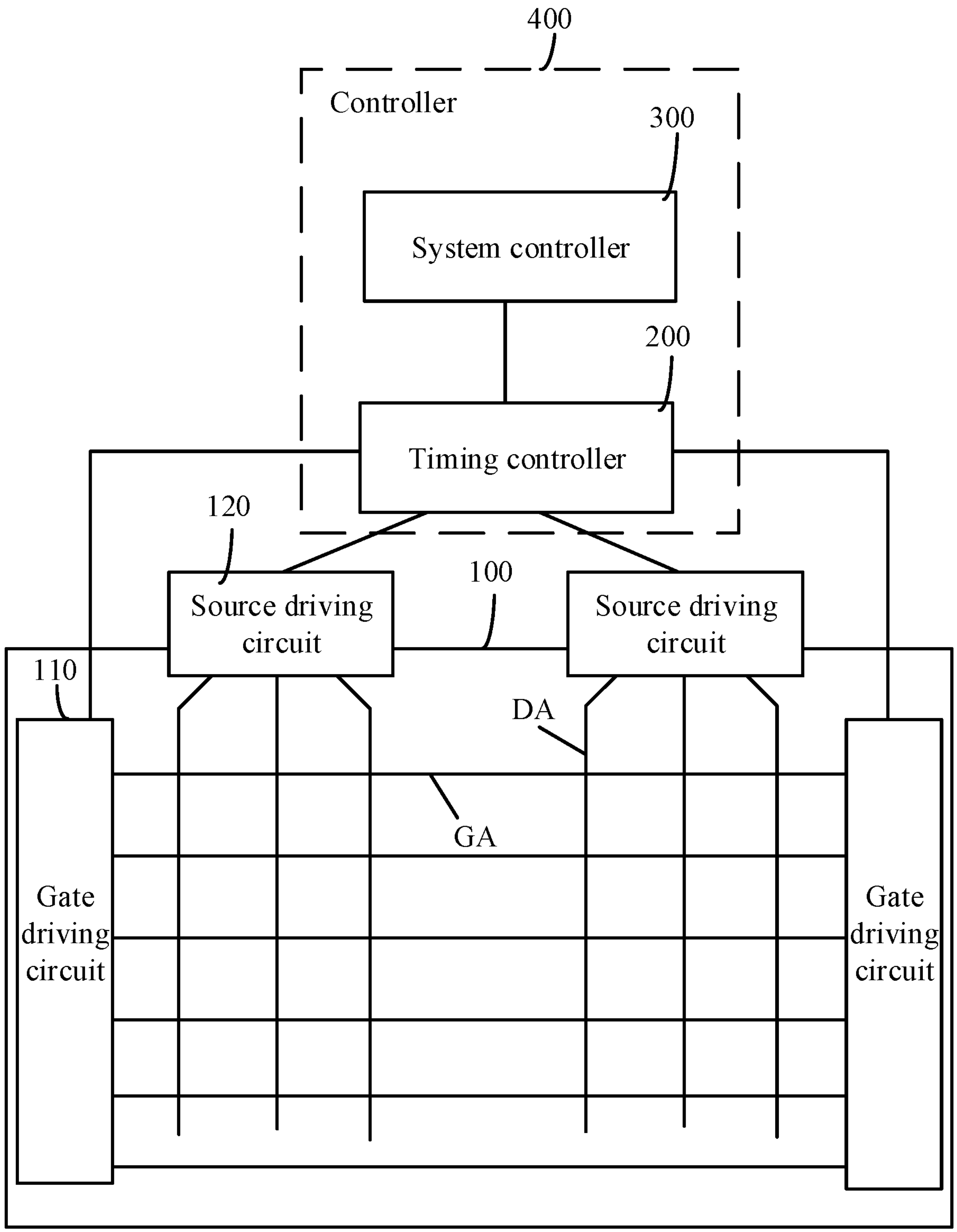
FIG. 1 is a schematic diagram of some structures of a display apparatus in an embodiment of the present disclosure.

To make the objectives, technical solutions and advantages of embodiments of the present disclosure clearer, the technical solutions of the embodiments of the present disclosure will be clearly and completely described below in conjunction with the accompanying drawings of the embodiments of the present disclosure. Apparently, the described embodiments are only a part of the embodiments of the present disclosure, not all of the embodiments. The embodiments in the present disclosure and features in the embodiments can be combined with each other in the case of not conflicting. Based on the described embodiments of the present disclosure, all other embodiments obtained by those of ordinary skill in the art without creative work shall fall within the protection scope of the present disclosure.

Unless otherwise defined, technical or scientific terms used in the present disclosure shall have the ordinary meanings understood by those ordinarily skilled in the art to which the present disclosure pertains. The words “first”, “second” and the like used in the present disclosure do not indicate any order, quantity or importance, but are only used to distinguish different components. The words “comprise” or “include” or the like indicate that an element or item appearing before such words covers listed elements or items appearing after the words and equivalents thereof, and do not exclude other elements or items. The words “coupling” or “connecting” or the like are not limited to physical or mechanical coupling, but may include electrical coupling, whether direct or indirect.

It should be noted that the sizes and shapes of all figures in the accompanying drawings do not reflect true scales, and are only intended to schematically illustrate the content of the present disclosure. The same or similar reference numerals represent the same or similar elements or elements with the same or similar functions throughout.

Figure 2:
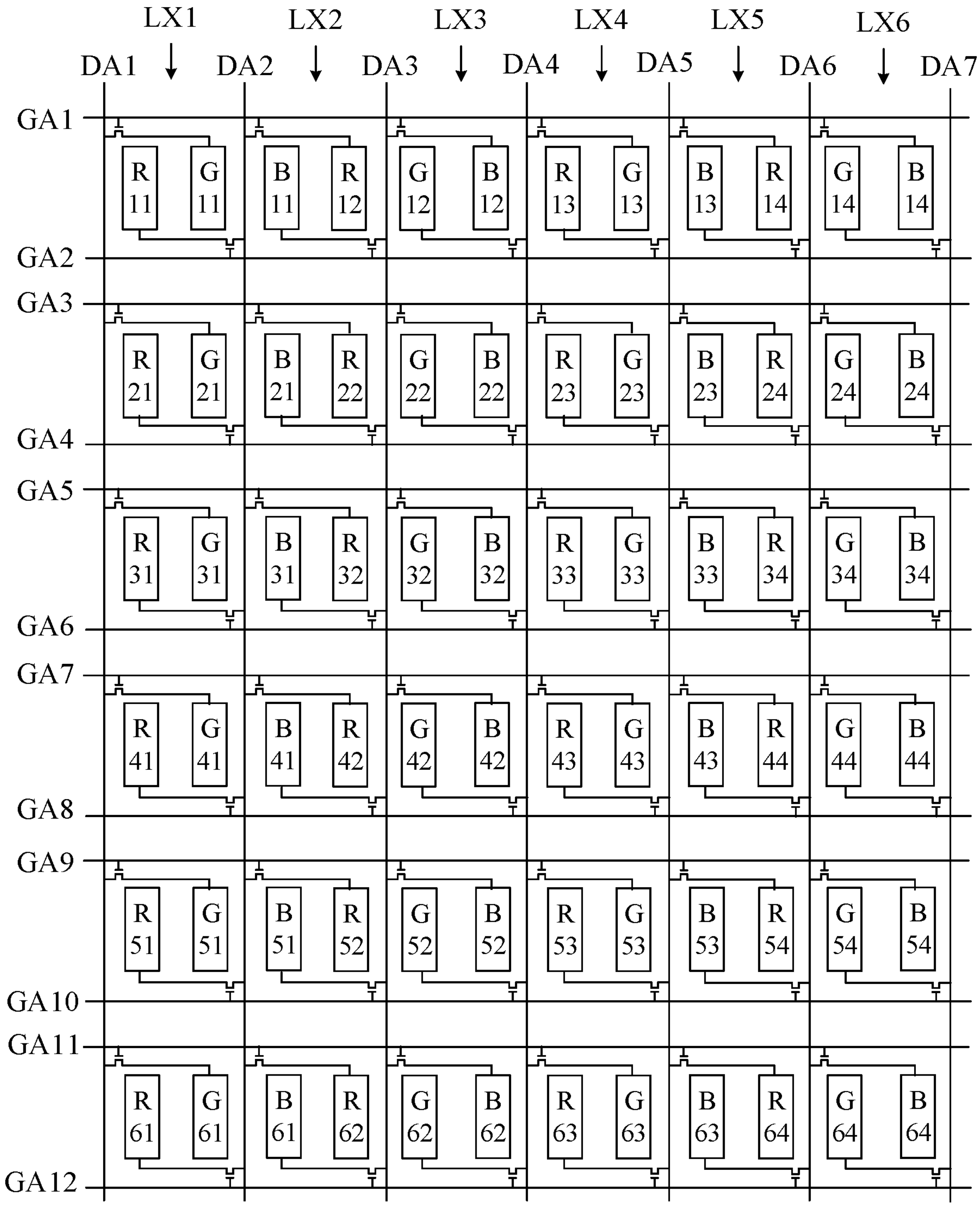
FIG. 2 is a schematic diagram of some structures of a display panel in an embodiment of the present disclosure.

In some embodiments of the present disclosure, referring to FIG. 1 and FIG. 2, a display apparatus may include a display panel 100 and a controller 400. The display panel 100 may include a plurality of pixel units distributed in an array. Exemplarily, each pixel unit includes sub-pixels with various different colors. Each sub-pixel may include a transistor and a pixel electrode. For example, the pixel units may include red sub-pixels, green sub-pixels and blue sub-pixels. and therefore red, green and blue may be mixed to achieve color display. Alternatively, the pixel units may also include red sub-pixels, green sub-pixels, blue sub-pixels and white sub-pixels, and therefore red, green, blue and white may be mixed to achieve color display. Of course, in practical applications, a light emitting color of the sub-pixels in the pixel units may be designed and determined according to practical application environments, which is not limited here. In the following, illustration is made by taking an example that the pixel units include red sub-pixels, green sub-pixels and blue sub-pixels.

In some embodiments of the present disclosure, as shown in FIG. 1 and FIG. 2, there are a plurality of gate lines GA (e.g. GA1-GA12), a plurality of data lines DA (e.g. DA1, DA2, DA3, DA4, DA5, DA6 and DA7), a gate driving circuit 110 and a source driving circuit 120. The gate driving circuit 110 is coupled with each of the gate lines GA (e.g. GA1, GA2, GA3, GA4, GA5, GA6, GA7, GA8, GA9, GA10, GA11 and GA12), and the source driving circuit 120 may be coupled with each of the data lines DA (e.g. DA1, DA2, DA3, DA4, DA5, DA6 and DA7). The controller 400 may input a control signal to the gate driving circuit 110, so that the gate driving circuit 110 inputs a signal to the gate lines GA (e.g. GA1, GA2, GA3, GA4, GA5, GA6, GA7, GA8, GA9, GA10, GA11 and GA12) so as to drive the gate lines GA (e.g. GA1, GA2, GA3, GA4, GA5, GA6, GA7, GA8, GA9, GA10, GA11 and GA12). The controller 400 may obtain original display data of a picture to be displayed from a current display frame and send display data required to be displayed to the source driving circuit 120, so that the source driving circuit 120 may load a data voltage to the data lines DA (e.g. DA1, DA2, DA3, DA4, DA5, DA6 and DA7) in the display panel according to the display data, so as to charge the sub-pixels, and thus the sub-pixels are charged with the corresponding data voltage to achieve a picture display function.

In some embodiments of the present disclosure, a plurality of source driving circuits 120 may be disposed, and the different source driving circuits are coupled with the different data lines. For example, as shown in FIG. 1, two source driving circuits 120 may be disposed, one of the source driving circuits 120 is coupled with a half number of the data lines, and the other source driving circuit 120 is coupled with the other half number of the data lines. Of course, three, four or more source driving circuits 120 may also be disposed, which may be designed and determined according to the requirements of practical applications, and is not limited here. In addition, it should be noted that, the gate driving circuits may be disposed on two sides of the display panel as shown in FIG. 1, the gate driving circuits on the two sides of the display panel may jointly drive the one same gate line, the gate driving circuit may also be disposed only on one side of the display panel, or, the gate driving circuits on the two sides of the display panel may also drive the gate lines corresponding to different rows of sub-pixels respectively. In the embodiment of the present disclosure, the quantity of the gate driving circuit disposed in the display panel is not further limited here, and may be determined according to the requirements of practical applications.

In some embodiments of the present disclosure, each pixel unit includes a plurality of sub-pixels. For example, the pixel units may include red sub-pixels, green sub-pixels and blue sub-pixels, and therefore red, green and blue may be mixed to achieve color display. Alternatively. the pixel units may also include red sub-pixels, green sub-pixels, blue sub-pixels and white sub-pixels, and therefore red, green, blue and white may be mixed to achieve color display. Of course, in practical applications, a light emitting color of the sub-pixels in the pixel units may be designed and determined according to practical application environments, which is not limited here.

In some embodiments of the present disclosure, as shown in FIG. 2, each sub-pixel row may correspond to two gate lines, so that the pixels in the present disclosure may be distributed as a double-gate structure to reduce a half of the data lines (that is, the data lines between two adjacent columns of pixels are contained, and some of two adjacent rows of pixels have no data line therebetween). For example, the first sub-pixel row corresponds to the gate lines GA1 and GA2, the second sub-pixel row corresponds to the gate lines GA3 and GA4, the third sub-pixel row corresponds to the gate lines GA5 and GA6, the fourth sub-pixel row corresponds to the gate lines GA7 and GA8, the fifth sub-pixel row corresponds to the gate lines GA9 and GA10, and the sixth sub-pixel row corresponds to the gate lines GA11 and GA12.

In some embodiments of the present disclosure, the plurality of sub-pixels in the display panel may be divided into a plurality of sub-pixel groups, and each sub-pixel group may include two adjacent sub-pixels in the same row. In addition, in each sub-pixel group, one sub-pixel is coupled with one of the two corresponding gate lines, and the other sub-pixel is coupled with the other one of the two corresponding gate lines. Exemplarily, as shown in FIG. 2, in the first sub-pixel row, a red sub-pixel R11 and a green sub-pixel G11 may be one sub-pixel group, the red sub-pixel R11 is coupled with the gate line GA2, and the green sub-pixel G11 is coupled with the gate line GA1, A blue sub-pixel B11 and a red sub-pixel R12 may be one sub-pixel group, the blue sub-pixel B11 is coupled with the gate line GA2, and the red sub-pixel R12 is coupled with the gate line GA1, A green sub-pixel G12 and a blue sub-pixel B12 may be one sub-pixel group. the green sub-pixel G12 is coupled with the gate line GA2, and the blue sub-pixel B12 is coupled with the gate line GA1, A red sub-pixel R13 and a green sub-pixel G13 may be one sub-pixel group, the red sub-pixel R13 is coupled with the gate line GA2, and the green sub-pixel G13 is coupled with the gate line GA1, A blue sub-pixel B13 and a red sub-pixel R14 may be one sub-pixel group, the blue sub-pixel B13 is coupled with the gate line GA2, and the red sub-pixel R14 is coupled with the gate line GA1, A green sub-pixel G14 and a blue sub-pixel B14 may be one sub-pixel group, the green sub-pixel G14 is coupled with the gate line GA2, and the blue sub-pixel B14 is coupled with the gate line GA1.

In addition, in the second sub-pixel row, a red sub-pixel R21 and a green sub-pixel G21 may be one sub-pixel group, the red sub-pixel R21 is coupled with the gate line GA4, and the green sub-pixel G21 is coupled with the gate line GA3. A blue sub-pixel B21 and a red sub-pixel R22 may be one sub-pixel group, the blue sub-pixel B21 is coupled with the gate line GA4, and the red sub-pixel R22 is coupled with the gate line GA3. A green sub-pixel G22 and a blue sub-pixel B22 may be one sub-pixel group, the green sub-pixel G22 is coupled with the gate line GA4, and the blue sub-pixel B22 is coupled with the gate line GA3. A red sub-pixel R23 and a green sub-pixel G23 may be one sub-pixel group, the red sub-pixel R23 is coupled with the gate line GA4, and the green sub-pixel G23 is coupled with the gate line GA3. A blue sub-pixel B23 and a red sub-pixel R24 may be one sub-pixel group, the blue sub-pixel B23 is coupled with the gate line GA4, and the red sub-pixel R24 is coupled with the gate line GA3. A green sub-pixel G24 and a blue sub-pixel B24 may be one sub-pixel group, the green sub-pixel G24 is coupled with the gate line GA4, and the blue sub-pixel B24 is coupled with the gate line GA3. The remaining sub-pixel rows are divided into the sub-pixel groups in a similar way, which is not repeated here.

In some embodiments of the present disclosure, a column of sub-pixel groups may be disposed between every two adjacent data lines, and for the two adjacent data lines, the first data line is coupled with a column of sub-pixels, close to the second data line, in the column of sub-pixel groups between the two data lines, alternatively, the sub-pixels adjacent to the first data line are coupled with the second data line; and the second data line is coupled with a column of sub-pixels, close to the first data line, in the column of sub-pixel groups between the two data lines, alternatively, the sub-pixels adjacent to the second data line are coupled with the first data line. In other words, two adjacent columns of sub-pixels are disposed between two adjacent data lines. In this way, the power consumption of the source driving circuit may be lowered. Exemplarily, as shown in FIG. 2, a first column of sub-pixel groups LX1 may be disposed between the data lines DA1 and DA2, a second column of sub-pixel groups LX2 may be disposed between the data lines DA2 and DA3, a third column of sub-pixel groups LX3 may be disposed between the data lines DA3 and DA4, a fourth column of sub-pixel groups LX4 may be disposed between the data lines DA4 and DA5, a fifth column of sub-pixel groups LX5 may be disposed between the data lines DA5 and DA6, and a sixth column of sub-pixel groups LX6 may be disposed between the data lines DA6 and DA7.

In some embodiments of the present disclosure, for the first column of sub-pixel groups LX1: the data line DA1 is coupled with the column of sub-pixels (i.e. green sub-pixels G11-G61) close to the data line DA2 in the first column of sub-pixel groups LX1. The data line DA2 is coupled with the column of sub-pixels (i.e. red sub-pixels R11-R61) close to the data line DA1 in the first column of sub-pixel groups LX1.

In some embodiments of the present disclosure, for the second column of sub-pixel groups LX2: the data line DA2 is coupled with the column of sub-pixels (i.e. red sub-pixels R12-R62) close to the data line DA3 in the second column of sub-pixel groups LX2. The data line DA3 is coupled with the column of sub-pixels (i.e. blue sub-pixels B11-B61) close to the data line DA2 in the second column of sub-pixel groups LX2.

The remaining sub-pixel groups are coupled with the data lines in a similar way, which is not repeated here.

It should be noted that the display panel in the embodiment of the present disclosure may be a liquid crystal display panel. Exemplarily, the liquid crystal display panel generally includes an upper substrate and a lower substrate which are aligned as well as liquid crystal molecules packaged between the upper substrate and the lower substrate. When a picture is displayed, since a voltage difference is between a data voltage loaded to a pixel electrode of each sub-pixel and a common electrode voltage on a common electrode, and the voltage difference may form an electric field, the liquid crystal molecules deflect under the action of the electric field. Since the liquid crystal molecules have different deflection degrees due to electric fields of different intensities, the sub-pixels have different transmittance, so that the sub-pixels achieve brightness at different gray scales, thereby achieving picture display. Of course, the display panel in the embodiment of the present disclosure may be an OLED display panel, which is not limited here.

The gray scale is that brightness change between the darkest and the brightest is divided into a plurality of parts to facilitate screen brightness control. For example, displayed images are composed of red, green and blue, each color may present different brightness levels, and red, green and blue of different brightness levels may be combined to form different colors. For example, the gray scale bits of the liquid crystal display panel is 6 bits, the three colors, red, green and blue, each have 64 (i.e. $2^6$) gray scales, and values of these 64 gray scales are 0-63 respectively. The gray scale bits of the liquid crystal display panel is 8 bits, the three colors, red, green and blue, each have 256 (i.e. $2^8$) gray scales, and values of these 256 gray scales are 0-255 respectively. The gray scale bits of the liquid crystal display panel is 10 bits, the three colors, red, green and blue, each have 1024 (i.e. $2^{10}$) gray scales, and values of these 1024 gray scales are 0-1023 respectively. The gray scale bits of the liquid crystal display panel is 12 bits, the three colors, red. green and blue, each have 4096 (i.e. $2^{12}$) gray scales, and values of these 4096 gray scales are 0-4095 respectively.

Taking one sub-pixel as an example, Vcom represents the voltage on the common electrode. When the data voltage input to the pixel electrode of the sub-pixel is greater than the voltage Vcom on the common electrode, the liquid crystal molecules at the sub-pixel may have a positive polarity, and the polarity corresponding to the data voltage in the sub-pixel is the positive polarity. When the data voltage input to the pixel electrode of the sub-pixel is less than the voltage Vcom on the common electrode, the liquid crystal molecules at the sub-pixel may have a negative polarity, and the polarity corresponding to the data voltage in the sub-pixel is the negative polarity. For example, the voltage on the common electrode may be 8.3 V, and if a data voltage of 8.8 V to 16 V is input to the pixel electrode of the sub-pixel SPX, the liquid crystal molecules at the sub-pixel SPX may have a positive polarity, and the data voltage of 8.8 V to 16 V is the data voltage corresponding to the positive polarity. If a data voltage of 0.6 V to 7.8 V is input to the pixel electrode of the sub-pixel SPX, the liquid crystal molecules at the sub-pixel SPX may have a negative polarity, and the data voltage of 0.6 V to 7.8 V is the data voltage corresponding to the negative polarity. Exemplarily, taking the 0-255 gray scale of 8 bits as an example, if the data voltage of 16 V is input to the pixel electrode of the sub-pixel SPX, the sub-pixel SPX may adopt the data voltage of the positive polarity to achieve the brightness with the maximum gray scale value (i.e. the gray scale value of 255). If the data voltage of 0.6 V is input to the pixel electrode of the sub-pixel SPX, the sub-pixel SPX may adopt the data voltage of the negative polarity to achieve the brightness with the maximum gray scale value (i.e. the gray scale value of 255). It should be noted that, the data voltage with the gray scale value 0 and the voltage on the common electrode may have a voltage difference, for example, the voltage on the common electrode is 8.3 V, the data voltage of the positive polarity corresponding to the gray scale value 0 may be 8.8 V. and the data voltage of the negative polarity corresponding to the gray scale value 0 may be 7.8 V. In this way, by controlling the polarity corresponding to the sub-pixels, the display panel may achieve a frame inversion manner, a column inversion manner, a row inversion manner, a point inversion manner and the like.

Of course, the data voltage with the gray scale value 0 and the voltage on the common electrode may also be the same. In practical applications, it may be determined according to requirements of practical applications, which is not limited here.

Figure 3:
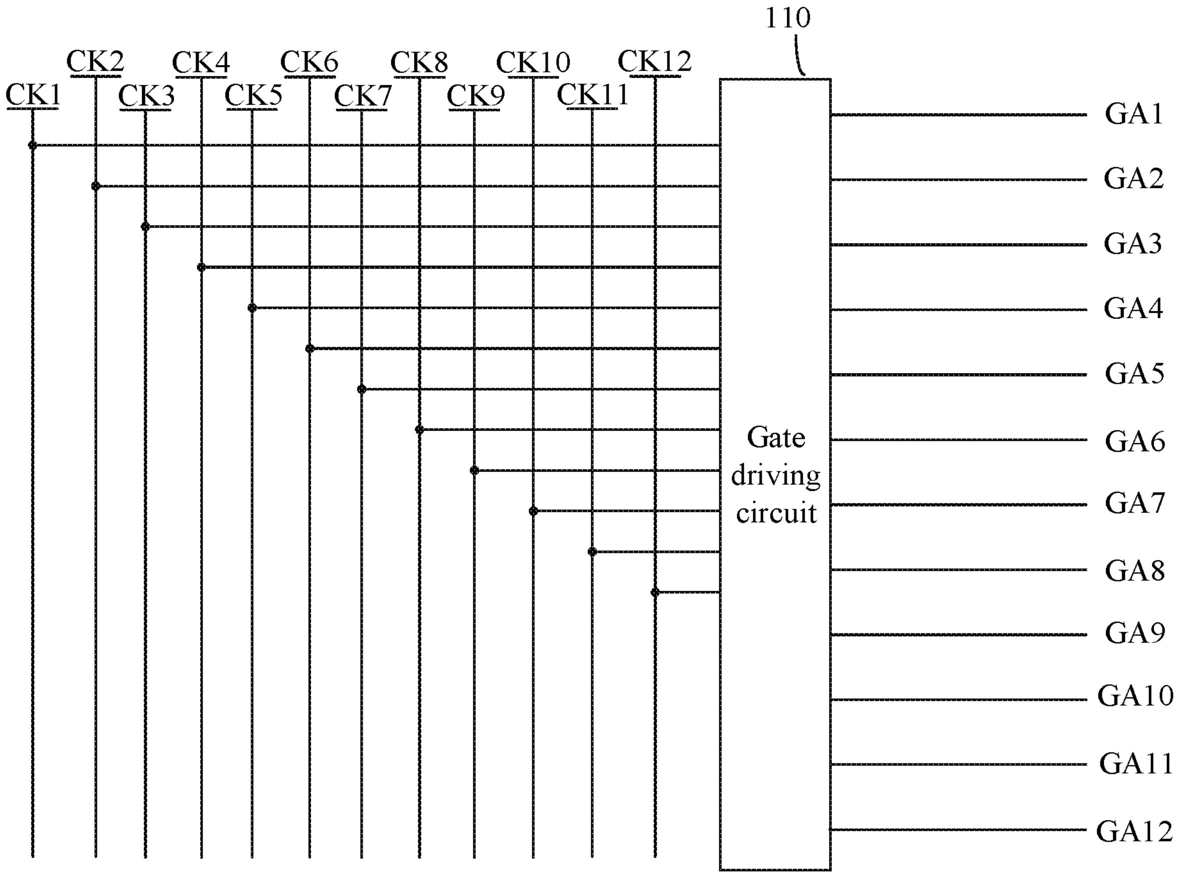
FIG. 3 is a schematic diagram of some structures of a gate driving circuit in an embodiment of the present disclosure.

In some embodiments of the present disclosure, the display panel may further include a plurality of clock signal lines, and the plurality of clock signal lines are coupled with the gate driving circuit. In this way, a corresponding clock signal may be input to the gate driving circuit through the clock signal lines so as to load a signal to the gate lines. Exemplarily, as shown in FIG. 3, the display panel may further include 12 clock signal lines CK1-CK12, and the 12 clock signal lines CK1-CK12 are coupled with the gate driving circuit 120. Exemplarily, if the display panel adopts the design of a single gate driving circuit, the gate driving circuit may be coupled with the 12 clock signal lines CK1-CK12. If the display panel adopts the design of double gate driving circuits, each gate driving circuit may be coupled with the 12 clock signal lines CK1-CK12. It should be noted that FIG. 3 only makes illustration by taking an example of the 12 clock signal lines, and in practical applications, the specific quantity of the clock signal lines may be determined according to the requirements of the practical applications, which is not limited here. for example, the clock signal lines may have other quantities which is an integral multiple of 2, such as, 2, 4, 6, 8 and 10 clock signal lines and so on.

In some embodiments of the present disclosure, the original display data of the current display frame may be obtained, and when it is determined to adopt a second driving mode, second gate scanning signals may be loaded to the gate lines in the display panel, and a data voltage is loaded to the data lines directly according to the original display data to charge each sub-pixel in the display panel with the data voltage. Starting time points of effective pulses of the second gate scanning signals loaded to every two adjacent gate lines have the same difference. Exemplarily. the controller 400 may input a plurality of different second clock signals to the gate driving circuit in the display panel through the clock signal lines so as to load effective pulses in the second clock signals as effective pulses of the second gate scanning signals to the gate lines, so that the gate lines in the display panel may be driven row by row so as to turn on the transistors in the sub-pixels row by row. The controller 400 may obtain the original display data of the picture to be displayed in the current display frame (the original display data includes digital signal forms of the data voltages, with the corresponding gray scale values, corresponding to the sub-pixels one to one. In this way, the gray scale value corresponding to each sub-pixel may be determined according to the display data of the sub-pixel. In this way, a target data voltage corresponding to each sub-pixel may be obtained according to the determined gray scale value.) and send the original display data to the source driving circuit 120, so that the source driving circuit 120 loads the data voltage to the data lines in the display panel according to the received original display data, and thus the sub-pixels are charged, and are charged with the corresponding target data voltages to achieve the picture display function.

In some embodiments of the present disclosure, the controller 400 may include a timing controller 200 and a system controller 300. The system controller 300 may obtain the original display data of the picture to be displayed in the current display frame (the original display data includes the digital signal forms of the data voltages, which are provided with the gray scale values corresponding to the data voltages, corresponding to the sub-pixels one to one), and send. when it is determined to adopt the second driving mode, the original display data (that is, the original display data includes the digital signal forms of the data voltages, which are provided with the gray scale values corresponding to the data voltages, corresponding to the sub-pixels one to one) to the timing controller 200. The timing controller 200 may input the plurality of different second clock signals to the gate driving circuit in the display panel through the clock signal lines so as to load the effective pulses in the second clock signals as the effective pulses of the second gate scanning signals to the gate lines, so that the gate lines in the display panel may be driven row by row so as to turn on the transistors in the sub-pixels row by row. The timing controller 200 sends the original display data to the source driving circuit 120, so that the source driving circuit 120 loads the data voltage to the data lines in the display panel according to the received original display data, and thus the sub-pixels are charged, and are charged with the corresponding target data voltages to achieve the picture display function.

Figure 4:
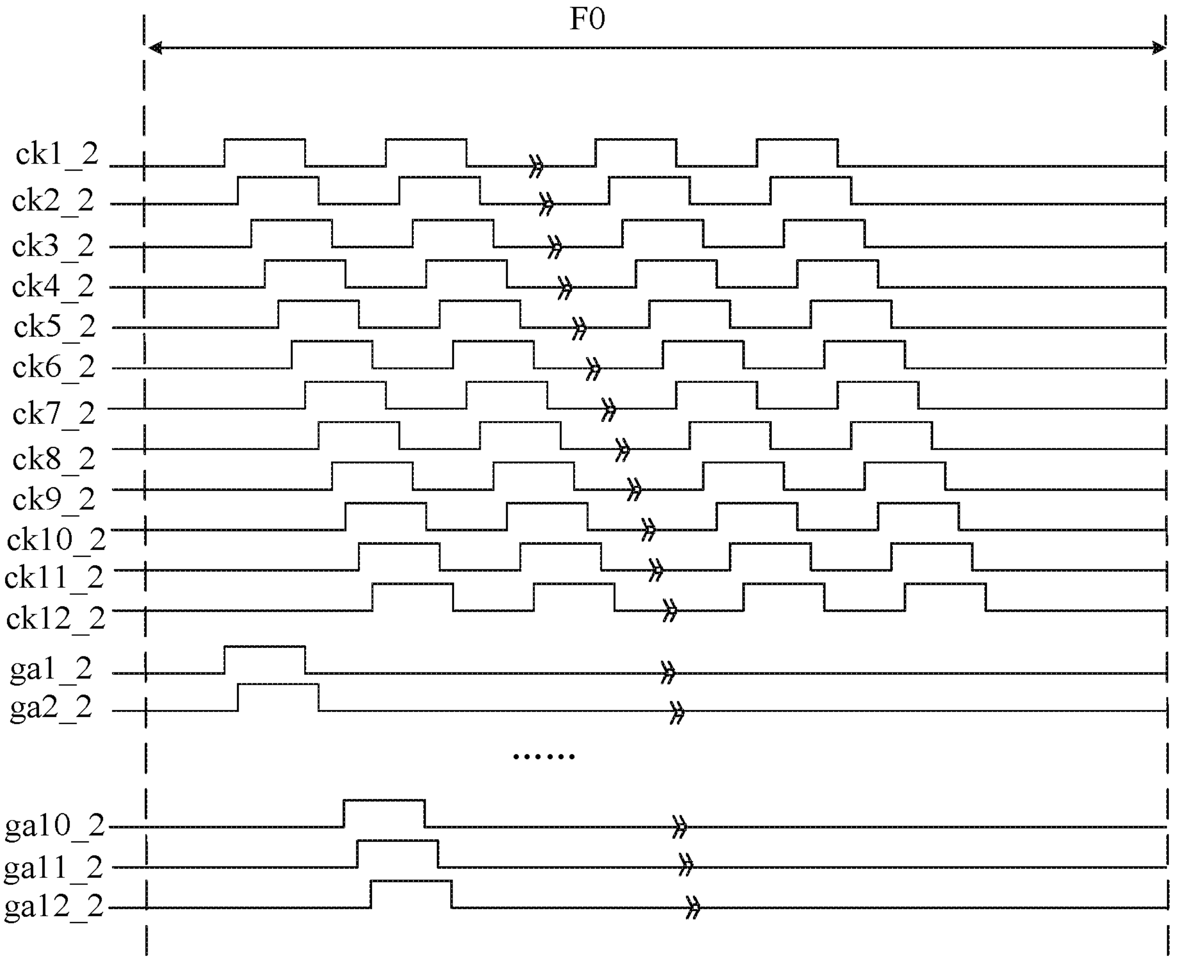
FIG. 4 is a diagram of some signal timings in an embodiment of the present disclosure.
Figure 5:
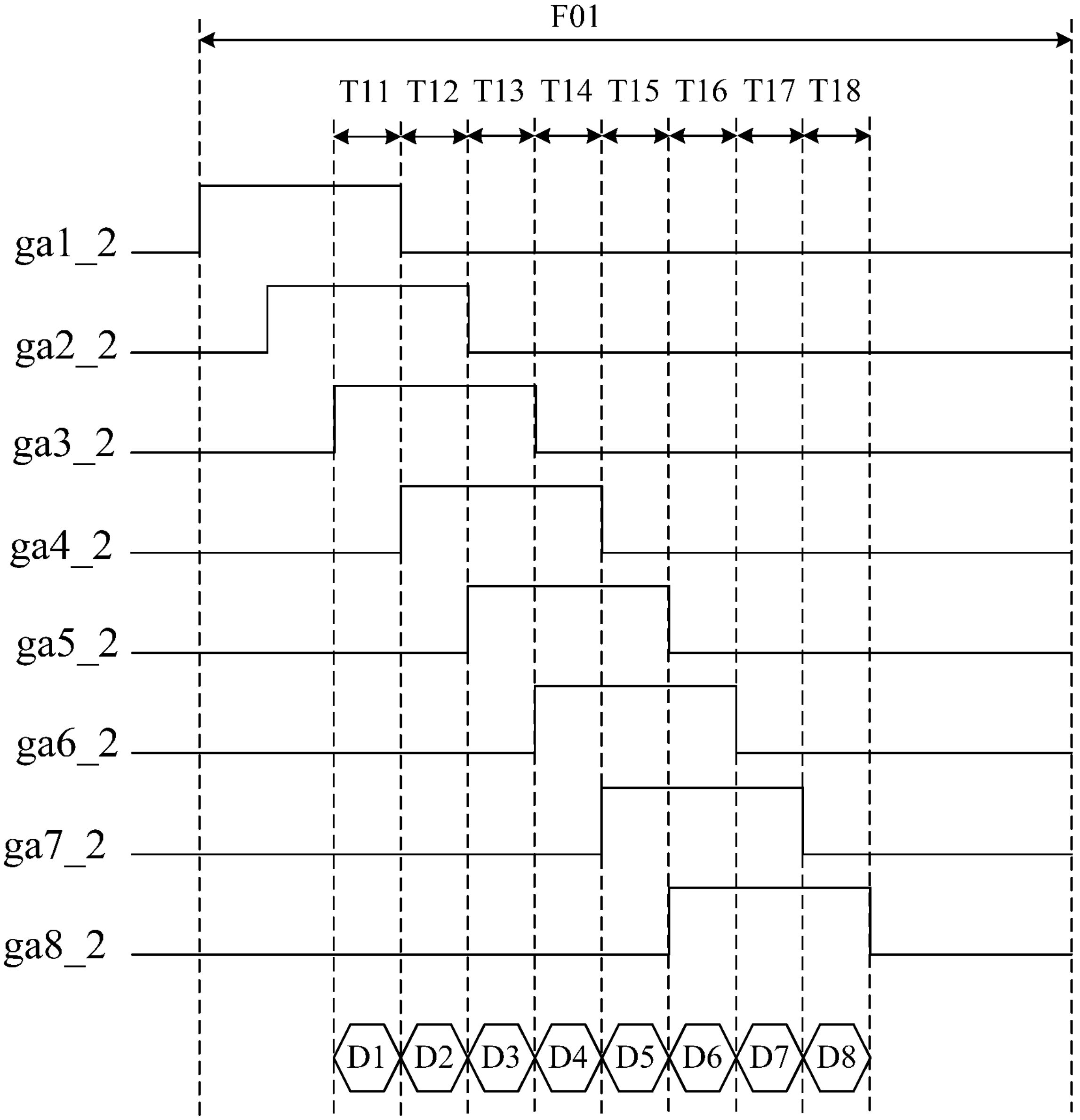
FIG. 5 is a diagram of some other signal timings in an embodiment of the present disclosure.
Figure 6:
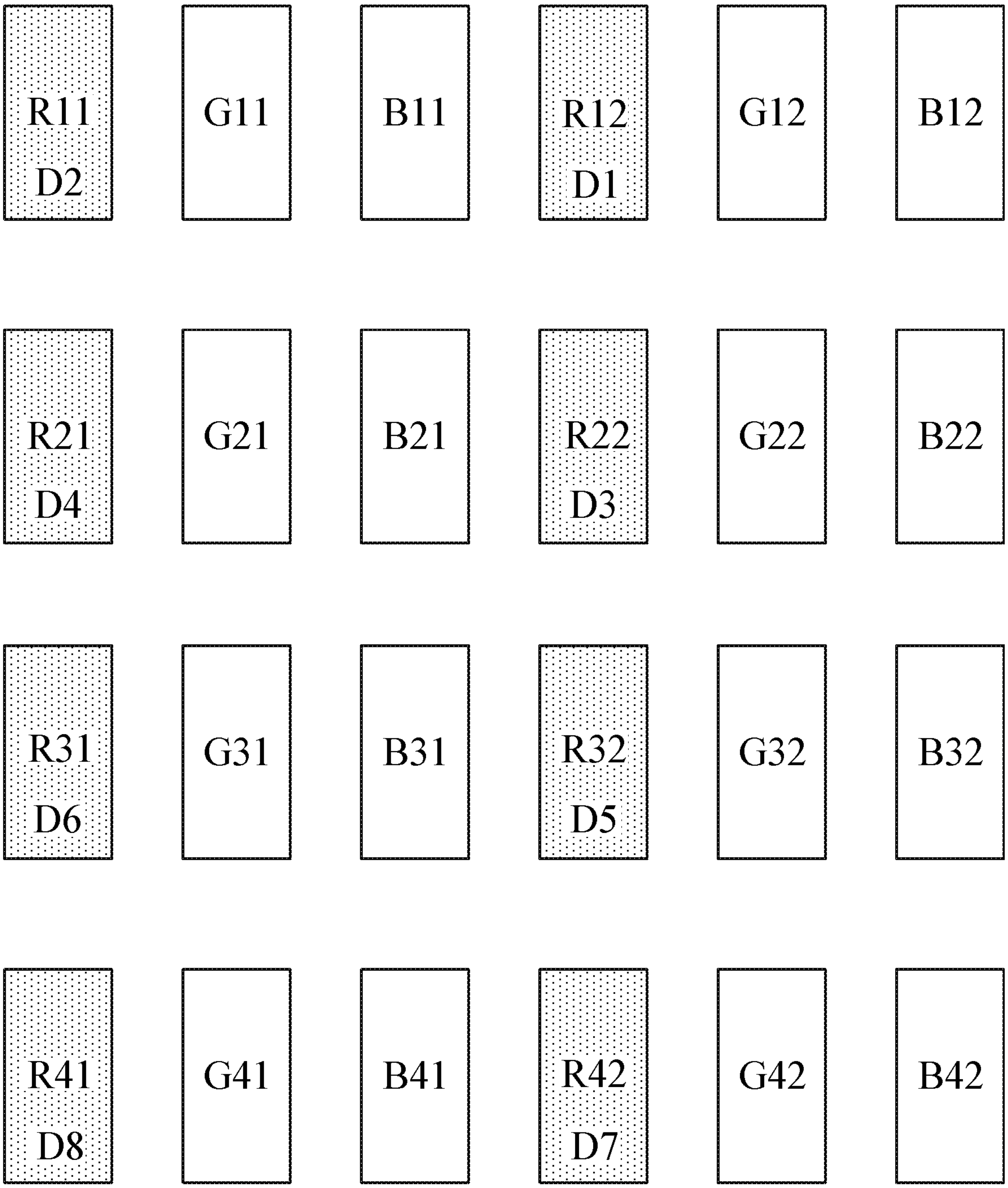
FIG. 6 is a schematic diagram of some structures of sub-pixels in a display panel in an embodiment of the present disclosure.

In some embodiments of the present disclosure, in the second driving mode, a signal sequence diagram corresponding to the gate driving circuit shown in FIG. 3 is as shown in FIG. 4. ck1_2 represents a second clock signal input to the clock signal line CK1, ck2_2 represents a second clock signal input to the clock signal line CK2, ck3_2 represents a second clock signal input to the clock signal line CK3, ck4_2 represents a second clock signal input to the clock signal line CK4, ck5_2 represents a second clock signal input to the clock signal line CK5, ck6_2 represents a second clock signal input to the clock signal line CK6, ck7_2 represents a second clock signal input to the clock signal line CK7, ck8_2 represents a second clock signal input to the clock signal line CK8, ck9_2 represents a second clock signal input to the clock signal line CK9, ck10_2 represents a second clock signal input to the clock signal line CK10, ck11_2 represents a second clock signal input to the clock signal line CK11, and ck12_2 represents a second clock signal input to the clock signal line CK12.

A signal ga1_2 represents the second gate scanning signal output to the gate line GA1 by the gate driving circuit 110, a signal ga2_2 represents the second gate scanning signal output to the gate line GA2 by the gate driving circuit 110, . . . , a signal ga10_2 represents the second gate scanning signal output to the gate line GA10 by the gate driving circuit 110, a signal ga11_2 represents the second gate scanning signal output to the gate line GA11 by the gate driving circuit 110, and a signal ga12_2 represents the second gate scanning signal output to the gate line GA12 by the gate driving circuit 110. Taking an example that a pulse corresponding to a high level is the effective pulse of each second gate scanning signal, a difference value between the starting time points of the effective pulses of the second gate scanning signals ga1_2 and ga2_2 is the same as a difference value between the starting time points of the effective pulses of the second gate scanning signals ga2_2 and ga3_2. The difference value between the starting time points of the effective pulses of the second gate scanning signals ga2_2 and ga3_2 is the same as a difference value between the starting time points of the effective pulses of the second gate scanning signals ga3_2 and ga4_2. A difference value between the starting time points of the effective pulses of the second gate scanning signals ga4_2 and ga5_2 is the same as a difference value between the starting time points of the effective pulses of the second gate scanning signals ga5_2 and ga6_2. The remaining is analogized and will not be repeated here.

The gate driving circuit includes a plurality of shifting register circuits; each of the shifting register circuits has clock signal output terminals; and the clock signal output terminals are coupled with the clock signal lines to receive the second clock signals. Exemplarily, the gate driving circuit 110 outputs the first high level of the second clock signal ck1_2 to the gate line GA1 to generate a high level in the signal ga1_2. The gate driving circuit 110 outputs the first high level of the second clock signal ck2_2 to the gate line GA2 to generate a high level in the signal ga2_2. . . . The gate driving circuit 110 outputs the first high level of the second clock signal ck10_2 to the gate line GA10 to generate a high level in the signal ga10_2. The gate driving circuit 110 outputs the first high level of the second clock signal ck11_2 to the gate line GA11 to generate a high level in the signal ga11_2. The gate driving circuit 110 outputs the first high level of the second clock signal ck12_2 to the gate line GA12 to generate a high level in the signal ga12_2. That is, a pulse corresponding to the high level of each second clock signal may be an effective pulse thereof, and a pulse corresponding to a low level may be an ineffective pulse thereof. Of course, when a shifting register outputs the low level of the second clock signal to generate a low-level signal, in the signals, for controlling the transistor to be turned on, the pulse corresponding to the low level of the second clock signal may be used as the effective pulse thereof, and the pulse corresponding to the high level may be used as the ineffective pulse thereof.

In combination with FIG. 2 to FIG. 6, taking the sub-pixels coupled with the data line DA2 as an example, when the second driving mode is adopted, a process of displaying a picture of the display panel may be described as follows.

In a data charging stage T11, the signal ga1_2 transmitted on the gate line GA1 is a high level, and the transistor in the red sub-pixel R12 is turned on to load a data voltage D1 of display data corresponding to the red sub-pixel R12 to the data line DA2, so that the target data voltage D1 is input to the red sub-pixel R12. In the data charging stage T11, the signal ga2_2 on the gate line GA2 is a high level, and the transistor in the red sub-pixel R11 is turned on. The data voltage D1 is input to the red sub-pixel R11 at the same time as a pre-charging voltage so as to pre-charge the red sub-pixel R11. In the data charging stage T11, the signal ga3_2 on the gate line GA3 is a high level, the transistor in the red sub-pixel R22 is turned on, and the data voltage D1 is input to the red sub-pixel R22 at the same time as a pre-charging voltage so as to pre-charge the red sub-pixel R22.

In a data charging stage T12, the signal ga2_2 transmitted on the gate line GA2 is a high level, and the transistor in the red sub-pixel R11 is turned on. A data voltage D2 of display data corresponding to the red sub-pixel R11 is loaded to the data line DA2, so that the target data voltage D2 is input to the red sub-pixel R11. In the data charging stage T12, the signal ga3_2 on the gate line GA3 is a high level, the transistor in the red sub-pixel R22 is turned on, and the data voltage D2 is input to the red sub-pixel R22 at the same time as a pre-charging voltage so as to pre-charge the red sub-pixel R22. In the data charging stage T12, the signal ga4_2 on the gate line GA4 is a high level, the transistor in the red sub-pixel R21 is turned on, and the data voltage D2 is input to the red sub-pixel R21 at the same time as a pre-charging voltage so as to pre-charge the red sub-pixel R21.

In a data charging stage T13, the signal ga3_2 transmitted on the gate line GA3 is a high level, and the transistor in the red sub-pixel R22 is turned on. A data voltage D3 of display data corresponding to the red sub-pixel R22 is loaded to the data line DA2, so that the target data voltage D3 is input to the red sub-pixel R22. In the data charging stage T13, the signal ga4_2 on the gate line GA4 is a high level, the transistor in the red sub-pixel R21 is turned on, and the data voltage D3 is input to the red sub-pixel R21 at the same time as a pre-charging voltage so as to pre-charge the red sub-pixel R21. In the data charging stage T13, the signal ga5_2 on the gate line GA5 is a high level, the transistor in the red sub-pixel R32 is turned on, and the data voltage D3 is input to the red sub-pixel R32 at the same time as a pre-charging voltage so as to pre-charge the red sub-pixel R32.

In a data charging stage T14, the signal ga4_2 transmitted on the gate line GA4 is a high level, and the transistor in the red sub-pixel R21 is turned on. A data voltage D4 of display data corresponding to the red sub-pixel R21 is loaded to the data line DA2, so that the target data voltage D4 is input to the red sub-pixel R21. In the data charging stage T14, the signal ga5_2 on the gate line GA5 is a high level, the transistor in the red sub-pixel R32 is turned on, and the data voltage D4 is input to the red sub-pixel R32 at the same time as a pre-charging voltage so as to pre-charge the red sub-pixel R32. In the data charging stage T14, the signal ga6_2 on the gate line GA6 is a high level, the transistor in the red sub-pixel R31 is turned on, and the data voltage D4 is input to the red sub-pixel R31 at the same time as a pre-charging voltage so as to pre-charge the red sub-pixel R31.

In a data charging stage T15, the signal ga5_2 transmitted on the gate line GA5 is a high level, and the transistor in the red sub-pixel R32 is turned on. A data voltage D5 of display data corresponding to the red sub-pixel R32 is loaded to the data line DA2, so that the target data voltage D5 is input to the red sub-pixel R32. In the data charging stage T15, the signal ga6_2 on the gate line GA6 is a high level, the transistor in the red sub-pixel R31 is turned on, and the data voltage D5 is input to the red sub-pixel R31 at the same time as a pre-charging voltage so as to pre-charge the red sub-pixel R31. In the data charging stage T15, the signal ga7_2 on the gate line GA7 is a high level, the transistor in the red sub-pixel R42 is turned on, and the data voltage D5 is input to the red sub-pixel R42 at the same time as a pre-charging voltage so as to pre-charge the red sub-pixel R42.

In a data charging stage T16, the signal ga6_2 transmitted on the gate line GA6 is a high level, and the transistor in the red sub-pixel R31 is turned on. A data voltage D6 of display data corresponding to the red sub-pixel R31 is loaded to the data line DA2, so that the target data voltage D6 is input to the red sub-pixel R31. In the data charging stage T16, the signal ga7_2 on the gate line GA7 is a high level, the transistor in the red sub-pixel R42 is turned on, and the data voltage D6 is input to the red sub-pixel R42 at the same time as a pre-charging voltage so as to pre-charge the red sub-pixel R42. In the data charging stage T16, the signal ga8_2 on the gate line GA8 is a high level, the transistor in the red sub-pixel R41 is turned on, and the data voltage D6 is input to the red sub-pixel R41 at the same time as a pre-charging voltage so as to pre-charge the red sub-pixel R41.

In a data charging stage T17, the signal ga7_2 transmitted on the gate line GA7 is a high level, and the transistor in the red sub-pixel R42 is turned on. A data voltage D7 of display data corresponding to the red sub-pixel R42 is loaded to the data line DA2, so that the target data voltage D7 is input to the red sub-pixel R42. In the data charging stage T17, the signal ga8_2 on the gate line GA8 is a high level, the transistor in the red sub-pixel R41 is turned on, and the data voltage D7 is input to the red sub-pixel R41 at the same time as a pre-charging voltage so as to pre-charge the red sub-pixel R41. Subsequent red sub-pixels are pre-charged.

In a data charging stage T18, the signal ga8_2 transmitted on the gate line GA8 is a high level, and the transistor in the red sub-pixel R41 is turned on. A data voltage D8 of display data corresponding to the red sub-pixel R41 is loaded to the data line DA2, so that the target data voltage D8 is input to the red sub-pixel R41. Subsequent red sub-pixels are pre-charged.

The implementations of the remaining sub-pixels are analogized until the sub-pixels in the whole display panel are charged with the target data voltages, which is not repeated here.

Figure 7:
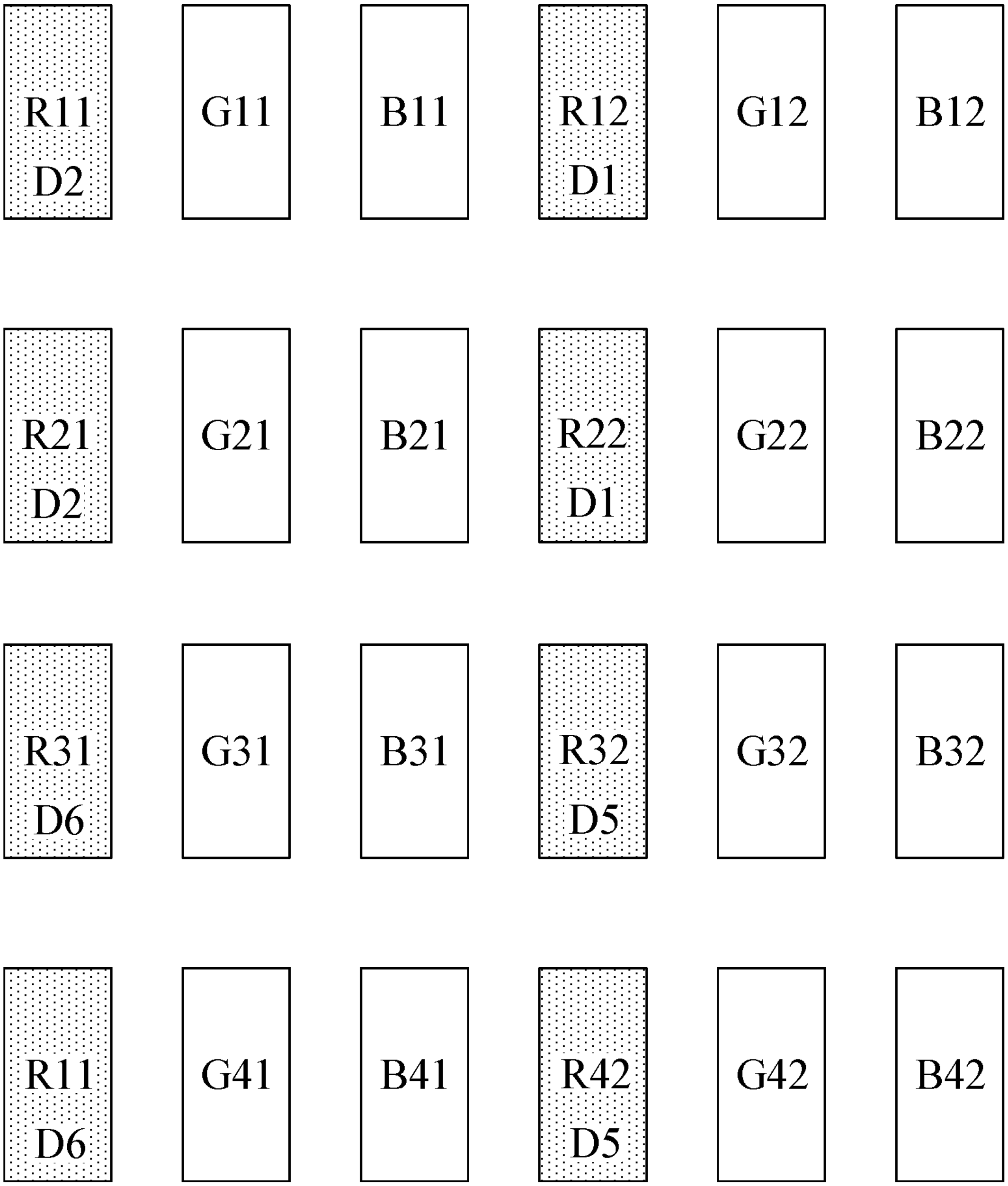
FIG. 7 is a schematic diagram of some other structures of sub-pixels in a display panel in an embodiment of the present disclosure.

In some embodiments of the present disclosure, the original display data of the current display frame may be obtained, and when it is determined to adopt the first driving mode, a data voltage may be loaded to the data lines in the display panel according to the original display data corresponding to the sub-pixels in odd rows at the present display frame to charge each sub-pixel in the display panel with the data voltage. The same data voltage is input to the same column of sub-pixels in two adjacent rows. For example, taking the sub-pixels coupled with the data line DA2 as an example, as shown in FIG. 7, the data voltage D1 represents the target data voltage corresponding to the red sub-pixel R12, the data voltage D2 represents the target data voltage corresponding to the red sub-pixel R11, the data voltage D5 represents the target data voltage corresponding to the red sub-pixel R32, and the data voltage D6 represents the target data voltage corresponding to the red sub-pixel R31. It is required to input the data voltage D1 to both of the red sub-pixels R12 and R22 as the target data voltage. The data voltage D2 is input to both of the red sub-pixels R11 and R21 as the target data voltage. The data voltage D5 is input to both of the red sub-pixels R32 and R42 as the target data voltage. The data voltage D6 is input to both of the red sub-pixels R31 and R41 as the target data voltage.

Figure 8:
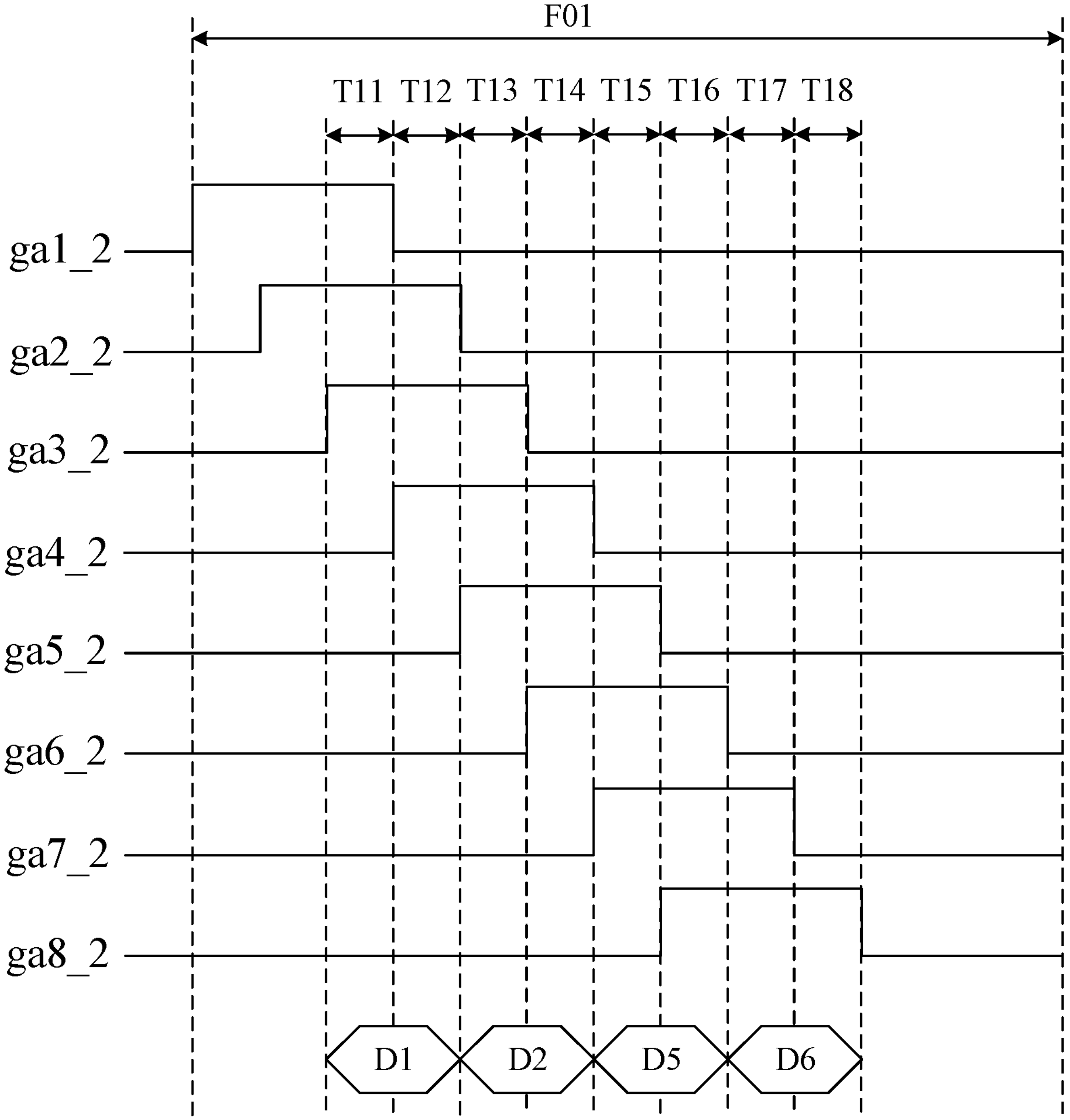
FIG. 8 is a diagram of yet some signal timings in an embodiment of the present disclosure.
Figure 9:
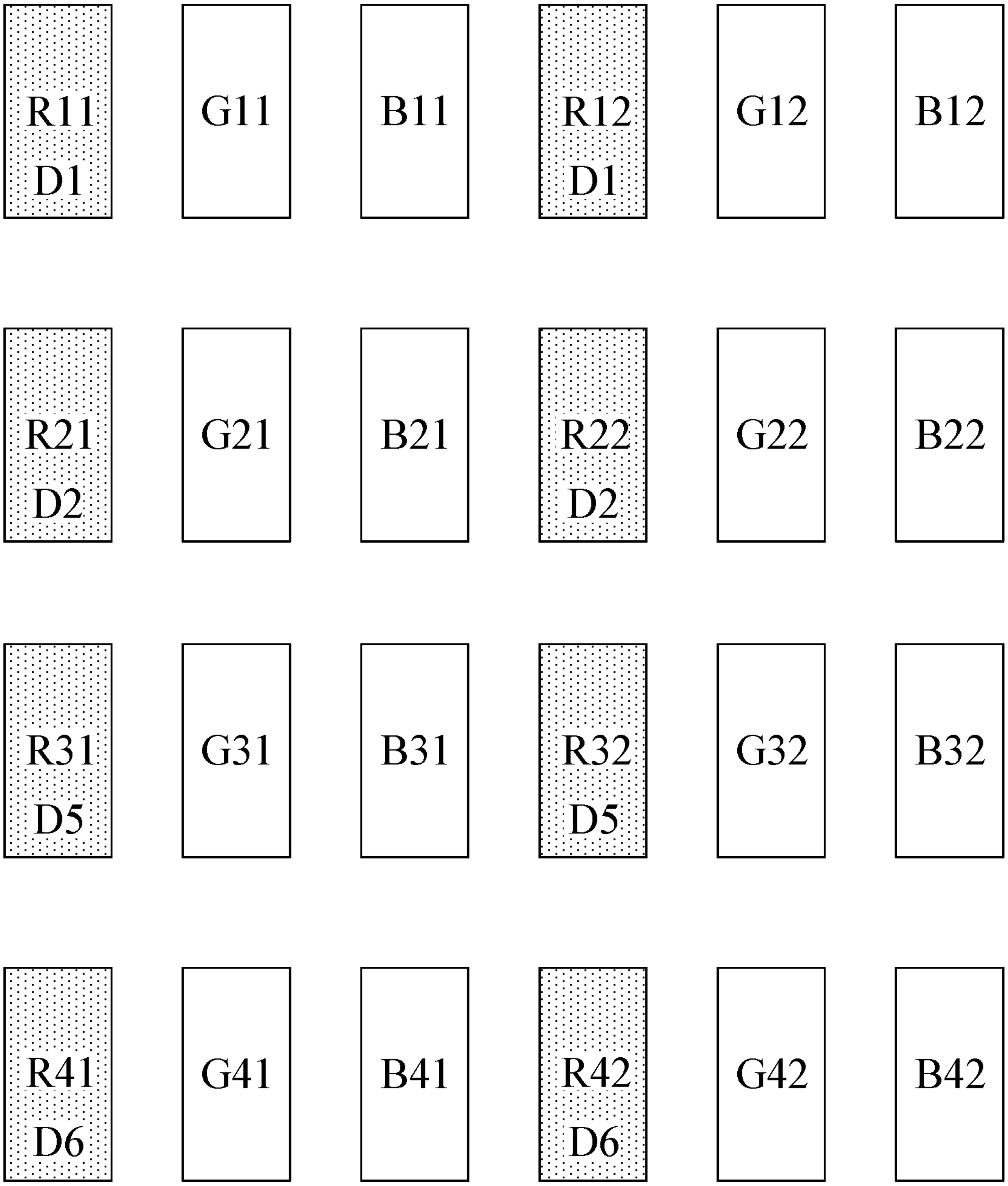
FIG. 9 is a schematic diagram of yet some structures of sub-pixels in a display panel in an embodiment of the present disclosure.

However, when it is determined to adopt the first driving mode, if the second gate scanning signals are loaded to the gate lines in the display panel, in combination with FIG. 7 and FIG. 8, taking the sub-pixels coupled with the data line DA2 as an example, when the second gate scanning signals are adopted for driving the gate lines row by row, the data voltage D1 is input to both of the red sub-pixels R12 and R11 as the target data voltage. The data voltage D2 is input to both of the red sub-pixels R22 and R21 as the target data voltage. The data voltage D5 is input to both of the red sub-pixels R32 and R31 as the target data voltage. The data voltage D6 is input to both of the red sub-pixels R42 and R41 as the target data voltage. Therefore, in combination with FIG. 7 and FIG. 9, FIG. 7 is a schematic diagram of the target data voltages required to be input to the red sub-pixels, and FIG. 9 is a schematic diagram of target data voltages actually input to the red sub-pixels when the second gate scanning signals are adopted for driving the gate lines row by row. It can be seen from this that, if the second gate scanning signals are adopted for driving the gate lines row by row, the problem of misplacing of the target data voltages charged to the sub-pixels will be caused.

Figure 10:
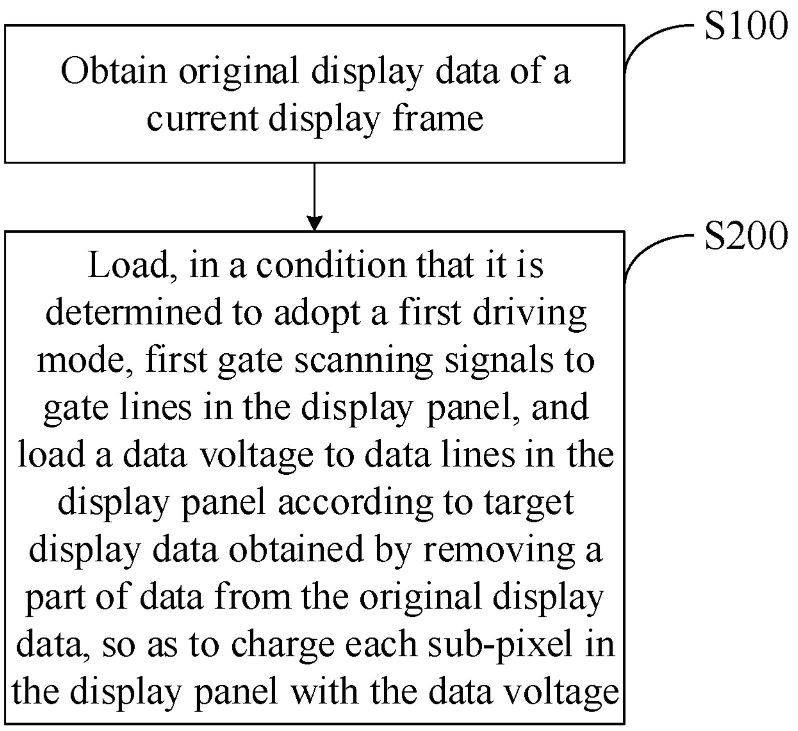
FIG. 10 is a flow chart of a driving method for a display panel in an embodiment of the present disclosure.

In order to solve the problem of misplacing of the data voltages, an embodiment of the present disclosure provides a driving method for a display panel, and as shown in FIG. 10, the driving method may include the following steps.

S100, original display data of a current display frame is obtained.

Exemplarily, the obtained original display data may include digital signal forms of data voltages, which are provided with gray scale values corresponding to the data voltages, corresponding to sub-pixels one to one. In this way, the gray scale value corresponding to each sub-pixel may be determined according to display data of the sub-pixel. In this way, a target data voltage corresponding to each sub-pixel may be obtained according to the determined gray scale value.

S200, when it is determined to adopt a first driving mode, first gate scanning signals are loaded to gate lines in the display panel, and a data voltage is loaded to data lines in the display panel according to target display data obtained by removing a part of data from the original display data, so as to charge each sub-pixel in the display panel with the data voltage.

In some embodiments of the present disclosure, for at least one of the plurality of gate lines, an effective pulse of the first gate scanning signal loaded to the gate line has a first overlapping duration with an effective pulse of the first gate scanning signal loaded to the previous gate line adjacent to the gate line, the effective pulse of the first gate scanning signal loaded to the gate line has a second overlapping duration with an effective pulse of the first gate scanning signal loaded to the next gate line adjacent to the gate line, and the first overlapping duration is different from the second overlapping duration. Exemplarily, in combination with FIG. 11, a signal ga1_1 represents the first gate scanning signal loaded to the gate line GA1, a signal ga2_1 represents the first gate scanning signal loaded to the gate line GA2, a signal ga3_1 represents the first gate scanning signal loaded to the gate line GA3, a signal ga4_1 represents the first gate scanning signal loaded to the gate line GA4, a signal ga5_1 represents the first gate scanning signal loaded to the gate line GA5, a signal ga6_1 represents the first gate scanning signal loaded to the gate line GA6, a signal ga7_1 represents the first gate scanning signal loaded to the gate line GA7, and a signal ga8_1 represents the first gate scanning signal loaded to the gate line GA8. A high level is an effective pulse of the first gate scanning signal. Exemplarily, for the gate line GA2, the high level of the signal ga2_1 has a first overlapping duration t11 with the high level of the signal ga1_1, the high level of the signal ga2_1 has a second overlapping duration t21 with the high level of the signal ga3_1, and the first overlapping duration t11 and the second overlapping duration t21 corresponding to the gate line GA2 are different. For the gate line GA3, the high level of the signal ga3_1 has a first overlapping duration t12 with the high level of the signal ga2_1, the high level of the signal ga3_1 has a second overlapping duration t22 with the high level of the signal ga4_1, and the first overlapping duration t12 and the second overlapping duration t22 corresponding to the gate line GA3 are different. For the gate line GA4, the high level of the signal ga4_1 has a first overlapping duration t13 with the high level of the signal ga3_1, the high level of the signal ga4_1 has a second overlapping duration t23 with the high level of the signal ga5_1, and the first overlapping duration t13 and the second overlapping duration t23 corresponding to the gate line GA4 are different. For the gate line GA5, the high level of the signal ga5_1 has a first overlapping duration t14 with the high level of the signal ga4_1, the high level of the signal ga5_1 has a second overlapping duration t24 with the high level of the signal ga6_1, and the first overlapping duration t14 and the second overlapping duration t24 corresponding to the gate line GA5 are different. The remaining is in the same way. which is not repeated here.

In the driving method for the display panel provided by the embodiment of the present disclosure, when it is determined to adopt the first driving mode, target display data may be obtained by removing a part of data from the original display data, and the data voltage is loaded to the data lines in the display panel according to the target display data, so as to charge each sub-pixel in the display panel with the data voltage. In this way, a refresh frequency may be increased. the display smoothness is improved, and especially for a product with a high resolution, this driving mode may increase the charging rate of the display panel. By making the first overlapping duration and the second overlapping duration different, dislocation generated by the data voltage may be lowered, and the display effect is improved.

In some embodiments of the present disclosure, a controller may obtain the original display data of the current display frame; and when it is determined to adopt the first driving mode, the first gate scanning signals may be loaded to the gate lines in the display panel, and the data voltage is loaded to the data lines in the display panel according to the target display data obtained by removing a part of data from the original display data, so as to charge each sub-pixel in the display panel with the data voltage. Exemplarily, the controller may include: a system controller and a timing controller. The system controller may obtain the original display data of the current display frame; and send, when it is determined to adopt the first driving mode, the target display data obtained by removing a part of data from the original display data to the timing controller. The timing controller may send the received target display data to a source driving circuit. The source driving circuit may load the data voltage to the data lines in the display panel according to the received target display data. In this way, the transmission amount of the display data may be reduced, the power consumption is lowered, and the transmission rate is increased.

Exemplarily, the controller may include: a system controller and a timing controller. The system controller may obtain the original display data of the current display frame; and send, when it is determined to adopt the first driving mode, the original display data to the timing controller. The timing controller is configured to send, when it is determined to adopt the first driving mode, the target display data obtained by removing a part of data from the original display data to a source driving circuit. The source driving circuit may load the data voltage to the data lines in the display panel according to the received target display data. In this way, the transmission amount of the display data may be reduced, the power consumption is lowered, and the transmission rate is increased.

Exemplarily, the controller may include: a system controller and a timing controller. The system controller may obtain, when it is determined to adopt the first driving mode, the original display data of the current display frame; and send the original display data to the timing controller. The timing controller may send the received original display data to a source driving circuit when it is determined to adopt the first driving mode. The source driving circuit may load, when it is determined to adopt the first driving mode, the data voltage to the data lines in the display panel according to the target display data obtained by removing a part of data from the original display data. In this way, the transmission amount of the display data may be reduced, the power consumption is lowered, and the transmission rate is increased. It should be noted that, for example, the system controller removes part of the data, or, the timing controller removes part of the data, or, the source driving circuit removes part of the data. The removed data may be, for example, half of the data of each frame, the removed data may be interlaced removal, such as odd numbered rows of data of each frame are only retained, and even numbered rows of data of each frame are removed; or, even numbered rows of data of each frame are only retained, and odd numbered rows of data of each frame are removed; or, in the two adjacent frames, odd numbered rows of data of the previous frame are only retained, and even numbered rows of data of the previous frame are removed, even numbered rows of data of the next frame are only retained, and odd numbered rows of data of the next frame are removed. For example, the $1^{st}$, $3^{rd}$, $5^{th}$, $7^{th}$, $9^{th}$ . . . rows of data in the first frame are only retained, and the $2^{nd}$, $4^{th}$, $6^{th}$, $8^{th}$, $10^{th}$ . . . rows of data in the second frame are only retained. Or, in the two adjacent frames, even numbered rows of data of the previous frame are only retained, and odd numbered rows of data of the previous frame are removed, odd numbered rows of data of the next frame are only retained, and even numbered rows of data of the next frame are removed. For example, the $2^{nd}$, $4^{th}$, $6^{th}$, $8^{th}$, $10^{th}$ . . . rows of data in the first frame are only retained, and the $1^{st}$, $3^{rd}$, $5^{th}$, $7^{th}$, $9^{th}$ . . . rows of data in the second frame are only retained. The “row” herein means that pixels connected with one gate line correspond to one row; and pixels connected with different gate lines corresponds to different rows, which is not limited herein.

Exemplarily, the system controller may be, for example, a system on chip (SOC). Of course, in practical applications, the system controller may further adopt other implementable structures, which is not limited here.

In some embodiments of the present disclosure, for the $2k^{th}$ gate line, the first overlapping duration corresponding to the $2k^{th}$ gate line is less than the second overlapping duration corresponding to the $2k^{th}$ gate line; where k is an integer greater than 0. Exemplarily, in combination with FIG. 2 and FIG. 11, the $2^{nd}$ gate line GA2 corresponds to the first overlapping duration t11 and the second overlapping duration t21, and t11<t21. The $4^{th}$ gate line GA4 corresponds to the first overlapping duration t13 and the second overlapping duration t23, and t13<t23. The remaining is in the same way, which is not repeated here.

In some embodiments of the present disclosure, the first overlapping durations corresponding to gate lines of 2*k* numbers may be the same. Exemplarily, in combination with FIG. 2 and FIG. 11, the first overlapping duration t11 corresponding to the $2^{nd}$ gate line GA2 and the first overlapping duration t13 corresponding to the $4^{th}$ gate line GA4 are the same. The remaining is in the same way, which is not repeated here.

In some embodiments of the present disclosure, the second overlapping durations corresponding to gate lines of 2*k* numbers may be the same. Exemplarily, in combination with FIG. 2 and FIG. 11, the second overlapping duration t21 corresponding to the $2^{nd}$ gate line GA2 and the second overlapping duration t23 corresponding to the $4^{th}$ gate line GA4 are the same. The remaining is in the same way, which is not repeated here.

In some embodiments of the present disclosure, the second overlapping duration corresponding to the $2k^{th}$ gate line may be an even multiple of the first overlapping duration corresponding to the $2k^{th}$ gate line. Exemplarily, in combination with FIG. 2 and FIG. 11, the second overlapping duration corresponding to the $2k^{th}$ gate line may be two times the first overlapping duration. For example, the first overlapping duration t11 and the first overlapping duration t13 both are a duration of 1H (H represents a duration of charging a row of sub-pixels with a target data voltage). The second overlapping duration t21 and the second overlapping duration t23 both may be a duration of 2H. The remaining is in the same way, which is not repeated here. Of course, in practical applications, the specific multiple of the second overlapping duration corresponding to the $2k^{th}$ gate line to the first overlapping duration may be determined according to the requirements of the practical applications, which is not limited here.

In some embodiments of the present disclosure, for the $(2m+1)^{th}$ gate line, the first overlapping duration corresponding to the $(2m+1)^{th}$ gate line is greater than the second overlapping duration: where m is an integer greater than 0. Exemplarily, in combination with FIG. 2 and FIG. 11, the $3^{rd}$ gate line GA3 corresponds to the first overlapping duration t12 and the second overlapping duration t22, and t12>t22. The 5th gate line GA5 corresponds to the first overlapping duration t14 and the second overlapping duration t24, and t14>t24. The remaining is in the same way, which is not repeated here.

In some embodiments of the present disclosure, the first overlapping durations corresponding to gate lines of (2m+1) numbers may be the same. Exemplarily, in combination with FIG. 2 and FIG. 11, the first overlapping duration t12 corresponding to the $3^{rd}$ gate line GA3 and the first overlapping duration t14 corresponding to the 5th gate line GA5 are the same. The remaining is in the same way, which is not repeated here.

In some embodiments of the present disclosure, the second overlapping durations corresponding to gate lines of (2m+1) numbers may be the same. Exemplarily, in combination with FIG. 2 and FIG. 11, the second overlapping duration t22 corresponding to the $3^{rd}$ gate line GA3 and the second overlapping duration t24 corresponding to the 5th gate line GA5 are the same. The remaining is in the same way, which is not repeated here.

In some embodiments of the present disclosure, the first overlapping duration corresponding to the $(2m+1)^{th}$ gate line may be an even multiple of the second overlapping duration corresponding to the $(2m+1)^{th}$ gate line. Exemplarily, in combination with FIG. 2 and FIG. 11, the first overlapping duration corresponding to the $(2m+1)^{th}$ gate line may be two times the second overlapping duration. For example, the first overlapping duration t12 and the first overlapping duration t14 both are a duration of 2H. The second overlapping duration t22 and the second overlapping duration t24 both may be a duration of 1H. The remaining is in the same way. which is not repeated here. Of course, in practical applications, the specific multiple of the first overlapping duration corresponding to the $(2m+1)^{th}$ gate line to the second overlapping duration may be determined according to the requirements of the practical applications, which is not limited here.

In some embodiments of the present disclosure, at least four gate lines may be one gate line group, and starting time points of effective pulses of the first gate scanning signals loaded to the gate lines in each gate line group sequentially occur according to the order of the first gate line, the third gate line, the second gate line and the fourth gate line in the gate line group. Exemplarily, in combination with FIG. 2 and FIG. 11, four gate lines are a gate line group, wherein the gate lines GA1-GA4 may be the first gate line group, the gate lines GA5-GA8 may be the second gate line group, and the gate lines GA9-GA12 may be the third gate line group. In the first gate line group, the gate line GA1 is the first gate line, the gate line GA3 is the third gate line, the gate line GA2 is the second gate line, and the gate line GA4 is the fourth gate line. That is, the starting time point of the effective pulse of the first gate scanning signal ga1_1 on the gate line GA1 occurs first, then the starting time point of the effective pulse of the first gate scanning signal ga3_1 on the gate line GA3 occurs, then the starting time point of the effective pulse of the first gate scanning signal ga2_1 on the gate line GA2 occurs, and then the starting time point of the effective pulse of the first gate scanning signal ga4_1 on the gate line GA4 occurs. In the second gate line group, the gate line GA5 is the first gate line, the gate line GA7 is the third gate line, the gate line GA6 is the second gate line, and the gate line GA8 is the fourth gate line. That is, the starting time point of the effective pulse of the first gate scanning signal ga5_1 on the gate line GA5 occurs first, then the starting time point of the effective pulse of the first gate scanning signal ga7_1 on the gate line GA7 occurs, then the starting time point of the effective pulse of the first gate scanning signal ga6_1 on the gate line GA6 occurs, and then the starting time point of the effective pulse of the first gate scanning signal ga8_1 on the gate line GA8 occurs. The remaining is in the same way, which is not repeated here.

Exemplarily, the sub-pixels in the display panel are distributed in an array to form a plurality of sub-pixel rows and a plurality of sub-pixel columns. The plurality of sub-pixel rows may be divided into a plurality of sub-pixel row groups, and each sub-pixel row group includes sub-pixel rows spaced by N sub-pixel rows: wherein N is an integer greater than 0. The target display data includes display data corresponding to sub-pixels in one sub-pixel row group.

Exemplarily, N may be equal to 1, and then each sub-pixel row group includes sub-pixel rows spaced by one sub-pixel row. That is, the plurality of sub-pixel row groups may include a first sub-pixel row group and a second sub-pixel row group. The first sub-pixel row group includes the sub-pixel rows of odd numbers, and the second sub-pixel row group includes the sub-pixel rows of even numbers. For example, in combination with FIG. 2, the first sub-pixel row group includes: a first sub-pixel row R11-B14, a third sub-pixel row R31-B34 and a fifth sub-pixel row R51-B54. The second sub-pixel row group includes a sub-pixel row R21-B24, a fourth sub-pixel row R41-B44 and a sixth sub-pixel row R61-B64.

Exemplarily, the current display frame may be an (odd number)$^{th}$ display frame in the plurality of consecutive display frames, and the target display data may include display data corresponding to the sub-pixels in the first sub-pixel row group. That is, when the current display frame is an (odd number)$^{th}$ display frame in the plurality of consecutive display frames, the target display data may include the original display data corresponding to each sub-pixel in the odd row of sub-pixels. For example, in combination with FIG. 2, when the current display frame is an (odd number)$^{th}$ display frame in the plurality of consecutive display frames, the target display data may include the original display data corresponding to the sub-pixels R11-B14, the sub-pixels R31-B34 and the sub-pixels R51-B54.

Exemplarily, the current display frame may be an (odd number)$^{th}$ display frame in the plurality of consecutive display frames, and the target display data may include display data corresponding to the sub-pixels in the second sub-pixel row group. That is, when the current display frame is an (odd number)$^{th}$ display frame in the plurality of consecutive display frames, the target display data may include the original display data corresponding to each sub-pixel in the even row of sub-pixels. For example, in combination with FIG. 2, when the current display frame is an (odd number)$^{th}$ display frame in the plurality of consecutive display frames, the target display data may include the original display data corresponding to the sub-pixels R21-B24, the sub-pixels R41-B44 and the sub-pixels R61-B64.

Exemplarily, the current display frame may be an (even number)$^{th}$ display frame in the plurality of consecutive display frames, and the target display data may include display data corresponding to the sub-pixels in the first sub-pixel row group. That is, when the current display frame is an (even number)$^{th}$ display frame in the plurality of consecutive display frames, the target display data may include the original display data corresponding to each sub-pixel in the odd row of sub-pixels. For example, in combination with FIG. 2, when the current display frame is an (even number)$^{th}$ display frame in the plurality of consecutive display frames, the target display data may include the original display data corresponding to the sub-pixels R11-B14, the sub-pixels R31-B34 and the sub-pixels R51-B54.

Exemplarily, the current display frame may be an (even number)$^{th}$ display frame in the plurality of consecutive display frames, and the target display data may include display data corresponding to the sub-pixels in the second sub-pixel row group. That is, when the current display frame is an (even number)$^{th}$ display frame in the plurality of consecutive display frames, the target display data may include the original display data corresponding to each sub-pixel in the even row of sub-pixels. For example, in combination with FIG. 2, when the current display frame is an (even number)$^{th}$ display frame in the plurality of consecutive display frames, the target display data may include the original display data corresponding to the sub-pixels R21-B24, the sub-pixels R41-B44 and the sub-pixels R61-B64.

Exemplarily, every two adjacent sub-pixels in the same column share one data voltage. For example, when the current display frame is an (even number)$^{th}$ display frame in the plurality of consecutive display frames, the target display data may include the original display data corresponding to the sub-pixels R21-B24, the sub-pixels R41-B44 and the sub-pixels R61-B64. Thus, the sub-pixel R11 and the sub-pixel R21 share one data voltage, the sub-pixel R31 and the sub-pixel R41 share one data voltage, and the sub-pixel R51 and the sub-pixel R61 share one data voltage. The remaining is in the same way, which is not repeated here.

In the following, illustration is made by taking an example that when the current display frame is the first display frame F1 in the plurality of consecutive display frames, the target display data may include the original display data corresponding to the odd row of sub-pixels. In combination with FIG. 7 and FIG. 11, an example taken is the original display data corresponding to the red sub-pixels in an odd row coupled with the data line DA2. When the first driving mode is adopted, a process of displaying a picture of the display panel may be described as follows.

Figure 11:
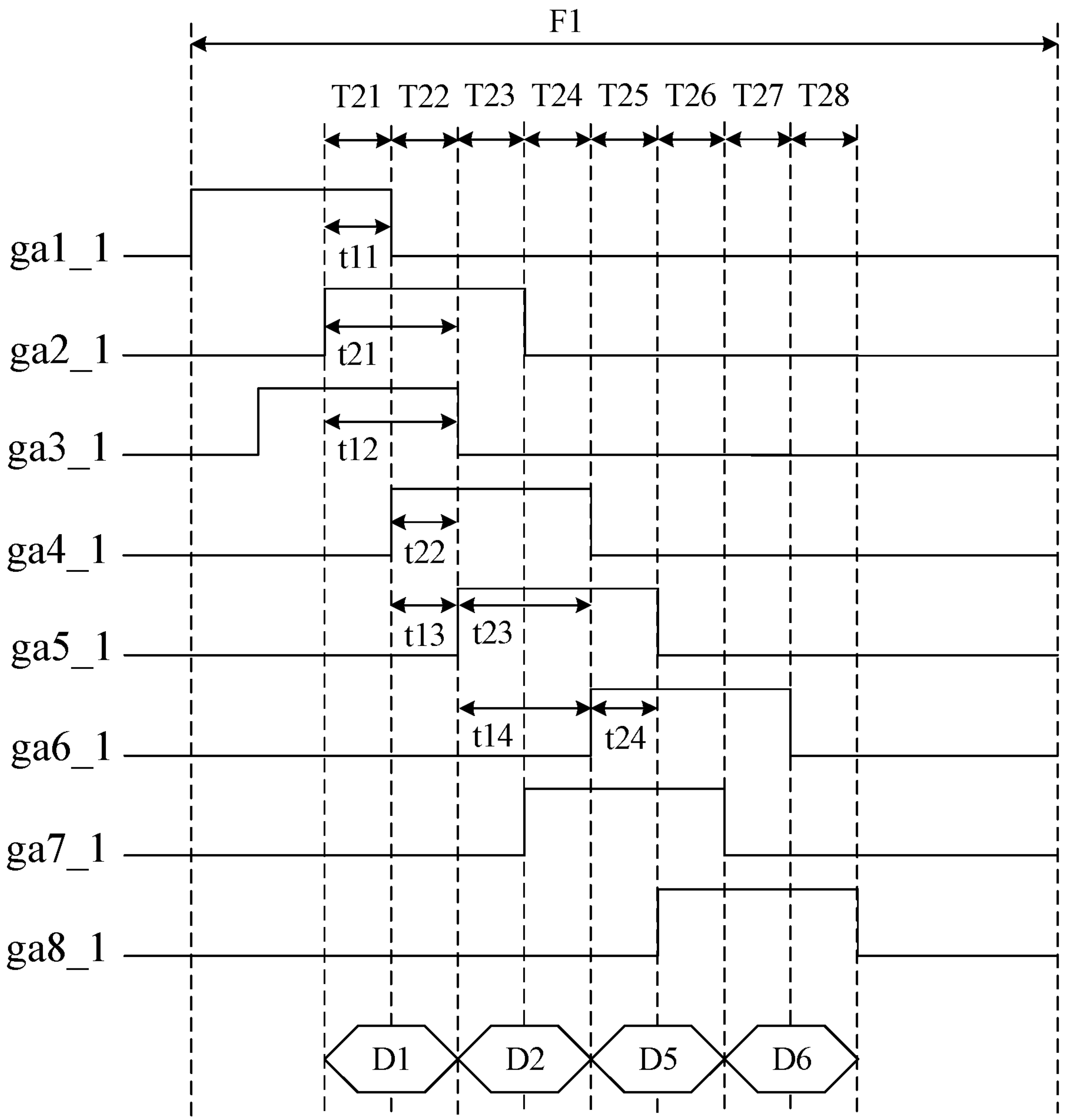
FIG. 11 is a diagram of yet some signal timings in an embodiment of the present disclosure.

In a data charging stage T21, the signal ga1_1 is a high level, and the transistor in the red sub-pixel R12 is turned on to load a data voltage D1 of display data corresponding to the red sub-pixel R12 to the data line DA2, so that the target data voltage D1 is input to the red sub-pixel R12. In the data charging stage T21, the signal ga2_1 on the gate line GA2 is a high level, and the transistor in the red sub-pixel R11 is turned on. The data voltage D1 is input to the red sub-pixel R11 at the same time as a pre-charging voltage to pre-charge the red sub-pixel R11, and a time stage corresponding to pre-charging herein is a time duration at which effective pulses of the signals ga2_1 and ga1_1 overlap with each other, as shown in FIG. 11, the time duration corresponding to a time duration at which the high levels in the signals ga2_1 and ga1_1 overlap with each other. In the data charging stage T21, the signal ga3_1 on the gate line GA3 is a high level, the transistor in the red sub-pixel R22 is turned on, and the data voltage D1 is input to the red sub-pixel R22 at the same time as a pre-charging voltage so as to pre-charge the red sub-pixel R22. A time stage corresponding to pre-charging herein is a time duration at which effective pulses of the signals ga3_1 and ga1_1 overlap with each other, as shown in FIG. 11, the time duration corresponding to a time duration at which the high levels in the signals ga3_1 and ga1_1 overlap with each other.

In a data charging stage T22, the signal ga3_1 on the gate line GA3 is a high level, the transistor in the red sub-pixel R22 is turned on, and the data voltage D1 is input to the red sub-pixel R22 at the same time as the target data voltage. In the data charging stage T22, the signal ga2_1 is a high level, and the transistor in the red sub-pixel R11 is turned on. The data voltage D1 of the display data corresponding to the red sub-pixel R12 is loaded to the data line DA2, so that the data voltage D1 is input to the red sub-pixel R11 for pre-charging. In the data charging stage T22, the signal ga4_2 on the gate line GA4 is a high level, the transistor in the red sub-pixel R21 is turned on, and the data voltage D1 is input to the red sub-pixel R21 at the same time as a pre-charging voltage so as to pre-charge the red sub-pixel R21.

In a data charging stage T23, the signal ga2_1 is a high level, and the transistor in the red sub-pixel R22 is turned on. A data voltage D2 of display data corresponding to the red sub-pixel R11 is loaded to the data line DA2, so that the target data voltage D2 is input to the red sub-pixel R11. That is, the effective pulse of the signal ga2_1 includes the pre-charging data voltage D1 of the two stages T21 and T22 and the target data voltage D2 of the stage T23. In the data charging stage T23, the signal ga4_1 on the gate line GA4 is a high level, the transistor in the red sub-pixel R21 is turned on, and the data voltage D2 is input to the red sub-pixel R21 at the same time as a pre-charging voltage so as to pre-charge the red sub-pixel R21. In the data charging stage T23, the signal ga5_1 on the gate line GA5 is a high level, the transistor in the red sub-pixel R32 is turned on, and the data voltage D2 is input to the red sub-pixel R32 at the same time as a pre-charging voltage so as to pre-charge the red sub-pixel R32.

In a data charging stage T24, the signal ga4_1 is a high level, and the transistor in the red sub-pixel R21 is turned on. The data voltage D2 of the display data corresponding to the red sub-pixel R11 is loaded to the data line DA2, so that the target data voltage D2 is input to the red sub-pixel R21. In the data charging stage T24, the signal ga5_1 on the gate line GA5 is a high level, the transistor in the red sub-pixel R32 is turned on, and the data voltage D2 is input to the red sub-pixel R32 at the same time as a pre-charging voltage so as to pre-charge the red sub-pixel R32. In the data charging stage T24, the signal ga7_1 on the gate line GA7 is a high level, the transistor in the red sub-pixel R42 is turned on, and the data voltage D2 is input to the red sub-pixel R42 at the same time as a pre-charging voltage so as to pre-charge the red sub-pixel R42.

In a data charging stage T25, the signal ga5_1 is a high level, and the transistor in the red sub-pixel R32 is turned on. A data voltage D5 of display data corresponding to the red sub-pixel R32 is loaded to the data line DA2, so that the target data voltage D5 is input to the red sub-pixel R32. In the data charging stage T25, the signal ga6_1 on the gate line GA6 is a high level. the transistor in the red sub-pixel R31 is turned on, and the data voltage D5 is input to the red sub-pixel R31 at the same time as a pre-charging voltage so as to pre-charge the red sub-pixel R31. In the data charging stage T25, the signal ga7_1 on the gate line GA7 is a high level, the transistor in the red sub-pixel R42 is turned on, and the data voltage D5 is input to the red sub-pixel R42 at the same time as a pre-charging voltage so as to pre-charge the red sub-pixel R42.

In a data charging stage T26, the signal ga7_1 is a high level, and the transistor in the red sub-pixel R42 is turned on. The data voltage D5 of the display data corresponding to the red sub-pixel R32 is loaded to the data line DA2, so that the target data voltage D5 is input to the red sub-pixel R42. In the data charging stage T26, the signal ga6_1 on the gate line GA6 is a high level, the transistor in the red sub-pixel R31 is turned on, and the data voltage D5 is input to the red sub-pixel R31 at the same time as a pre-charging voltage so as to pre-charge the red sub-pixel R31. In the data charging stage T26, the signal ga8_1 on the gate line GA8 is a high level, the transistor in the red sub-pixel R41 is turned on, and the data voltage D5 is input to the red sub-pixel R41 at the same time as a pre-charging voltage so as to pre-charge the red sub-pixel R41.

In a data charging stage T27, the signal ga6_1 is a high level, and the transistor in the red sub-pixel R31 is turned on. A data voltage D6 of display data corresponding to the red sub-pixel R31 is loaded to the data line DA2, so that the target data voltage D6 is input to the red sub-pixel R31. In the data charging stage T27, the signal ga8_1 on the gate line GA8 is a high level, the transistor in the red sub-pixel R41 is turned on, and the data voltage D6 is input to the red sub-pixel R41 at the same time as a pre-charging voltage so as to pre-charge the red sub-pixel R41. Subsequent red sub-pixels are pre-charged.

In a data charging stage T28, the signal ga8_1 is a high level, and the transistor in the red sub-pixel R41 is turned on. The data voltage D6 of the display data corresponding to the red sub-pixel R31 is loaded to the data line DA2, so that the target data voltage D6 is input to the red sub-pixel R41. Subsequent red sub-pixels are pre-charged.

The implementations of the remaining sub-pixels are analogized until the sub-pixels in the whole display panel are charged with the target data voltages, which is not repeated here.

Therefore, in the embodiment of the present disclosure, adopting the driving manner of the first gate scanning signals provided by the present disclosure may implement the following that when the current display frame is an (odd number)$^{th}$ display frame in the plurality of consecutive display frames, each sub-pixel is charged with a target data voltage, and every two adjacent sub-pixels in the same column share one target data voltage.

Figure 12:
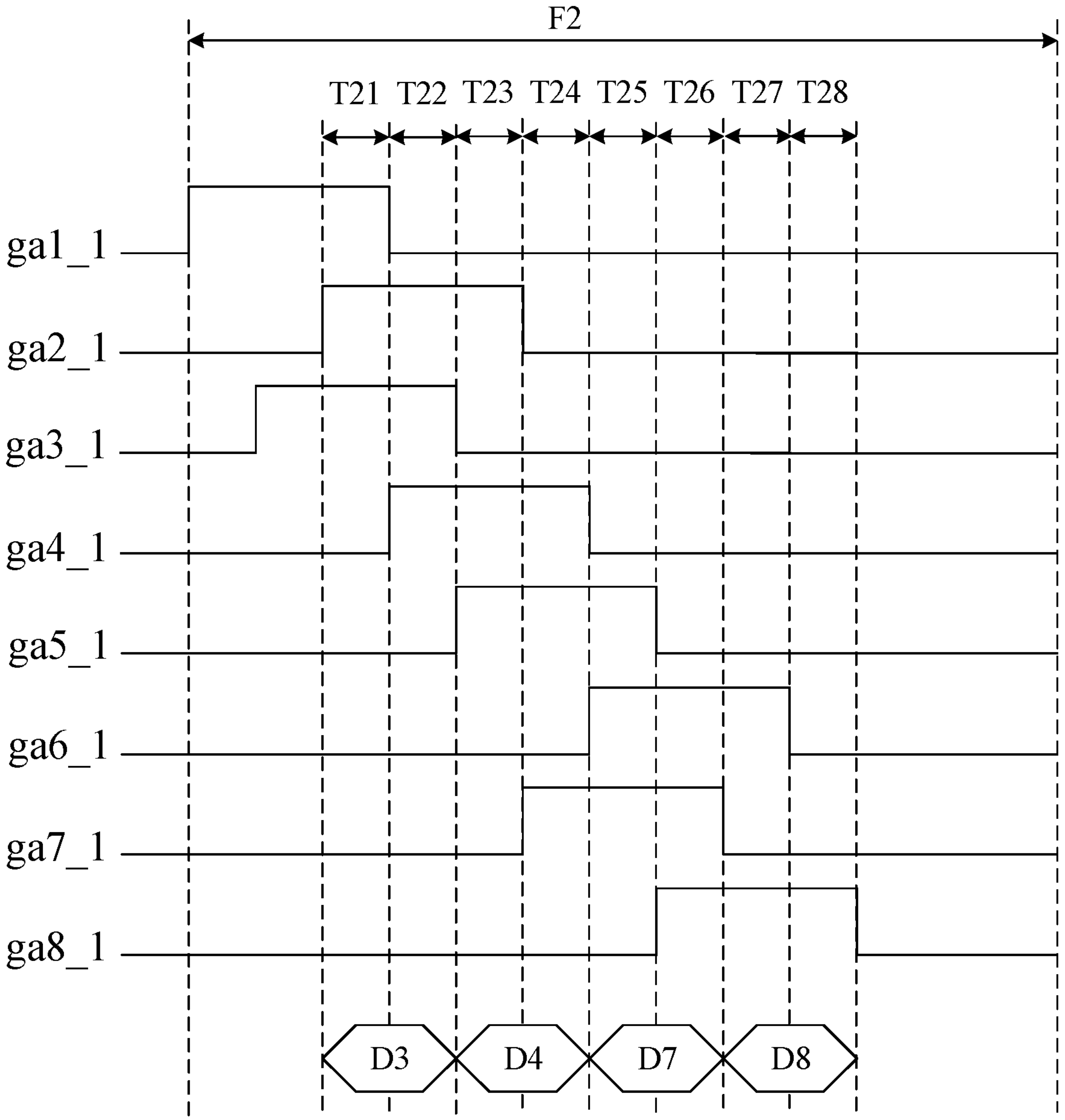
FIG. 12 is a diagram of yet some signal timings in an embodiment of the present disclosure.
Figure 13:
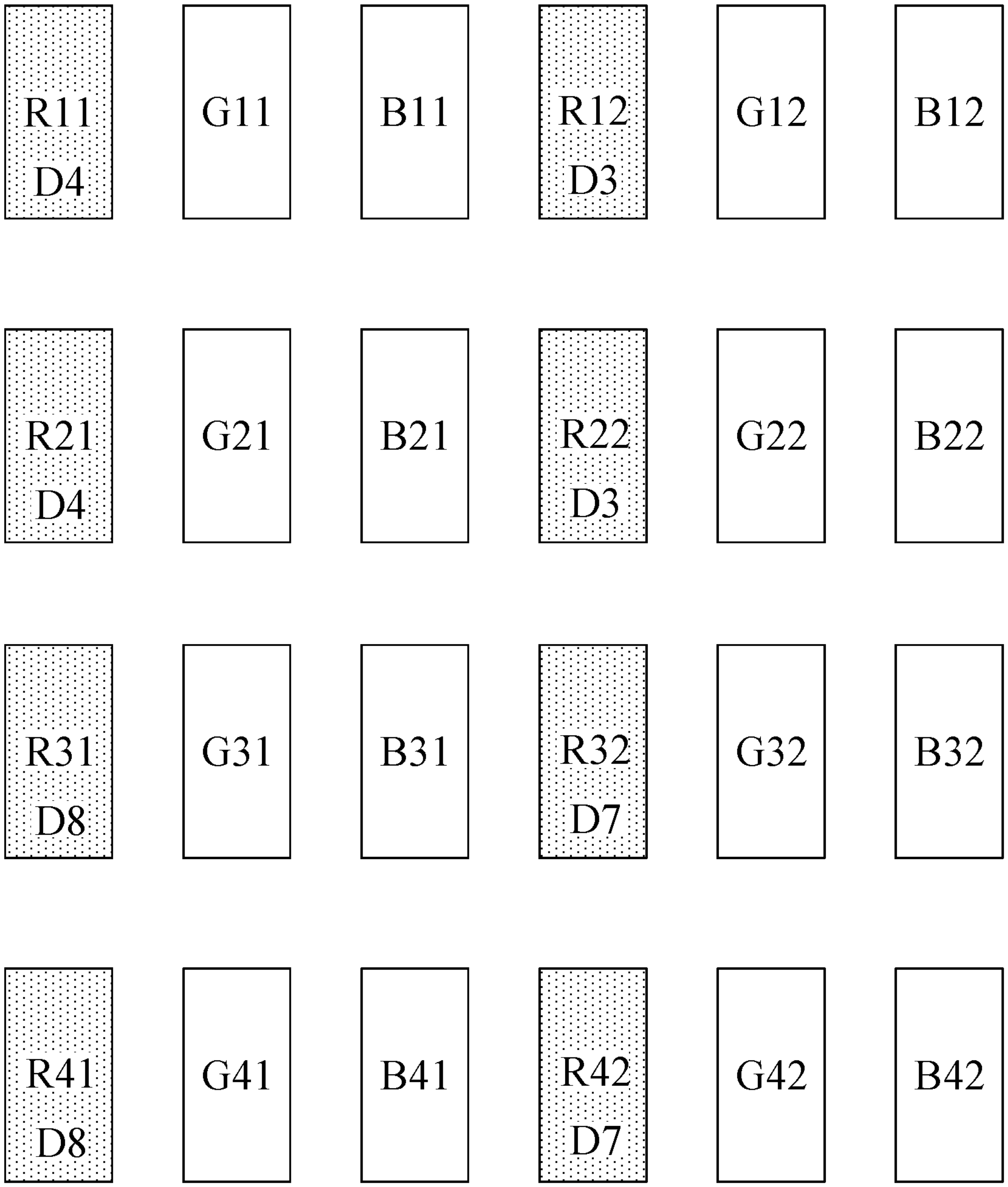
FIG. 13 is a schematic diagram of yet some structures of sub-pixels in a display panel in an embodiment of the present disclosure.

In the following, illustration is made by taking an example that when the current display frame is the second display frame F2 in the plurality of consecutive display frames, the target display data may include the original display data corresponding to the even row of sub-pixels. In combination with FIG. 12 and FIG. 13, an example taken is the original display data corresponding to the red sub-pixels in an even row coupled with the data line DA2. When the first driving mode is adopted, a process of displaying a picture of the display panel may be described as follows.

In the data charging stage T21, the signal ga1_1 is a high level, and the transistor in the red sub-pixel R12 is turned on to load a data voltage D3 of display data corresponding to the red sub-pixel R22 to the data line DA2, so that the target data voltage D3 is input to the red sub-pixel R12. In the data charging stage T21, the signal ga2_1 on the gate line GA2 is a high level, and the transistor in the red sub-pixel R11 is turned on. The data voltage D3 is input to the red sub-pixel R11 at the same time as a pre-charging voltage so as to pre-charge the red sub-pixel R11. In the data charging stage T21, the signal ga3_1 on the gate line GA3 is a high level, the transistor in the red sub-pixel R22 is turned on, and the data voltage D3 is input to the red sub-pixel R22 at the same time as a pre-charging voltage so as to pre-charge the red sub-pixel R22.

In the data charging stage T22, the signal ga3_1 on the gate line GA3 is a high level, the transistor in the red sub-pixel R22 is turned on, and the data voltage D3 is input to the red sub-pixel R22 at the same time as the target data voltage. In the data charging stage T22, the signal ga2_1 is a high level, and the transistor in the red sub-pixel R11 is turned on. The data voltage D3 of the display data corresponding to the red sub-pixel R12 is loaded to the data line DA2, so that the data voltage D2 is input to the red sub-pixel R12 for pre-charging. In the data charging stage T22, the signal ga4_2 on the gate line GA4 is a high level, the transistor in the red sub-pixel R21 is turned on, and the data voltage D3 is input to the red sub-pixel R21 at the same time as a pre-charging voltage so as to pre-charge the red sub-pixel R21.

In the data charging stage T23, the signal ga2_1 is a high level, and the transistor in the red sub-pixel R22 is turned on. A data voltage D4 of display data corresponding to the red sub-pixel R21 is loaded to the data line DA2, so that the target data voltage D4 is input to the red sub-pixel R11. In the data charging stage T23, the signal ga4_1 on the gate line GA4 is a high level, the transistor in the red sub-pixel R21 is turned on, and the data voltage D4 is input to the red sub-pixel R21 at the same time as a pre-charging voltage so as to pre-charge the red sub-pixel R21. In the data charging stage T23, the signal ga5_1 on the gate line GA5 is a high level, the transistor in the red sub-pixel R32 is turned on, and the data voltage D4 is input to the red sub-pixel R32 at the same time as a pre-charging voltage so as to pre-charge the red sub-pixel R32.

In the data charging stage T24, the signal ga4_1 is a high level, and the transistor in the red sub-pixel R21 is turned on. The data voltage D4 of the display data corresponding to the red sub-pixel R21 is loaded to the data line DA2, so that the target data voltage D4 is input to the red sub-pixel R21. In the data charging stage T24, the signal ga5_1 on the gate line GA5 is a high level, the transistor in the red sub-pixel R32 is turned on, and the data voltage D4 is input to the red sub-pixel R32 at the same time as a pre-charging voltage so as to pre-charge the red sub-pixel R32. In the data charging stage T24, the signal ga7_1 on the gate line GA7 is a high level, the transistor in the red sub-pixel R42 is turned on, and the data voltage D4 is input to the red sub-pixel R42 at the same time as a pre-charging voltage so as to pre-charge the red sub-pixel R31.

In the data charging stage T25, the signal ga5_1 is a high level, and the transistor in the red sub-pixel R32 is turned on. A data voltage D7 of display data corresponding to the red sub-pixel R42 is loaded to the data line DA2, so that the target data voltage D7 is input to the red sub-pixel R32. In the data charging stage T25, the signal ga6_1 on the gate line GA6 is a high level, the transistor in the red sub-pixel R31 is turned on, and the data voltage D7 is input to the red sub-pixel R31 at the same time as a pre-charging voltage so as to pre-charge the red sub-pixel R31. In the data charging stage T25, the signal ga7_1 on the gate line GA7 is a high level, the transistor in the red sub-pixel R42 is turned on, and the data voltage D7 is input to the red sub-pixel R42 at the same time as a pre-charging voltage so as to pre-charge the red sub-pixel R42.

In the data charging stage T26, the signal ga7_1 is a high level, and the transistor in the red sub-pixel R42 is turned on. The data voltage D7 of the display data corresponding to the red sub-pixel R42 is loaded to the data line DA2, so that the target data voltage D7 is input to the red sub-pixel R42. In the data charging stage T26, the signal ga6_1 on the gate line GA6 is a high level, the transistor in the red sub-pixel R31 is turned on, and the data voltage D7 is input to the red sub-pixel R31 at the same time as a pre-charging voltage so as to pre-charge the red sub-pixel R31. In the data charging stage T26, the signal ga8_1 on the gate line GA8 is a high level, the transistor in the red sub-pixel R41 is turned on, and the data voltage D7 is input to the red sub-pixel R41 at the same time as a pre-charging voltage so as to pre-charge the red sub-pixel R41.

In the data charging stage T27, the signal ga6_1 is a high level, and the transistor in the red sub-pixel R31 is turned on. A data voltage D8 of display data corresponding to the red sub-pixel R41 is loaded to the data line DA2, so that the target data voltage D8 is input to the red sub-pixel R31. In the data charging stage T27, the signal ga8_1 on the gate line GA8 is a high level, the transistor in the red sub-pixel R41 is turned on, and the data voltage D8 is input to the red sub-pixel R41 at the same time as a pre-charging voltage so as to pre-charge the red sub-pixel R41. Subsequent red sub-pixels are pre-charged.

In a data charging stage T28, the signal ga8_1 is a high level, and the transistor in the red sub-pixel R41 is turned on. The data voltage D8 of the display data corresponding to the red sub-pixel R41 is loaded to the data line DA2, so that the target data voltage D8 is input to the red sub-pixel R41. Subsequent red sub-pixels are pre-charged.

The implementations of the remaining sub-pixels are analogized until the sub-pixels in the whole display panel are charged with the target data voltages, which is not repeated here.

Therefore, in the embodiment of the present disclosure, adopting the driving manner of the first gate scanning signals provided by the present disclosure may implement the following that when the current display frame is an (even number)$^{th}$ display frame in the plurality of consecutive display frames, each sub-pixel is charged with a target data voltage, and every two adjacent sub-pixels in the same column share one target data voltage.

In some embodiments of the present disclosure, loading the first gate scanning signals to the gate lines in the display panel may include: inputting a plurality of different first clock signals to the gate driving circuit in the display panel to load effective pulses in the first clock signals as the effective pulses of the first gate scanning signals to the gate lines. Exemplarily, the timing controller 200 inputs the plurality of different first clock signals to the gate driving circuit in the display panel through the clock signal lines so as to load the effective pulses in the first clock signals as the effective pulses of the first gate scanning signals to the gate lines, so that the gate lines in the display panel may be driven in a non-row-by-row manner so as to turn on the transistors in the sub-pixels.

In some embodiments of the present disclosure, the plurality of different first clock signals may be divided into three clock signal groups. In three adjacent gate line groups, the clock signal output terminal of the shifting register circuit corresponding to the first gate line group is coupled with the first clock signal group in the three clock signal groups, the clock signal output terminal of the shifting register circuit corresponding to the second gate line group is coupled with the second clock signal group in the three clock signal groups, and the clock signal output terminal of the shifting register circuit corresponding to the third gate line group is coupled with the third clock signal group in the three clock signal groups. For example, in combination with FIG. 2, the gate lines GA1-GA4 are the first gate line group, the gate lines GA5-GA8 are the second gate line group, and the gate lines GA9-GA12 are the third gate line group. Gate lines GA13-GA16 are a fourth gate line group, gate lines GA17-GA20 are a fifth gate line group, and gate lines GA21-GA24 are a sixth gate line group. The first gate line group to the third gate line group may be three adjacent gate line groups, and the fourth gate line group to the sixth gate line group may be the other three adjacent gate line groups. In this way, the clock signal output terminals of the shifting register circuits corresponding to the first gate line group and the fourth gate line group may be coupled with the first clock signal group. The clock signal output terminals of the shifting register circuits corresponding to the second gate line group and the fifth gate line group may be coupled with the second clock signal group. The clock signal output terminals of the shifting register circuits corresponding to the third gate line group and the sixth gate line group may be coupled with the third clock signal group.

In some embodiments of the present disclosure, the plurality of different first clock signals may include 12 first clock signals. The 12 first clock signals are divided into three clock signal groups, and in each clock signal group, the effective pulse of each of the first clock signals sequentially occurs according to the order of the $1^{st}$ first clock signal, the $3^{rd}$ first clock signal, the $2^{nd}$ first clock signal and the $4^{th}$ first clock signal. A starting time point of the effective pulse of the $4^{th}$ first clock signal in the first clock signal group is earlier than a starting time point of the effective pulse of the $1^{st}$ first clock signal in the second clock signal group; and a starting time point of the effective pulse of the $4^{th}$ first clock signal in the second clock signal group is earlier than a starting time point of the effective pulse of the $1^{st}$ first clock signal in the third clock signal group. Exemplarily, in combination with FIG. 14, the 12 first clock signals may be ck1_1 to ck12_1 respectively. The first clock signals ck1_1 to ck4_1 are the first clock signal group, the first clock signals ck5_1 to ck8_1 are the second clock signal group, and the first clock signals ck9_1 to ck12_1 are the third clock signal group. In the first clock signal group, ck1_1 is the $1^{st}$ first clock signal, ck3_1 is the $3^{rd}$ first clock signal, ck2_1 is the $2^{nd}$ first clock signal, and ck4_1 is the $4^{th}$ first clock signal. In the second clock signal group, ck5_1 is the $1^{st}$ first clock signal, ck7_1 is the $3^{rd}$ first clock signal, ck6_1 is the $2^{nd}$ first clock signal, and ck8_1 is the $4^{th}$ first clock signal. In the third clock signal group, ck9_1 is the $1^{st}$ first clock signal, ck11_1 is the $3^{rd}$ first clock signal, ck10_1 is the $2^{nd}$ first clock signal, and ck12_1 is the $4^{th}$ first clock signal. In this way, the clock signal output terminals of the shifting register circuits corresponding to the first gate line group and the fourth gate line group may be coupled with the first clock signals ck1_1 to ck4_1 in the first clock signal group. The clock signal output terminals of the shifting register circuits corresponding to the second gate line group and the fifth gate line group may be coupled with the first clock signals ck5_1 to ck8_1 in the second clock signal group. The clock signal output terminals of the shifting register circuits corresponding to the third gate line group and the sixth gate line group may be coupled with the first clock signals ck9_1 to ck12_1 in the third clock signal group.

In some embodiments of the present disclosure, in the same clock signal group, the $1^{st}$ first clock signal and the $4^{th}$ first clock signal are opposite in phase. Exemplarily, in combination with FIG. 14, the first clock signals ck1_1 and ck4_1 are opposite in phase. The first clock signals ck5_1 and ck8_1 are opposite in phase. The first clock signals ck9_1 and ck12_1 are opposite in phase.

In some embodiments of the present disclosure, the clock signals occurring in the same order in the first clock signal group and the second clock signal group differ in phase by $2\pi/3$; and the clock signals occurring in the same order in the second clock signal group and the third clock signal group differ in phase by $2\pi/3$. It should be noted that, in the same clock signal group, the first effective pulses of the different first clock signals have an order in occurring time, and thus the order of the different first clock signals in own clock signal group may be determined according to the order of occurring time of the first effective pulses of the different first clock signals in the own clock signal group.

Figure 14:
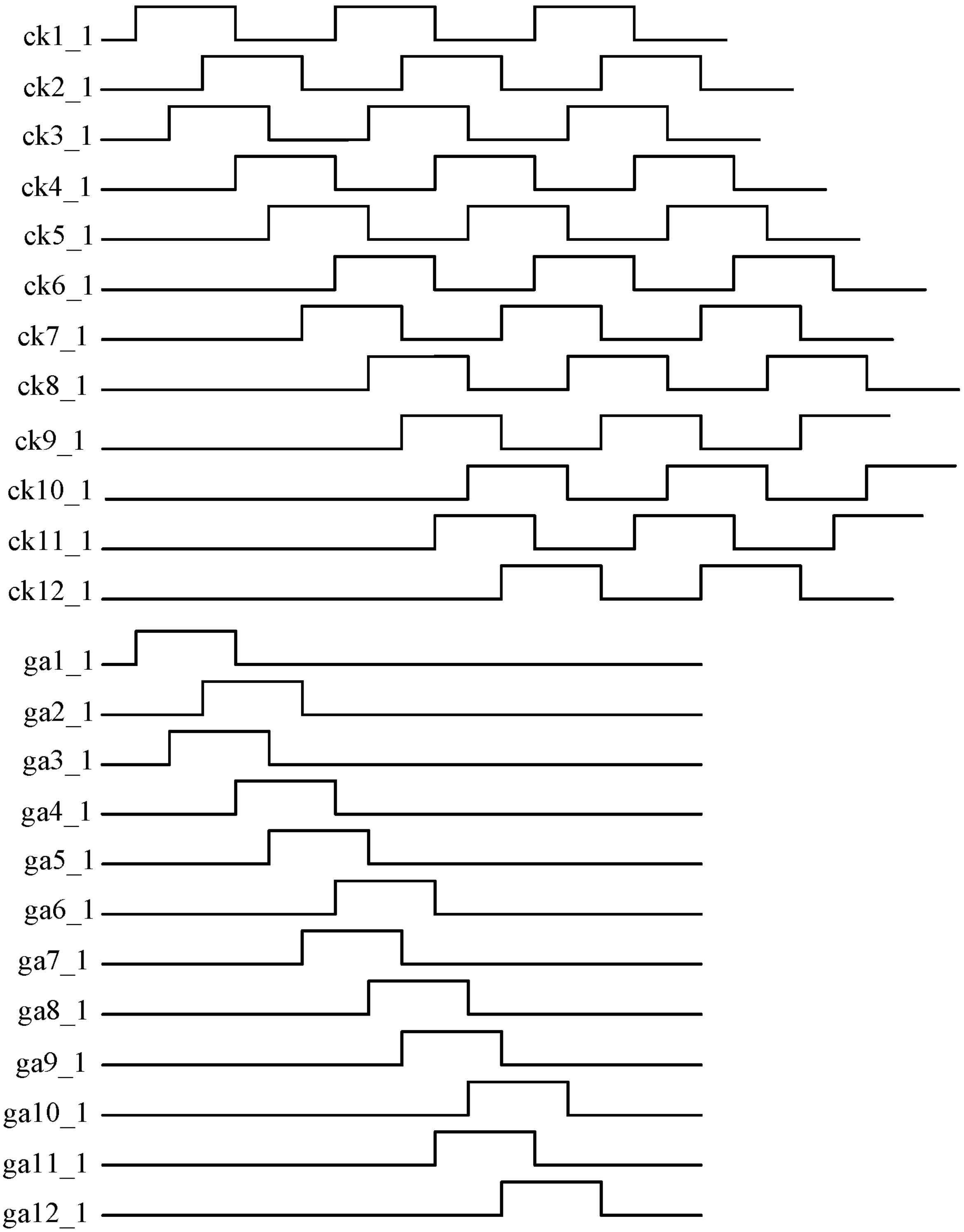
FIG. 14 is a diagram of yet some signal timings in an embodiment of the present disclosure.

Exemplarily, in combination with FIG. 14, the first effective pulse of the first clock signal ck1_1 in the first clock signal group occurs first, then the first effective pulse of the first clock signal ck2_1 in the first clock signal group occurs, then the first effective pulse of the first clock signal ck3_1 in the first clock signal group occurs, and then the first effective pulse of the first clock signal ck4_1 in the first clock signal group occurs. The first effective pulse of the first clock signal ck5_1 in the second clock signal group occurs first, then the first effective pulse of the first clock signal ck6_1 in the second clock signal group occurs, then the first effective pulse of the first clock signal ck7_1 in the second clock signal group occurs, and then the first effective pulse of the first clock signal ck8_1 in the second clock signal group occurs. Thus, the first clock signals ck1_1 and ck5_1 may be timing signals occurring in the same order, the first clock signals ck2_1 and ck6_1 may be timing signals occurring in the same order, the first clock signals ck3_1 and ck7_1 may be timing signals occurring in the same order, and the first clock signals ck4_1 and ck8_1 may be timing signals occurring in the same order.

The first effective pulse of the first clock signal ck5_1 in the second clock signal group occurs first, then the first effective pulse of the first clock signal ck6_1 in the second clock signal group occurs, then the first effective pulse of the first clock signal ck7_1 in the second clock signal group occurs, and then the first effective pulse of the first clock signal ck8_1 in the second clock signal group occurs. The first effective pulse of the first clock signal ck9_1 in the third clock signal group occurs first, then the first effective pulse of the first clock signal ck10_1 in the third clock signal group occurs, then the first effective pulse of the first clock signal ck11_1 in the third clock signal group occurs, and then the first effective pulse of the first clock signal ck12_1 in the third clock signal group occurs. Thus, the first clock signals ck5_1 and ck9_1 may be timing signals occurring in the same order, the first clock signals ck6_1 and ck10_1 may be timing signals occurring in the same order, the first clock signals ck7_1 and ck11_1 may be timing signals occurring in the same order, and the first clock signals ck8_1 and ck12_1 may be timing signals occurring in the same order.

Exemplarily, in combination with FIG. 14, the first clock signal ck1_1 in the first clock signal group and the first clock signal ck5_1 in the second clock signal group may be the clock signals occurring in the same order, and the first clock signals ck1_1 and ck5_1 differ in phase by 2π/3. The first clock signal ck2_1 in the first clock signal group and the first clock signal ck6_1 in the second clock signal group may be the clock signals occurring in the same order, and the first clock signals ck2_1 and ck6_1 differ in phase by 2π/3. The first clock signal ck3_1 in the first clock signal group and the first clock signal ck7_1 in the second clock signal group may be the clock signals occurring in the same order, and the first clock signals ck3_1 and ck7_1 differ in phase by 2π/3. The first clock signal ck4_1 in the first clock signal group and the first clock signal ck8_1 in the second clock signal group may be the clock signals occurring in the same order, and the first clock signals ck4_1 and ck8_1 differ in phase by 2π/3. The first clock signal ck5_1 in the second clock signal group and the first clock signal ck9_1 in the third clock signal group may be the clock signals occurring in the same order, and the first clock signals ck5_1 and ck9_1 differ in phase by 2π/3. The first clock signal ck6_1 in the second clock signal group and the first clock signal ck10_1 in the third clock signal group may be the clock signals occurring in the same order, and the first clock signals ck6_1 and ck10_1 differ in phase by 2π/3. The first clock signal ck7_1 in the second clock signal group and the first clock signal ck11_1 in the third clock signal group may be the clock signals occurring in the same order, and the first clock signals ck7_1 and ck11_1 differ in phase by 2π/3. The first clock signal ck8_1 in the second clock signal group and the first clock signal ck12_1 in the third clock signal group may be the clock signals occurring in the same order, and the first clock signals ck8_1 and ck12_1 differ in phase by 2π/3.

In some embodiments of the present disclosure, each shifting register circuit further has a clock signal controlling terminal. In every three adjacent gate line groups, the clock signal controlling terminal of the shifting register circuit corresponding to the first gate line group is coupled with the 1st first clock signal in the first clock signal group, the clock signal controlling terminal of the shifting register circuit corresponding to the second gate line group is coupled with the 1st first clock signal in the second clock signal group, and the clock signal controlling terminal of the shifting register circuit corresponding to the third gate line group is coupled with the 1st first clock signal in the third clock signal group. Exemplarily, in combination with FIG. 14, the clock signal controlling terminals of the shifting register circuits corresponding to the first gate line group and the fourth gate line group are coupled with the first clock signal ck1_1. The clock signal controlling terminals of the shifting register circuits corresponding to the second gate line group and the fifth gate line group are coupled with the first clock signal ck5_1. The clock signal controlling terminals of the shifting register circuits corresponding to the third gate line group and the sixth gate line group are coupled with the first clock signal ck9_1.

In some embodiments of the present disclosure, one shifting register circuit may be coupled with a plurality of adjacent gate lines. In every three adjacent shifting register circuits, the clock signal output terminal of the first shifting register circuit is coupled with the first clock signal group in the three clock signal groups, the clock signal output terminal of the second shifting register circuit is coupled with the second clock signal group in the three clock signal groups, and the clock signal output terminal of the third shifting register circuit is coupled with the third clock signal group in the three clock signal groups. Exemplarily, in combination with FIG. 14 and FIG. 15, the first clock signal ck1_1 may be loaded to the clock signal line CK1, the first clock signal ck2_1 may be loaded to the clock signal line CK2, the first clock signal ck3_1 may be loaded to the clock signal line CK3, . . . , the first clock signal ck11_1 may be loaded to the clock signal line CK11, and the first clock signal ck12_1 may be loaded to the clock signal line CK12. One shifting register circuit is coupled with four adjacent gate lines. When four gate lines are one gate line group, one shifting register circuit may be coupled with one gate line group. For example, the shifting register circuit SR1 is coupled with the gate lines GA1-GA4, the shifting register circuit SR2 is coupled with the gate lines GA5-GA8, the shifting register circuit SR3 is coupled with the gate lines GA9-GA12, the shifting register circuit SR4 is coupled with the gate lines GA13-GA16, the shifting register circuit SR5 is coupled with the gate lines GA17-GA20. and the shifting register circuit SR6 is coupled with the gate lines GA21-GA24. The clock signal output terminals CLK_1 to CLK_4 of the shifting register circuits SR1 and SR4 are coupled with the first clock signals ck1_1 to ck4_1 in the first clock signal group, the clock signal output terminal CLK_1 is coupled with the first clock signal ck1_1 and the clock signal line CK1, the clock signal output terminal CLK_2 is coupled with the first clock signal ck2_1 and the clock signal line CK2, the clock signal output terminal CLK_3 is coupled with the first clock signal ck3_1 and the clock signal line CK3, and the clock signal output terminal CLK_4 is coupled with the first clock signal ck4_1 and the clock signal line CK4. The clock signal output terminals CLK_1 to CLK_4 of the shifting register circuits SR2 and SR5 are coupled with the first clock signals ck5_1 to ck8_1 in the second clock signal group, the clock signal output terminal CLK_1 is coupled with the first clock signal ck5_1 and the clock signal line CK5, the clock signal output terminal CLK_2 is coupled with the first clock signal ck6_1 and the clock signal line CK6, the clock signal output terminal CLK_3 is coupled with the first clock signal ck7_1 and the clock signal line CK7, and the clock signal output terminal CLK_4 is coupled with the first clock signal ck8_1 and the clock signal line CK8. The clock signal output terminals CLK_1 to CLK_4 of the shifting register circuits SR3 and SR6 are coupled with the first clock signals ck9_1 to ck12_1 in the third clock signal group, the clock signal output terminal CLK_1 is coupled with the first clock signal ck9_1 and the clock signal line CK9, the clock signal output terminal CLK_2 is coupled with the first clock signal ck10_1 and the clock signal line CK10, the clock signal output terminal CLK_3 is coupled with the first clock signal ck11_1 and the clock signal line CK11, and the clock signal output terminal CLK_4 is coupled with the first clock signal ck12_1 and the clock signal line CK12.

In some embodiments of the present disclosure, each shifting register circuit further has a clock signal controlling terminal. In every three adjacent shifting register circuits, the clock signal controlling terminal of the first shifting register circuit is coupled with the 1st first clock signal in the first clock signal group, the clock signal controlling terminal of the second shifting register circuit is coupled with the 1st first clock signal in the second clock signal group, and the clock signal controlling terminal of the third shifting register circuit is coupled with the 1st first clock signal in the third clock signal group. Exemplarily, in combination with FIG. 15, the clock signal controlling terminals CLK_C of the shifting register circuits SR1 and SR4 are coupled with the first clock signal ck1_1 in the first clock signal group and the clock signal line CK1. The clock signal controlling terminals CLK_C of the shifting register circuits SR2 and SR5 are coupled with the first clock signal ck5_1 in the second clock signal group and the clock signal line CK5. The clock signal controlling terminals CLK_C of the shifting register circuits SR3 and SR6 are coupled with the first clock signal ck9_1 in the third clock signal group and the clock signal line CK9.

Figure 15:
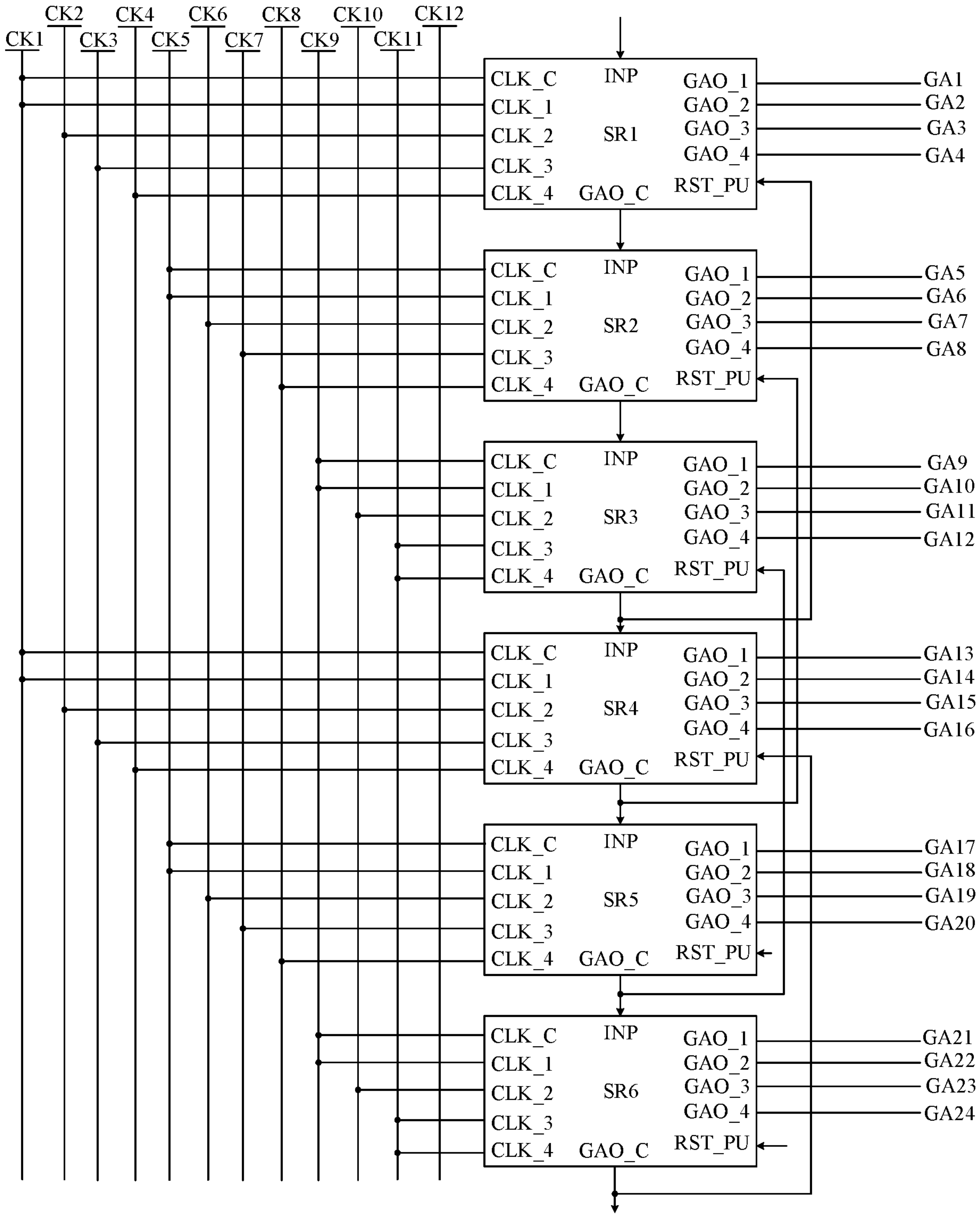
FIG. 15 is a schematic diagram of some other structures of a gate driving circuit in an embodiment of the present disclosure.

Exemplarily, as shown in FIG. 15, in every two adjacent shifting register circuits, GAO_C of the first shifting register circuit is coupled with an input signal terminal INP of the second shifting register circuit. In every three adjacent shifting register circuits. GAO_C of the third shifting register circuit is coupled with a reset signal terminal RST_PU of the first shifting register circuit.

Exemplarily, in the second driving mode, a signal sequence diagram corresponding to the gate driving circuit shown in FIG. 15 is as shown in FIG. 14. The shifting register circuit SR1 may output the first high level of the first clock signal ck1_1 to the gate line GA1 to generate a high level in the signal ga1_1. The shifting register circuit SR1 may output the first high level of the first clock signal ck2_1 to the gate line GA2 to generate a high level in the signal ga2_1. The shifting register circuit SR1 may output the first high level of the first clock signal ck3_1 to the gate line GA3 to generate a high level in the signal ga3_1. The shifting register circuit SR1 may output the first high level of the first clock signal ck4_1 to the gate line GA4 to generate a high level in the signal ga4_1.

The shifting register circuit SR2 may output the first high level of the first clock signal ck5_1 to the gate line GA5 to generate a high level in the signal ga5_1. The shifting register circuit SR2 may output the first high level of the first clock signal ck6_1 to the gate line GA6 to generate a high level in the signal ga6_1. The shifting register circuit SR2 may output the first high level of the first clock signal ck7_1 to the gate line GA7 to generate a high level in the signal ga7_1. The shifting register circuit SR2 may output the first high level of the first clock signal ck8_1 to the gate line GA8 to generate a high level in the signal ga8_1.

The shifting register circuit SR3 may output the first high level of the first clock signal ck9_1 to the gate line GA9 to generate a high level in the signal ga9_1. The shifting register circuit SR3 may output the first high level of the first clock signal ck10_1 to the gate line GA10 to generate a high level in the signal ga10_1. The shifting register circuit SR3 may output the first high level of the first clock signal ck11_1 to the gate line GA11 to generate a high level in the signal ga11_1. The shifting register circuit SR3 may output the first high level of the first clock signal ck12_1 to the gate line GA12 to generate a high level in the signal ga12_1.

The shifting register circuit SR4 may output the second high level of the first clock signal ck1_1 to the gate line GA13 to generate a high level in the second gate scanning signal on the gate line GA13. The shifting register circuit SR4 may output the second high level of the first clock signal ck2_1 to the gate line GA14 to generate a high level in the second gate scanning signal on the gate line GA14. The shifting register circuit SR4 may output the second high level of the first clock signal ck3_1 to the gate line GA15 to generate a high level in the second gate scanning signal on the gate line GA15. The shifting register circuit SR4 may output the second high level of the first clock signal ck4_1 to the gate line GA16 to generate a high level in the second gate scanning signal on the gate line GA16.

The shifting register circuit SR5 may output the second high level of the first clock signal ck5_1 to the gate line GA17 to generate a high level in the second gate scanning signal on the gate line GA17. The shifting register circuit SR5 may output the second high level of the first clock signal ck6_1 to the gate line GA18 to generate a high level in the second gate scanning signal on the gate line GA18. The shifting register circuit SR5 may output the second high level of the first clock signal ck7_1 to the gate line GA19 to generate a high level in the second gate scanning signal on the gate line GA19. The shifting register circuit SR5 may output the second high level of the first clock signal ck8_1 to the gate line GA20 to generate a high level in the second gate scanning signal on the gate line GA20.

The shifting register circuit SR6 may output the second high level of the first clock signal ck9_1 to the gate line GA21 to generate a high level in the second gate scanning signal on the gate line GA21. The shifting register circuit SR6 may output the second high level of the first clock signal ck10_1 to the gate line GA22 to generate a high level in the second gate scanning signal on the gate line GA22. The shifting register circuit SR6 may output the second high level of the first clock signal ck11_1 to the gate line GA23 to generate a high level in the second gate scanning signal on the gate line GA23. The shifting register circuit SR6 may output the second high level of the first clock signal ck12_1 to the gate line GA24 to generate a high level in the second gate scanning signal on the gate line GA24.

That is, a pulse corresponding to the high level of each first clock signal may be an effective pulse thereof, and a pulse corresponding to a low level may be an ineffective pulse thereof. Of course, when shifting registers output the low levels of the first clock signals to generate a low-level signal, in the signal, for controlling the transistors to be turned on, the pulses corresponding to the low levels of the first clock signals may be used as the effective pulses thereof, and the pulses corresponding to the high levels may be used as the ineffective pulses thereof.

Exemplarily, in the first driving mode, a signal sequence diagram corresponding to the gate driving circuit shown in FIG. 15 is as shown in FIG. 4. The shifting register circuit SR1 may output the first high level of the second clock signal ck1_2 to the gate line GA1 to generate a high level in the signal ga1_2. The shifting register circuit SR1 may output the first high level of the second clock signal ck2_2 to the gate line GA2 to generate a high level in the signal ga2_2. The shifting register circuit SR1 may output the first high level of the second clock signal ck3_2 to the gate line GA3 to generate a high level in the signal ga3_2. The shifting register circuit SR1 may output the first high level of the second clock signal ck4_2 to the gate line GA4 to generate a high level in the signal ga4_2.

The shifting register circuit SR2 may output the first high level of the second clock signal ck5_2 to the gate line GA5 to generate a high level in the signal ga5_2. The shifting register circuit SR2 may output the first high level of the second clock signal ck6_2 to the gate line GA6 to generate a high level in the signal ga6_2. The shifting register circuit SR2 may output the first high level of the second clock signal ck7_2 to the gate line GA7 to generate a high level in the signal ga7_2. The shifting register circuit SR2 may output the first high level of the second clock signal ck8_2 to the gate line GA8 to generate a high level in the signal ga8_2.

The shifting register circuit SR3 may output the first high level of the second clock signal ck9_2 to the gate line GA9 to generate a high level in the signal ga9_2. The shifting register circuit SR3 may output the first high level of the second clock signal ck10_2 to the gate line GA10 to generate a high level in the signal ga10_2. The shifting register circuit SR3 may output the first high level of the second clock signal ck11_2 to the gate line GA11 to generate a high level in the signal ga11_2. The shifting register circuit SR3 may output the first high level of the second clock signal ck12_2 to the gate line GA12 to generate a high level in the signal ga12_2.

The shifting register circuit SR4 may output the second high level of the second clock signal ck1_2 to the gate line GA13 to generate a high level in the second gate scanning signal on the gate line GA13. The shifting register circuit SR4 may output the second high level of the second clock signal ck2_2 to the gate line GA14 to generate a high level in the second gate scanning signal on the gate line GA14. The shifting register circuit SR4 may output the second high level of the second clock signal ck3_2 to the gate line GA15 to generate a high level in the second gate scanning signal on the gate line GA15. The shifting register circuit SR4 may output the second high level of the second clock signal ck4_2 to the gate line GA16 to generate a high level in the second gate scanning signal on the gate line GA16.

The shifting register circuit SR5 may output the second high level of the second clock signal ck5_2 to the gate line GA17 to generate a high level in the second gate scanning signal on the gate line GA17. The shifting register circuit SR5 may output the second high level of the second clock signal ck6_2 to the gate line GA18 to generate a high level in the second gate scanning signal on the gate line GA18. The shifting register circuit SR5 may output the second high level of the second clock signal ck7_2 to the gate line GA19 to generate a high level in the second gate scanning signal on the gate line GA19. The shifting register circuit SR5 may output the second high level of the second clock signal ck8_2 to the gate line GA20 to generate a high level in the second gate scanning signal on the gate line GA20.

The shifting register circuit SR6 may output the second high level of the second clock signal ck9_2 to the gate line GA21 to generate a high level in the second gate scanning signal on the gate line GA21. The shifting register circuit SR6 may output the second high level of the second clock signal ck10_2 to the gate line GA22 to generate a high level in the second gate scanning signal on the gate line GA22. The shifting register circuit SR6 may output the second high level of the second clock signal ck11_2 to the gate line GA23 to generate a high level in the second gate scanning signal on the gate line GA23. The shifting register circuit SR6 may output the second high level of the second clock signal ck12_2 to the gate line GA24 to generate a high level in the second gate scanning signal on the gate line GA24.

That is, a pulse corresponding to the high level of each second clock signal may be an effective pulse thereof, and a pulse corresponding to a low level may be an ineffective pulse thereof. Of course, when shifting registers output the low levels of the second clock signals to generate a low-level signal, in the signal, for controlling the transistors to be turned on, the pulses corresponding to the low levels of the second clock signals may be used as the effective pulses thereof, and the pulses corresponding to the high levels may be used as the ineffective pulses thereof.

Figure 16:
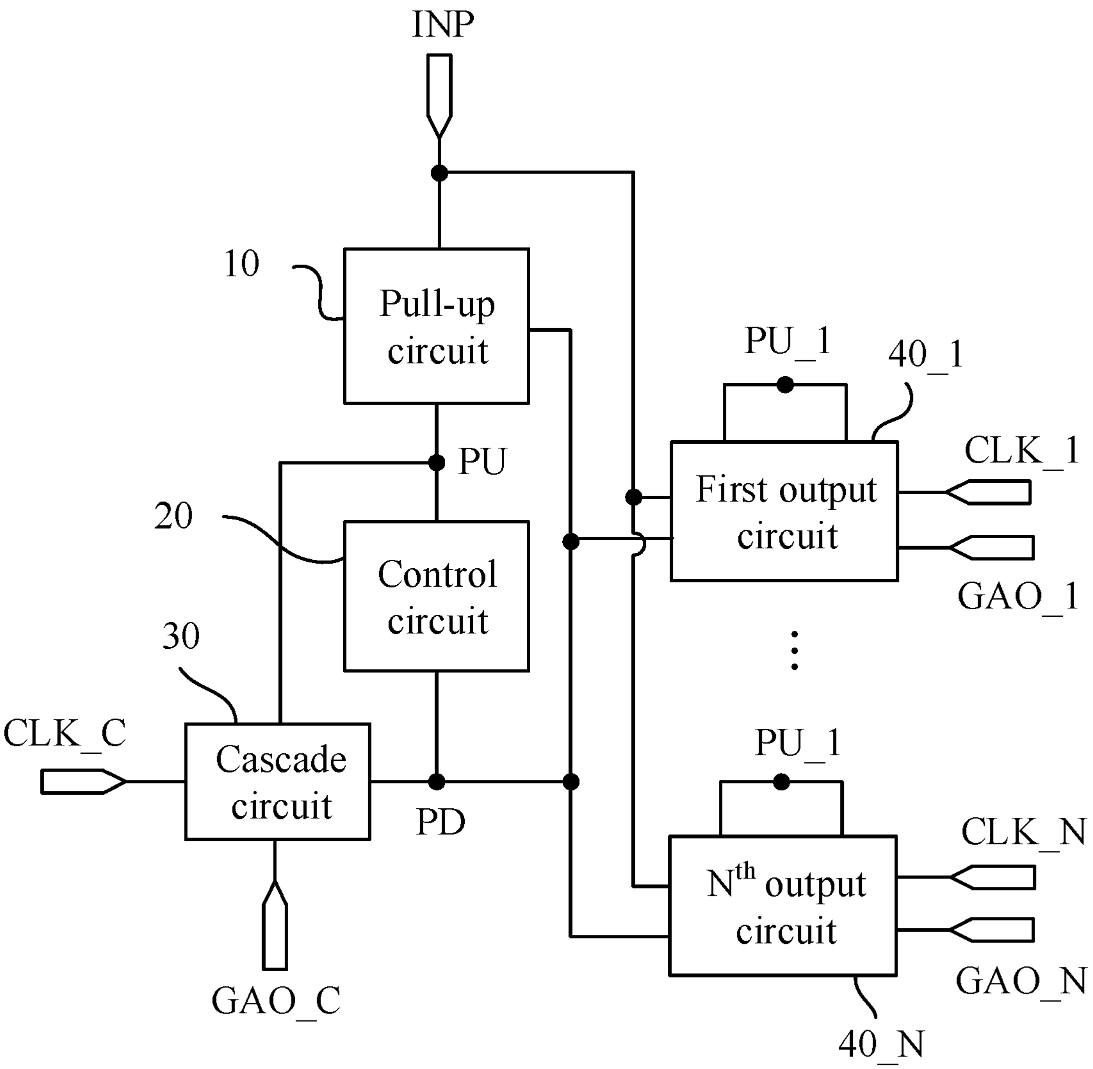
FIG. 16 is a schematic diagram of some structures of a shifting register circuit in an embodiment of the present disclosure.

In some embodiments of the present disclosure, as shown in FIG. 16, each shifting register circuit may include: a pull-up circuit 10, a control circuit 20, a cascade circuit 30 and N output circuits 40.

The pull-up circuit 10 is connected to the input signal terminal INP, a master pull-up node PU and a pull-down node PD of the shifting register circuit, and the pull-up circuit 10 is configured to provide a signal of the input signal terminal INP to the master pull-up node PU and pull-down. under the control of a potential of the pull-down node PD, a potential of the master pull-up node PU.

The control circuit 20 is connected to the master pull-up node PU and the pull-down node PD, and the control circuit 20 is configured to control the potential of the pull-down node PD according to the potential of the master pull-up node PU.

The cascade circuit 30 is connected to the master pull-up node PU, the pull-down node PD and GAO_C and the clock signal controlling terminal CLK_C of the shifting register circuit. and the cascade circuit 30 is configured to provide a signal of the clock signal controlling terminal CLK_C to GAO_C under the control of the potential of the master pull-up node PU and pull-down the potential of GAO_C under the control of the potential of the pull-down node PD.

The N output circuits 40 are connected to the input signal terminal INP, the pull-down node PD as well as N clock signal output terminals (e.g. CLK_1 to CLK_N in FIG. 16). N sub-pull-up nodes (e.g. PU_1 to PU_N in FIG. 16) and N output signal terminals (e.g. GAO_1 to GAO_N in FIG. 16) of the shifting register circuit respectively. The $n^{th}$ output circuit 40_n is connected to the input signal terminal INP, the pull-down node PD, the $n^{th}$ output signal terminal GAO_n and the $n^{th}$ sub-pull-up node PU_n, and is configured to input a signal of the input signal terminal INP to the $n^{th}$ sub-pull-up node PU_n, provide a signal of the $n^{th}$ clock signal output terminal CLK_n to the $n^{th}$ output signal terminal GAO_n under the control of a potential of the $n^{th}$ sub-pull-up node PU_n and pull-down a potential of the $n^{th}$ output signal terminal GAO_n under the control of a potential of the pull-down node PD. Herein, N is an integer greater than 1. n is an integer, and $1<n<N$. In some embodiments, $2 \leq N \leq 8$, for example, N may be 2, 4, 5 or 6.

Figure 17:
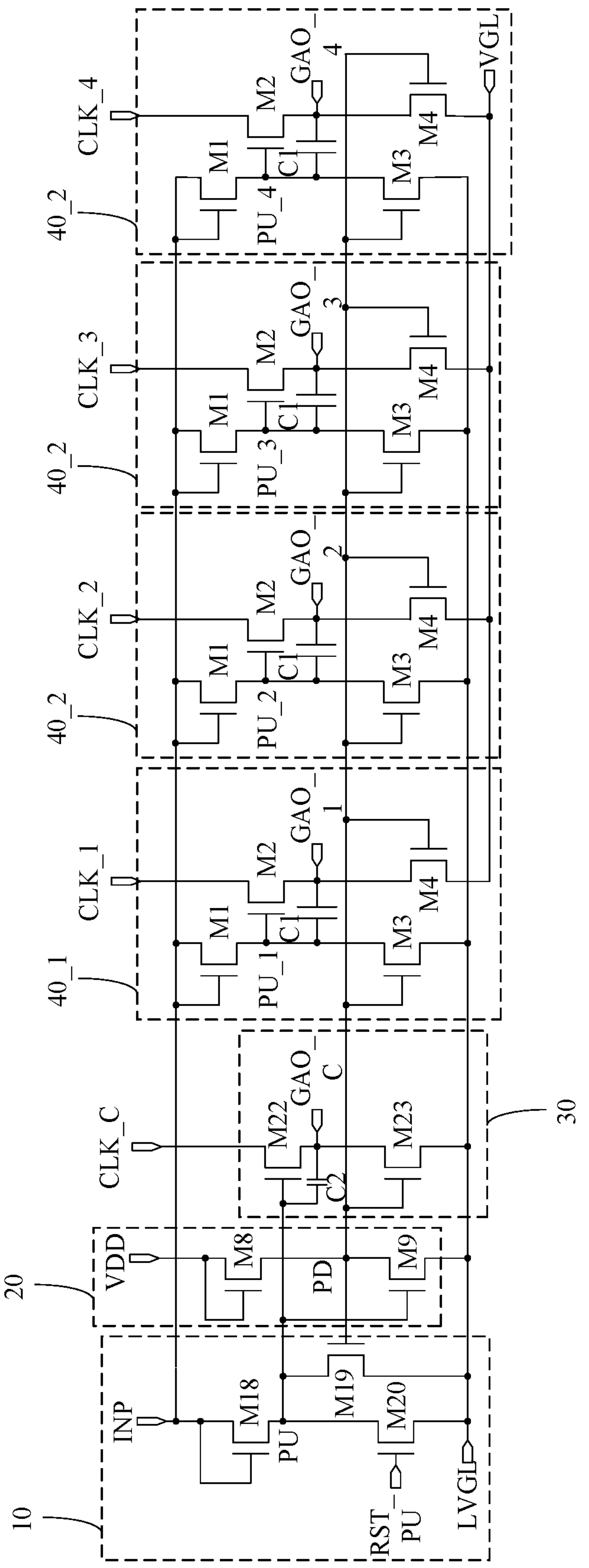
FIG. 17 is a schematic diagram of some specific structures of a shifting register circuit in an embodiment of the present disclosure.

In some embodiments of the present disclosure, N may be equal to 4, so that one gate driving circuit may be coupled with four gate lines. Thus, each shifting register circuit includes four output circuits, four clock signal output terminals CLK1_1 to CLK_4, four output signal terminals GAO_1 to GAO_4 and four sub-pull-up nodes PU_1 to PU_4. As shown in FIG. 17, the four output circuits included in the shifting register circuit may be the first output circuit 40_1, the second output circuit 40_2, the third output circuit 40_3 and the fourth output circuit 40_4. Each shifting register circuit further includes the first clock signal output terminal CLK_1 to the fourth clock signal output terminal CLK_4, the first output signal terminal GAO_1 to the fourth output signal terminal GAO_4, and the first output pull-up node PU_1 to the fourth output pull-up node PU_4. Each output circuit is connected with one clock signal output terminal, one output signal terminal and one sub-pull-up node corresponding to the output circuit. For example, the first output circuit 40_1 is connected with the first clock signal output terminal CLK_1, the first output signal terminal GAO_1 and the first output pull-up node PU_1, the second output circuit 40_2 is connected with the second clock signal output terminal CLK_2, the second output signal terminal GAO_2 and the second output pull-up node PU_2, and so on.

In some embodiments of the present disclosure, as shown in FIG. 17, the pull-up circuit 10 includes an eighteenth transistor M18, a nineteenth transistor M19 and a twentieth transistor M20. A gate and a first electrode of the eighteenth transistor M18 are connected to the input signal terminal INP, and a second electrode of the eighteenth transistor M18 is connected to the master pull-up node PU. Optionally, for the plurality of cascade shifting register circuits, the input signal terminal INP may be connected with GAO_C, i.e., a cascade output terminal. Of course, in the present embodiment, the gate and the first electrode of the eighteenth transistor M18 are electrically connected together or may not be connected together, for example, the gate is connected with GAO_C, the first electrode is connected with a direct current signal, such as a VGH signal, that may turn on the eighteenth transistor which is not limited here. A gate of the nineteenth transistor M19 is connected to the pull-down node, a first electrode of the nineteenth transistor M19 is connected to a reference signal terminal (e.g. a first reference signal terminal LVGL) of the shifting register circuit, and a second electrode of the nineteenth transistor M19 is connected to the master pull-up node PU. A gate of the twentieth transistor M20 is connected to the reset signal terminal RST_PU of the shifting register circuit, a first electrode of the twentieth transistor M20 is connected to the reference signal terminal (e.g. the first reference signal terminal LVGL), and a second electrode of the twentieth transistor M20 is connected to the master pull-up node PU.

In some embodiments of the present disclosure, as shown in FIG. 17, the control circuit 20) may include an eighth transistor M8 and a ninth transistor M9. A gate and a first electrode of the eighth transistor M8 are connected to a power signal terminal VDD of the shifting register circuit, and a second electrode of the eighth transistor M8 is connected to the pull-down node PD. A gate of the ninth transistor M9 is connected to the master pull-up node PU, a first electrode of the ninth transistor M9 is connected to the reference signal terminal (e.g. the first reference signal terminal LVGL) of the shifting register circuit, and a second electrode of the ninth transistor M9 is connected to the pull-down node PD.

In some embodiments of the present disclosure, as shown in FIG. 17, the cascade circuit 30 may include a twenty-second transistor M22, a twenty-third transistor M23 and a second capacitor C2. A gate of the twenty-second transistor M22 is connected to the master pull-up node PU, a first electrode of the twenty-second transistor M22 is connected to the clock signal controlling terminal CLK_C, and a second electrode of the twenty-second transistor M22 is connected to GAO_C. A gate of the twenty-third transistor M23 is connected to the pull-down node PD, a first electrode of the twenty-third transistor M23 is connected to the reference signal terminal (e.g. the first reference signal terminal LVGL) of the shifting register circuit, and a second electrode of the twenty-third transistor M23 is connected to GAO_C. A first terminal of the second capacitor C2 is connected to the gate of the twenty-second transistor M22, and a second terminal of the second capacitor C2 is connected to GAO_C.

In some embodiments of the present disclosure, as shown in FIG. 17, in the first output circuit 40_1, an input sub-circuit 401 may include a first transistor M1, a second transistor M2, a third transistor M3, a fourth transistor M4 and a first capacitor C1. A gate of the first transistor M1 and a first electrode of the first transistor M1 are connected to the input signal terminal INP, and a second electrode of the first transistor M1 is connected to the first sub-pull-up node PU_1. A gate of the second transistor M2 is connected to the first sub-pull-up node PU_1, a first electrode of the second transistor M2 is connected to the first clock signal output terminal CLK_1, and a second electrode of the second transistor M2 is connected to the first output signal terminal GAO_1. A gate of the third transistor M3 is connected to the pull-down node PD, a first electrode of the third transistor M3 is connected to the reference signal terminal (e.g. the first reference signal terminal LVGL) of the shifting register circuit, and a second electrode of the third transistor M3 is connected to the first sub-pull-up node PU_1. A gate of the fourth transistor M4 is connected to the pull-down node PD, a first electrode of the fourth transistor M4 is connected to the reference signal terminal (e.g. a second reference signal terminal VGL) of the shifting register circuit, and a second electrode of the fourth transistor M4 is connected to the first output signal terminal GAO_1. A first terminal of the first capacitor C1 is connected to the first sub-pull-up node PU_1, and a second terminal of the first capacitor C1 is connected to the first output signal terminal GAO_1.

The second output circuit 40_2 has a structure similar to the first output circuit 40_1, and the difference is that the second output circuit is connected with the second sub-pull-up node PU_2, the second clock signal output terminal CLK_2 and the second output signal terminal GAO_2. As shown in FIG. 17, in the second output circuit 40_2, the gate of the first transistor M1 and the first electrode of the first transistor M1 are connected to the input signal terminal INP, and the second electrode of the first transistor M1 is connected to the second sub-pull-up node PU_2. The gate of the second transistor M2 is connected to the second sub-pull-up node PU_2, the first electrode of the second transistor M2 is connected to the second clock signal output terminal CLK_2, and the second electrode of the second transistor M2 is connected to the second output signal terminal GAO_2. The first terminal of the first capacitor C1 is connected to the second sub-pull-up node PU_2, and the second terminal of the first capacitor C1 is connected to the second output signal terminal GAO_2. The gate of the third transistor M3 is connected to the pull-down node PD, the first electrode of the third transistor M3 is connected to the first reference signal terminal LVGL, and the second electrode of the third transistor M3 is connected to the second sub-pull-up node PU_2. The gate of the fourth transistor M4 is connected to the pull-down node PD, the first electrode of the fourth transistor M4 is connected to the second reference signal terminal VGL, and the second electrode of the fourth transistor M4 is connected to the second output signal terminal GAO_2.

The third output circuit 40_3 has a structure similar to the first output circuit 40_1, and the difference is that the third output circuit is connected with the third sub-pull-up node PU_3. the third clock signal output terminal CLK_3 and the third output signal terminal GAO_3. As shown in FIG. 17, in the third output circuit 40_3, the gate of the first transistor M1 and the first electrode of the first transistor M1 are connected to the input signal terminal INP, and the second electrode of the first transistor M1 is connected to the third sub-pull-up node PU_3. The gate of the second transistor M2 is connected to the third sub-pull-up node PU_3, the first electrode of the second transistor M2 is connected to the third clock signal output terminal CLK_3, and the second electrode of the second transistor M2 is connected to the third output signal terminal GAO_3. The first terminal of the first capacitor C1 is connected to the third sub-pull-up node PU_3, and the second terminal of the first capacitor C1 is connected to the third output signal terminal GAO_3. The gate of the third transistor M3 is connected to the pull-down node PD, the first electrode of the third transistor M3 is connected to the first reference signal terminal LVGL, and the second electrode of the third transistor M3 is connected to the third sub-pull-up node PU_3. The gate of the fourth transistor M4 is connected to the pull-down node PD, the first electrode of the fourth transistor M4 is connected to the second reference signal terminal VGL, and the second electrode of the fourth transistor M4 is connected to the third output signal terminal GAO_3.

The fourth output circuit 40_4 has a structure similar to the first output circuit 40_1, and the difference is that the fourth output circuit is connected with the fourth sub-pull-up node PU_4, the fourth clock signal output terminal CLK_4 and the fourth output signal terminal GAO_4. As shown in FIG. 17, in the fourth output circuit 40_4, the gate of the first transistor M1 and the first electrode of the first transistor M1 are connected to the input signal terminal INP, and the second electrode of the first transistor M1 is connected to the fourth sub-pull-up node PU_4. The gate of the second transistor M2 is connected to the fourth sub-pull-up node PU_4, the first electrode of the second transistor M2 is connected to the fourth clock signal output terminal CLK_4, and the second electrode of the second transistor M2 is connected to the fourth output signal terminal GAO_4. The first terminal of the first capacitor C1 is connected to the fourth sub-pull-up node PU_4, and the second terminal of the first capacitor C1 is connected to the fourth output signal terminal GAO_4. The gate of the third transistor M3 is connected to the pull-down node PD, the first electrode of the third transistor M3 is connected to the first reference signal terminal LVGL, and the second electrode of the third transistor M3 is connected to the fourth sub-pull-up node PU_4. The gate of the fourth transistor M4 is connected to the pull-down node PD, the first electrode of the fourth transistor M4 is connected to the second reference signal terminal VGL, and the second electrode of the fourth transistor M4 is connected to the fourth output signal terminal GAO_4.

In combination with FIG. 14, FIG. 15 and FIG. 17, when a signal timing shown in FIG. 14 is input to the gate driving circuit, the output signal terminal GAO_1 of the shifting register circuit SR1 may output the signal ga1_1, the output signal terminal GAO_2 may output the signal ga2_1. the output signal terminal GAO_3 may output the signal ga3_1, and the output signal terminal GAO_4 may output the signal ga4_1. The output signal terminal GAO_1 of the shifting register circuit SR2 may output the signal ga5_1, the output signal terminal GAO_2 may output the signal ga6_1, the output signal terminal GAO_3 may output the signal ga7_1, and the output signal terminal GAO_4 may output the signal ga8_1. The output signal terminal GAO_1 of the shifting register circuit SR3 may output the signal ga9_1, the output signal terminal GAO_2 may output the signal ga10_1, the output signal terminal GAO_3 may output the signal ga11_1, and the output signal terminal GAO_4 may output the signal ga12_1. The remaining is in the same way, which is not repeated here.

In combination with FIG. 4, FIG. 15 and FIG. 17, when a signal timing shown in FIG. 4 is input to the gate driving circuit, the output signal terminal GAO_1 of the shifting register circuit SR1 may output the signal ga1_2, the output signal terminal GAO_2 may output the signal ga2_2, the output signal terminal GAO_3 may output the signal ga3_2, and the output signal terminal GAO_4 may output the signal ga4_2. The output signal terminal GAO_1 of the shifting register circuit SR2 may output the signal ga5_2, the output signal terminal GAO_2 may output the signal ga6_2, the output signal terminal GAO_3 may output the signal ga7_2, and the output signal terminal GAO_4 may output the signal ga8_2. The output signal terminal GAO_1 of the shifting register circuit SR3 may output the signal ga9_2, the output signal terminal GAO_2 may output the signal ga10_2, the output signal terminal GAO_3 may output the signal ga11_2, and the output signal terminal GAO_4 may output the signal ga12_2. The remaining is in the same way, which is not repeated here.

In the embodiment of the present disclosure, through combination with the shifting register circuits, the gate driving circuit may implement working processes corresponding to the signal sequence diagram shown in FIG. 4 and FIG. 14, and the specific process is not repeated here. Of course, in practical applications, shifting register circuits of other structures may also be adopted to implement the working processes corresponding to the signal sequence diagram shown in FIG. 4 and FIG. 14, which is not limited here.

Figure 18:
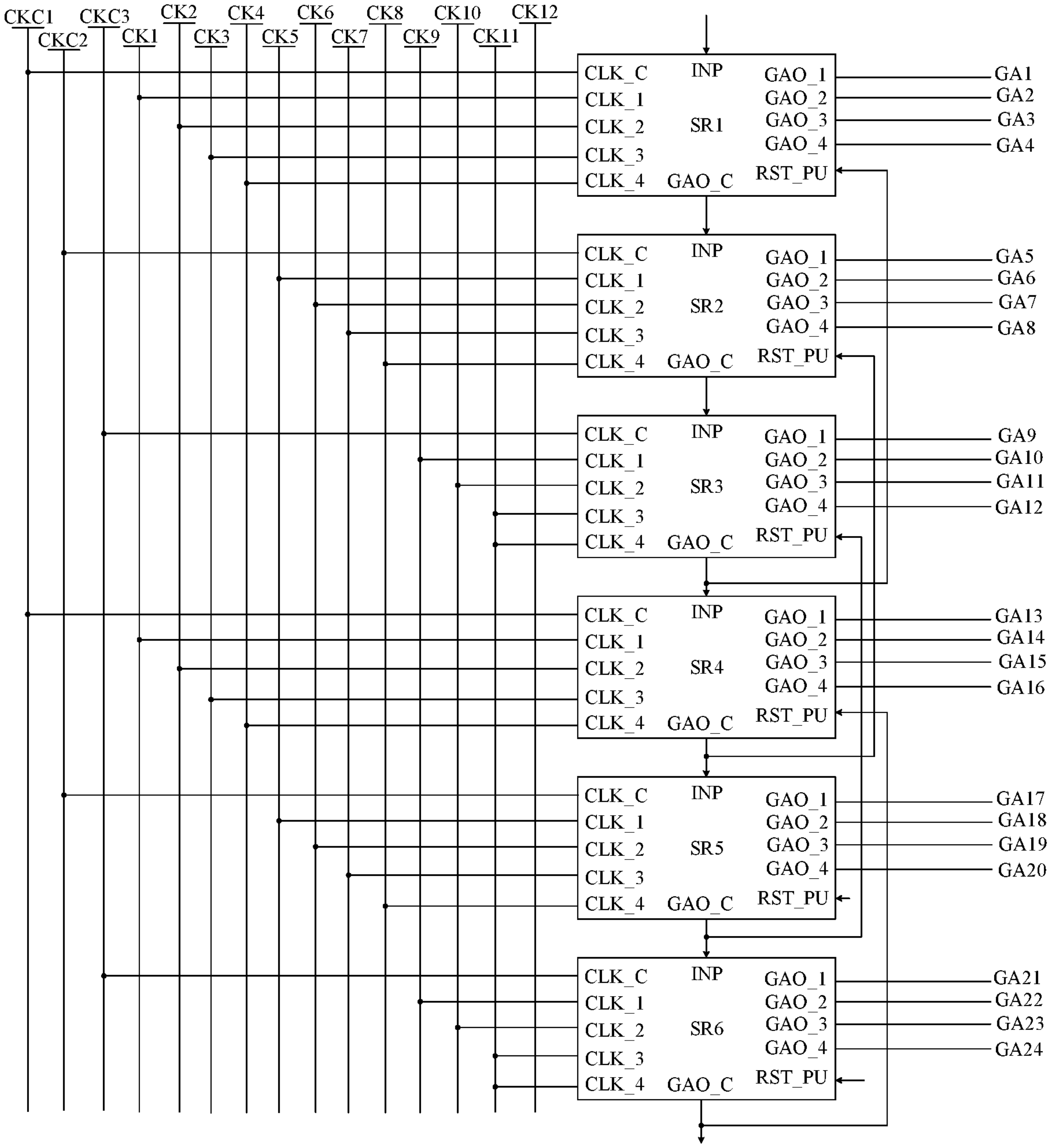
FIG. 18 is a schematic diagram of yet some structures of a gate driving circuit in an embodiment of the present disclosure.

An embodiment of the present disclosure provides other implementations, and as shown in FIG. 18, transformation is performed on the implementations in the above embodiments. Only the difference between the present embodiment and the above embodiments is explained below, and similarities are omitted here.

In some embodiments of the present disclosure, the clock signal controlling terminals of the shifting register circuits may also adopt clock control signals independent of the first clock signals to increase signals of corresponding timings. Exemplarily, the display panel further includes a plurality of clock control lines, and different clock control signals are transmitted on the different clock control lines. Each shifting register circuit further has a clock signal controlling terminal. The driving method further includes: inputting a plurality of different first clock control signals into the clock signal controlling terminal of the gate driving circuit while inputting a plurality of different first clock signals into the gate driving circuit in the display panel.

Figure 19:
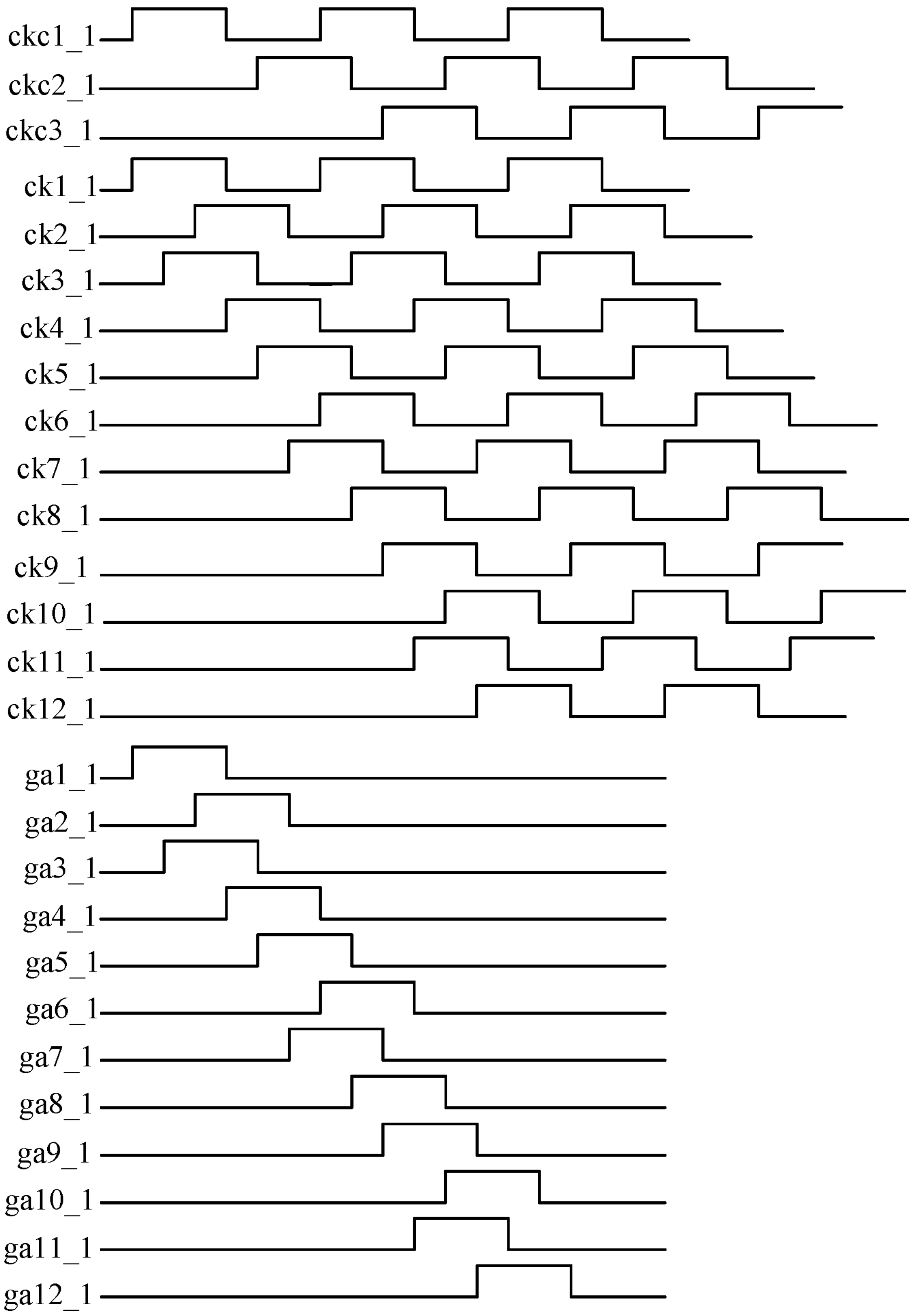
FIG. 19 is a diagram of yet some signal timings in an embodiment of the present disclosure.

Exemplarily, in every three adjacent gate line groups, the clock signal controlling terminal of the shifting register circuit corresponding to the first gate line group is coupled with the $1^{st}$ first clock control signal in the plurality of different first clock control signals, the clock signal controlling terminal of the shifting register circuit corresponding to the second gate line group is coupled with the $2^{nd}$ first clock control signal in the plurality of different first clock control signals, and the clock signal controlling terminal of the shifting register circuit corresponding to the third gate line group is coupled with the $3^{rd}$ first clock control signal in the plurality of different first clock control signals. The $1^{st}$ first clock control signal is the same as the $1^{st}$ first clock signal in the first clock signal group in timing, the $2^{nd}$ first clock control signal is the same as the $1^{st}$ first clock signal in the second clock signal group in timing, and the $3^{rd}$ first clock control signal is the same as the $1^{st}$ first clock signal in the third clock signal group in timing. For example, as shown in FIG. 18 and FIG. 19, the display panel may include three clock control lines CKC1-CKC3. The $1^{st}$ first clock control signal ckc1_1 is transmitted on the clock control line CKC1, the $2^{nd}$ first clock control signal ckc2_1 is transmitted on the clock control line CKC2, and the $3^{rd}$ first clock control signal ckc3_1 is transmitted on the clock control line CKC3. The $1^{st}$ first clock control signal ckc1_1 is the same as the first clock signal ck1_1 in timing, the $2^{nd}$ first clock control signal ckc2_1 is the same as the first clock signal ck5_1 in timing, and the $3^{rd}$ first clock control signal ckc3_1 is the same as the first clock signal ck9_1 in timing.

In some embodiments of the present disclosure, in the second driving mode, in every three adjacent shifting register circuits, the clock signal controlling terminal of the first shifting register circuit is coupled with the $1^{st}$ first clock control signal in the plurality of different clock control signals, the clock signal controlling terminal of the second shifting register circuit is coupled with the $2^{nd}$ first clock control signal in the plurality of different clock control signals, and the clock signal controlling terminal of the third shifting register circuit is coupled with the 3rd first clock control signal in the plurality of different clock control signals. For example, as shown in FIG. 18 and FIG. 19, the clock signal controlling terminals of the shifting register circuits SR1 and SR4 are coupled with the 1st first clock control signal ckc1_1, and the clock signal controlling terminals of the shifting register circuits SR1 and SR4 are coupled with the clock control line CKC1. The clock signal controlling terminals of the shifting register circuits SR2 and SR5 are coupled with the 2nd first clock control signal ckc2_1, and the clock signal controlling terminals of the shifting register circuits SR2 and SR5 are coupled with the clock control line CKC2. The clock signal controlling terminals of the shifting register circuits SR3 and SR6 are coupled with the 3rd first clock control signal ckc3_1, and the clock signal controlling terminals of the shifting register circuits SR3 and SR6 are coupled with the clock control line CKC3.

Exemplarily, as shown in FIG. 18, in every two adjacent shifting register circuits. GAO_C of the first shifting register circuit is coupled with the input signal terminal INP of the second shifting register circuit. In every three adjacent shifting register circuits, GAO_C of the third shifting register circuit is coupled with the reset signal terminal RST_PU of the first shifting register circuit.

Exemplarily, in the second driving mode, in combination with FIG. 17 to FIG. 19, the shifting register circuit SR1 may output the first high level of the first clock signal ck1_1 to the gate line GA1 to generate a high level in the signal ga1_1. The shifting register circuit SR1 may output the first high level of the first clock signal ck2_1 to the gate line GA2 to generate a high level in the signal ga2_1. The shifting register circuit SR1 may output the first high level of the first clock signal ck3_1 to the gate line GA3 to generate a high level in the signal ga3_1. The shifting register circuit SR1 may output the first high level of the first clock signal ck4_1 to the gate line GA4 to generate a high level in the signal ga4_1.

The shifting register circuit SR2 may output the first high level of the first clock signal ck5_1 to the gate line GA5 to generate a high level in the signal ga5_1. The shifting register circuit SR2 may output the first high level of the first clock signal ck6_1 to the gate line GA6 to generate a high level in the signal ga6_1. The shifting register circuit SR2 may output the first high level of the first clock signal ck7_1 to the gate line GA7 to generate a high level in the signal ga7_1. The shifting register circuit SR2 may output the first high level of the first clock signal ck8_1 to the gate line GA8 to generate a high level in the signal ga8_1.

The shifting register circuit SR3 may output the first high level of the first clock signal ck9_1 to the gate line GA9 to generate a high level in the signal ga9_1. The shifting register circuit SR3 may output the first high level of the first clock signal ck10_1 to the gate line GA10 to generate a high level in the signal ga10_1. The shifting register circuit SR3 may output the first high level of the first clock signal ck11_1 to the gate line GA11 to generate a high level in the signal ga11_1. The shifting register circuit SR3 may output the first high level of the first clock signal ck12_1 to the gate line GA12 to generate a high level in the signal ga12_1.

The shifting register circuit SR4 may output the second high level of the first clock signal ck1_1 to the gate line GA13 to generate a high level in the second gate scanning signal on the gate line GA13. The shifting register circuit SR4 may output the second high level of the first clock signal ck2_1 to the gate line GA14 to generate a high level in the second gate scanning signal on the gate line GA14. The shifting register circuit SR4 may output the second high level of the first clock signal ck3_1 to the gate line GA15 to generate a high level in the second gate scanning signal on the gate line GA15. The shifting register circuit SR4 may output the second high level of the first clock signal ck4_1 to the gate line GA16 to generate a high level in the second gate scanning signal on the gate line GA16.

The shifting register circuit SR5 may output the second high level of the first clock signal ck5_1 to the gate line GA17 to generate a high level in the second gate scanning signal on the gate line GA17. The shifting register circuit SR5 may output the second high level of the first clock signal ck6_1 to the gate line GA18 to generate a high level in the second gate scanning signal on the gate line GA18. The shifting register circuit SR5 may output the second high level of the first clock signal ck7_1 to the gate line GA19 to generate a high level in the second gate scanning signal on the gate line GA19. The shifting register circuit SR5 may output the second high level of the first clock signal ck8_1 to the gate line GA20 to generate a high level in the second gate scanning signal on the gate line GA20.

The shifting register circuit SR6 may output the second high level of the first clock signal ck9_1 to the gate line GA21 to generate a high level in the second gate scanning signal on the gate line GA21. The shifting register circuit SR6 may output the second high level of the first clock signal ck10_1 to the gate line GA22 to generate a high level in the second gate scanning signal on the gate line GA22. The shifting register circuit SR6 may output the second high level of the first clock signal ck11_1 to the gate line GA23 to generate a high level in the second gate scanning signal on the gate line GA23. The shifting register circuit SR6 may output the second high level of the first clock signal ck12_1 to the gate line GA24 to generate a high level in the second gate scanning signal on the gate line GA24.

Figure 20:
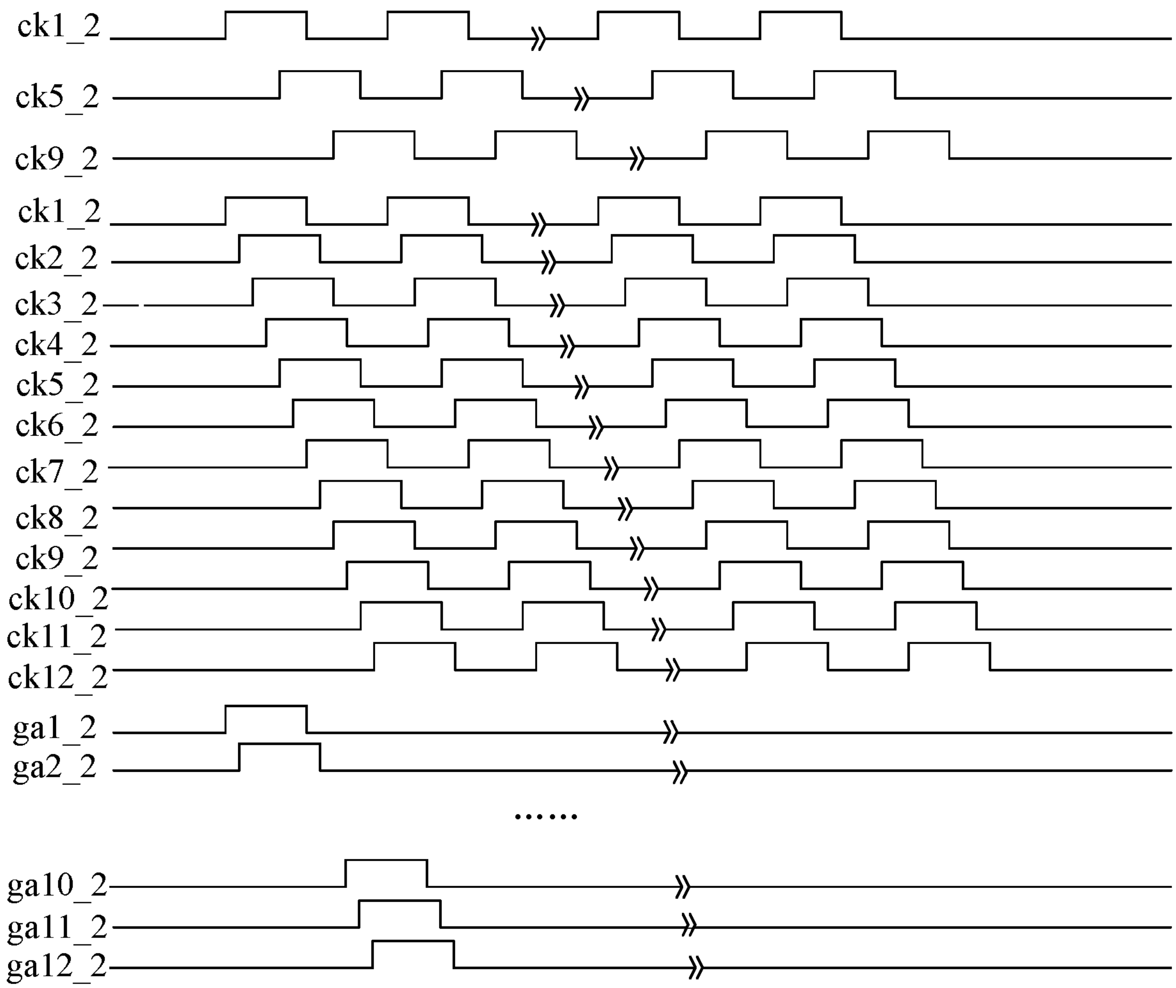
FIG. 20 is a diagram of yet some signal timings in an embodiment of the present disclosure.

In some embodiments of the present disclosure, the clock signal controlling terminals of the shifting register circuits may also adopt clock control signals independent of the first clock signals to increase signals of corresponding timings. Exemplarily, the display panel further includes a plurality of clock control lines, and different clock control signals are transmitted on the different clock control lines. For example, as shown in FIG. 18 and FIG. 20, the display panel may include three clock control lines CKC1-CKC3. The 1st second clock control signal ckc1_2 is transmitted on the clock control line CKC1, the 2nd second clock control signal ckc2_2 is transmitted on the clock control line CKC2, and the 3rd second clock control signal ckc3_2 is transmitted on the clock control line CKC3.

In some embodiments of the present disclosure, in the first driving mode, in every three adjacent shifting register circuits, the clock signal controlling terminal of the first shifting register circuit is coupled with the 1st second clock control signal in the plurality of different clock control signals, the clock signal controlling terminal of the second shifting register circuit is coupled with the 2nd second clock control signal in the plurality of different clock control signals, and the clock signal controlling terminal of the third shifting register circuit is coupled with the 3rd second clock control signal in the plurality of different clock control signals. For example, as shown in FIG. 18 and FIG. 20, the clock signal controlling terminals of the shifting register circuits SR1 and SR4 are coupled with the 1st second clock control signal ckc1_2, and the clock signal controlling terminals of the shifting register circuits SR1 and SR4 are coupled with the clock control line CKC1. The clock signal controlling terminals of the shifting register circuits SR2 and SR5 are coupled with the 2$^{nd}$ second clock control signal ckc2_2, and the clock signal controlling terminals of the shifting register circuits SR2 and SR5 are coupled with the clock control line CKC2. The clock signal controlling terminals of the shifting register circuits SR3 and SR6 are coupled with the 3$^{rd}$ second clock control signal ckc3_2, and the clock signal controlling terminals of the shifting register circuits SR3 and SR6 are coupled with the clock control line CKC3.

Exemplarily, in the first driving mode, in combination with FIG. 17, FIG. 18 and FIG. 20. the shifting register circuit SR1 may output the first high level of the second clock signal ck1_2 to the gate line GA1 to generate a high level in the signal ga1_2. The shifting register circuit SR1 may output the first high level of the second clock signal ck2_2 to the gate line GA2 to generate a high level in the signal ga2_2. The shifting register circuit SR1 may output the first high level of the second clock signal ck3_2 to the gate line GA3 to generate a high level in the signal ga3_2. The shifting register circuit SR1 may output the first high level of the second clock signal ck4_2 to the gate line GA4 to generate a high level in the signal ga4_2.

The shifting register circuit SR2 may output the first high level of the second clock signal ck5_2 to the gate line GA5 to generate a high level in the signal ga5_2. The shifting register circuit SR2 may output the first high level of the second clock signal ck6_2 to the gate line GA6 to generate a high level in the signal ga6_2. The shifting register circuit SR2 may output the first high level of the second clock signal ck7_2 to the gate line GA7 to generate a high level in the signal ga7_2. The shifting register circuit SR2 may output the first high level of the second clock signal ck8_2 to the gate line GA8 to generate a high level in the signal ga8_2.

The shifting register circuit SR3 may output the first high level of the second clock signal ck9_2 to the gate line GA9 to generate a high level in the signal ga9_2. The shifting register circuit SR3 may output the first high level of the second clock signal ck10_2 to the gate line GA10 to generate a high level in the signal ga10_2. The shifting register circuit SR3 may output the first high level of the second clock signal ck11_2 to the gate line GA11 to generate a high level in the signal ga11_2. The shifting register circuit SR3 may output the first high level of the second clock signal ck12_2 to the gate line GA12 to generate a high level in the signal ga12_2.

The shifting register circuit SR4 may output the second high level of the second clock signal ck1_2 to the gate line GA13 to generate a high level in the second gate scanning signal on the gate line GA13. The shifting register circuit SR4 may output the second high level of the second clock signal ck2_2 to the gate line GA14 to generate a high level in the second gate scanning signal on the gate line GA14. The shifting register circuit SR4 may output the second high level of the second clock signal ck3_2 to the gate line GA15 to generate a high level in the second gate scanning signal on the gate line GA15. The shifting register circuit SR4 may output the second high level of the second clock signal ck4_2 to the gate line GA16 to generate a high level in the second gate scanning signal on the gate line GA16.

The shifting register circuit SR5 may output the second high level of the second clock signal ck5_2 to the gate line GA17 to generate a high level in the second gate scanning signal on the gate line GA17. The shifting register circuit SR5 may output the second high level of the second clock signal ck6_2 to the gate line GA18 to generate a high level in the second gate scanning signal on the gate line GA18. The shifting register circuit SR5 may output the second high level of the second clock signal ck7_2 to the gate line GA19 to generate a high level in the second gate scanning signal on the gate line GA19. The shifting register circuit SR5 may output the second high level of the second clock signal ck8_2 to the gate line GA20 to generate a high level in the second gate scanning signal on the gate line GA20.

The shifting register circuit SR6 may output the second high level of the second clock signal ck9_2 to the gate line GA21 to generate a high level in the second gate scanning signal on the gate line GA21. The shifting register circuit SR6 may output the second high level of the second clock signal ck10_2 to the gate line GA22 to generate a high level in the second gate scanning signal on the gate line GA22. The shifting register circuit SR6 may output the second high level of the second clock signal ck11_2 to the gate line GA23 to generate a high level in the second gate scanning signal on the gate line GA23. The shifting register circuit SR6 may output the second high level of the second clock signal ck12_2 to the gate line GA24 to generate a high level in the second gate scanning signal on the gate line GA24.

An embodiment of the present disclosure further provides other implementations, and as shown in FIG. 18, transformation is performed on the implementations in the above embodiments. Only the difference between the present embodiment and the above embodiments is explained below, and similarities are omitted here.

In some embodiments of the present disclosure, one shifting register circuit may also be coupled with one gate line. A plurality of adjacent shifting register circuits are one circuit group. In every three adjacent circuit groups, clock signal output terminals of the shifting register circuits of the first circuit group are coupled with a first clock signal group in three clock signal groups. the clock signal output terminals of the shifting register circuits of the second circuit group are coupled with a second clock signal group in the three clock signal groups, and the clock signal output terminals of the shifting register circuits of the third circuit group are coupled with a third clock signal group in the three clock signal groups.

Figure 21:
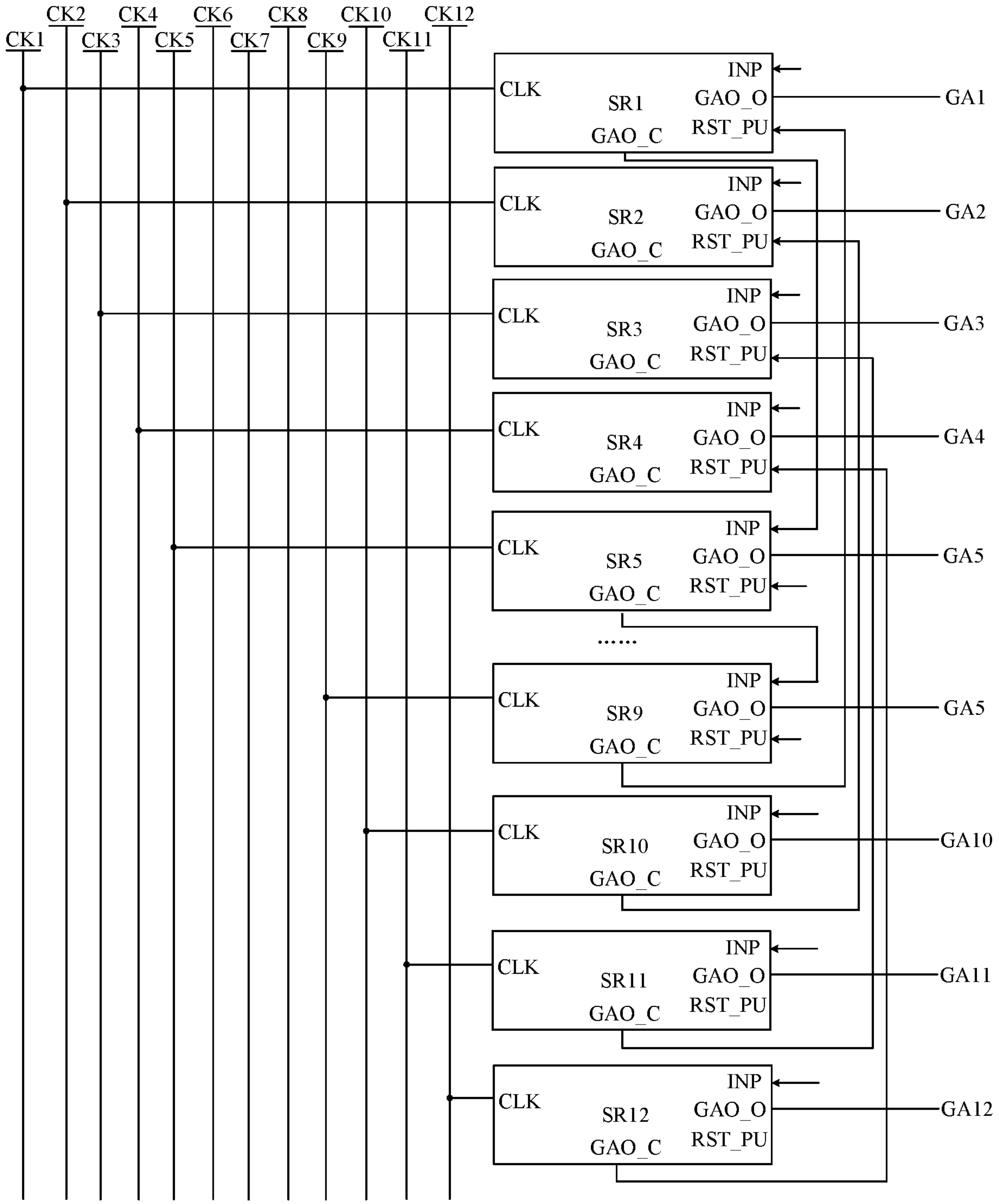
FIG. 21 is a schematic diagram of yet some structures of a gate driving circuit in an embodiment of the present disclosure.

Exemplarily, as shown in FIG. 21, in every five adjacent shifting register circuits. GAO_C of the first shifting register circuit is coupled with an input signal terminal INP of the fifth shifting register circuit. In every nine adjacent shifting register circuits. GAO_C of the ninth shifting register circuit is coupled with a reset signal terminal RST_PU of the first shifting register circuit.

Exemplarily, as shown in FIG. 21 and FIG. 14, each shifting register circuit is coupled with one gate line. Four adjacent shifting register circuits may be one circuit group, that is, the shifting register circuits SR1-SR4 are one circuit group, the shifting register circuits SR5-SR8 are one circuit group, and the shifting register circuits SR9-SR12 are one circuit group. When the first driving mode is adopted, the clock signal output terminal CLK of the shifting register circuit SR1 is coupled with the first clock signal ck1_1 in the first clock signal group, that is, the clock signal output terminal CLK of the shifting register circuit SR1 is coupled with the clock signal line CK1. The clock signal output terminal CLK of the shifting register circuit SR2 is coupled with the first clock signal ck2_1 in the first clock signal group, that is, the clock signal output terminal CLK of the shifting register circuit SR2 is coupled with the clock signal line CK2. The clock signal output terminal CLK of the shifting register circuit SR3 is coupled with the first clock signal ck3_1 in the first clock signal group, that is, the clock signal output terminal CLK of the shifting register circuit SR3 is coupled with the clock signal line CK3. The clock signal output terminal CLK of the shifting register circuit SR4 is coupled with the first clock signal ck4_1 in the first clock signal group, that is, the clock signal output terminal CLK of the shifting register circuit SR4 is coupled with the clock signal line CK4. The clock signal output terminal CLK of the shifting register circuit SR5 is coupled with the first clock signal ck5_1 in the second clock signal group, that is, the clock signal output terminal CLK of the shifting register circuit SR5 is coupled with the clock signal line CK5. The clock signal output terminal CLK of the shifting register circuit SR6 is coupled with the first clock signal ck6_1 in the second clock signal group. that is, the clock signal output terminal CLK of the shifting register circuit SR6 is coupled with the clock signal line CK6. The clock signal output terminal CLK of the shifting register circuit SR7 is coupled with the first clock signal ck7_1 in the second clock signal group, that is, the clock signal output terminal CLK of the shifting register circuit SR7 is coupled with the clock signal line CK7. The clock signal output terminal CLK of the shifting register circuit SR8 is coupled with the first clock signal ck8_1 in the second clock signal group, that is, the clock signal output terminal CLK of the shifting register circuit SR8 is coupled with the clock signal line CK8. The clock signal output terminal CLK of the shifting register circuit SR9 is coupled with the first clock signal ck9_1 in the third clock signal group, that is, the clock signal output terminal CLK of the shifting register circuit SR9 is coupled with the clock signal line CK9. The clock signal output terminal CLK of the shifting register circuit SR10 is coupled with the first clock signal ck10_1 in the third clock signal group, that is, the clock signal output terminal CLK of the shifting register circuit SR10 is coupled with the clock signal line CK10. The clock signal output terminal CLK of the shifting register circuit SR10 is coupled with the first clock signal ck11_1 in the third clock signal group, that is, the clock signal output terminal CLK of the shifting register circuit SR11 is coupled with the clock signal line CK11. The clock signal output terminal CLK of the shifting register circuit SR12 is coupled with the first clock signal ck12_1 in the third clock signal group. that is, the clock signal output terminal CLK of the shifting register circuit SR12 is coupled with the clock signal line CK12.

Exemplarily as shown in FIG. 21 and FIG. 4, each shifting register circuit is coupled with one gate line. Four adjacent shifting register circuits may be one circuit group, that is, the shifting register circuits SR1-SR4 are one circuit group, the shifting register circuits SR5-SR8 are one circuit group, and the shifting register circuits SR9-SR12 are one circuit group. When the second driving mode is adopted, the clock signal output terminal CLK of the shifting register circuit SR1 is coupled with the second clock signal ck1_2, that is, the clock signal output terminal CLK of the shifting register circuit SR1 is coupled with the clock signal line CK1. The clock signal output terminal CLK of the shifting register circuit SR2 is coupled with the second clock signal ck2_2. that is, the clock signal output terminal CLK of the shifting register circuit SR2 is coupled with the clock signal line CK2. The clock signal output terminal CLK of the shifting register circuit SR3 is coupled with the second clock signal ck3_2, that is, the clock signal output terminal CLK of the shifting register circuit SR3 is coupled with the clock signal line CK3. The clock signal output terminal CLK of the shifting register circuit SR4 is coupled with the second clock signal ck4_2, that is, the clock signal output terminal CLK of the shifting register circuit SR4 is coupled with the clock signal line CK4. The clock signal output terminal CLK of the shifting register circuit SR5 is coupled with the second clock signal ck5_2, that is, the clock signal output terminal CLK of the shifting register circuit SR5 is coupled with the clock signal line CK5. The clock signal output terminal CLK of the shifting register circuit SR6 is coupled with the second clock signal ck6_2, that is, the clock signal output terminal CLK of the shifting register circuit SR6 is coupled with the clock signal line CK6. The clock signal output terminal CLK of the shifting register circuit SR7 is coupled with the second clock signal ck7_2, that is, the clock signal output terminal CLK of the shifting register circuit SR7 is coupled with the clock signal line CK7. The clock signal output terminal CLK of the shifting register circuit SR8 is coupled with the second clock signal ck8_2, that is, the clock signal output terminal CLK of the shifting register circuit SR8 is coupled with the clock signal line CK8. The clock signal output terminal CLK of the shifting register circuit SR9 is coupled with the second clock signal ck9_2, that is, the clock signal output terminal CLK of the shifting register circuit SR9 is coupled with the clock signal line CK9. The clock signal output terminal CLK of the shifting register circuit SR10 is coupled with the second clock signal ck10_2, that is, the clock signal output terminal CLK of the shifting register circuit SR10 is coupled with the clock signal line CK10. The clock signal output terminal CLK of the shifting register circuit SR11 is coupled with the second clock signal ck11_2, that is, the clock signal output terminal CLK of the shifting register circuit SR11 is coupled with the clock signal line CK11. The clock signal output terminal CLK of the shifting register circuit SR12 is coupled with the second clock signal ck12_2, that is, the clock signal output terminal CLK of the shifting register circuit SR12 is coupled with the clock signal line CK12.

Figure 22:
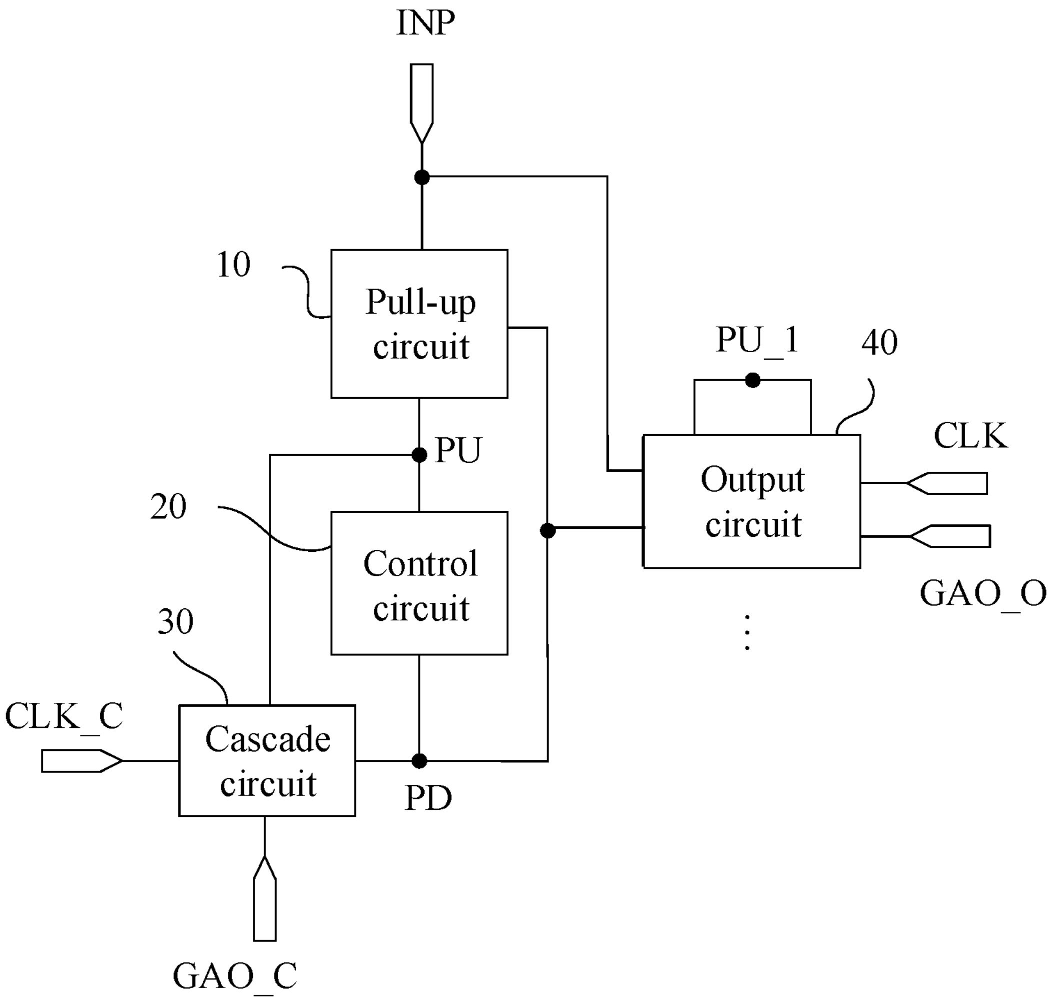
FIG. 22 is a schematic diagram of yet some structures of a shifting register circuit in an embodiment of the present disclosure.

In some embodiments of the present disclosure, as shown in FIG. 22, each shifting register circuit may include: a pull-up circuit 10, a control circuit 20, a cascade circuit 30 and an output circuits 40.

The pull-up circuit 10 is connected to the input signal terminal INP, a master pull-up node PU and a pull-down node PD of the shifting register circuit, and the pull-up circuit 10 is configured to provide a signal of the input signal terminal INP to the master pull-up node PU and pull-down. under the control of a potential of the pull-down node PD, a potential of the master pull-up node PU.

The control circuit 20 is connected to the master pull-up node PU and the pull-down node PD, and the control circuit 20 is configured to control the potential of the pull-down node PD according to the potential of the master pull-up node PU.

The cascade circuit 30 is connected to the master pull-up node PU, the pull-down node PD and GAO_C and the clock signal controlling terminal CLK_C of the shifting register circuit. and the cascade circuit 30 is configured to provide a signal of the clock signal controlling terminal CLK_C to GAO_C under the control of the potential of the master pull-up node PU and pull-down the potential of GAO_C under the control of the potential of the pull-down node PD.

The output circuit 40 is connected to the input signal terminal INP, the pull-down node PD as well as the clock signal output terminal CLK, the sub-pull-up node PU_1 and the output signal terminal GAO_O of the shifting register circuit. The output circuit 40 is connected to the input signal terminal INP, the pull-down node PD, the output signal terminal GAO_O and the sub-pull-up node PU_1, and the output circuit 40 is configured to input a signal of the input signal terminal INP to the sub-pull-up node PU_1, provide a signal of the clock signal output terminal CLK to the output signal terminal GAO_O under the control of a potential of the sub-pull-up node PU_1 and pull-down a potential of the output signal terminal GAO_O under the control of a potential of the pull-down node PD.

Figure 23:
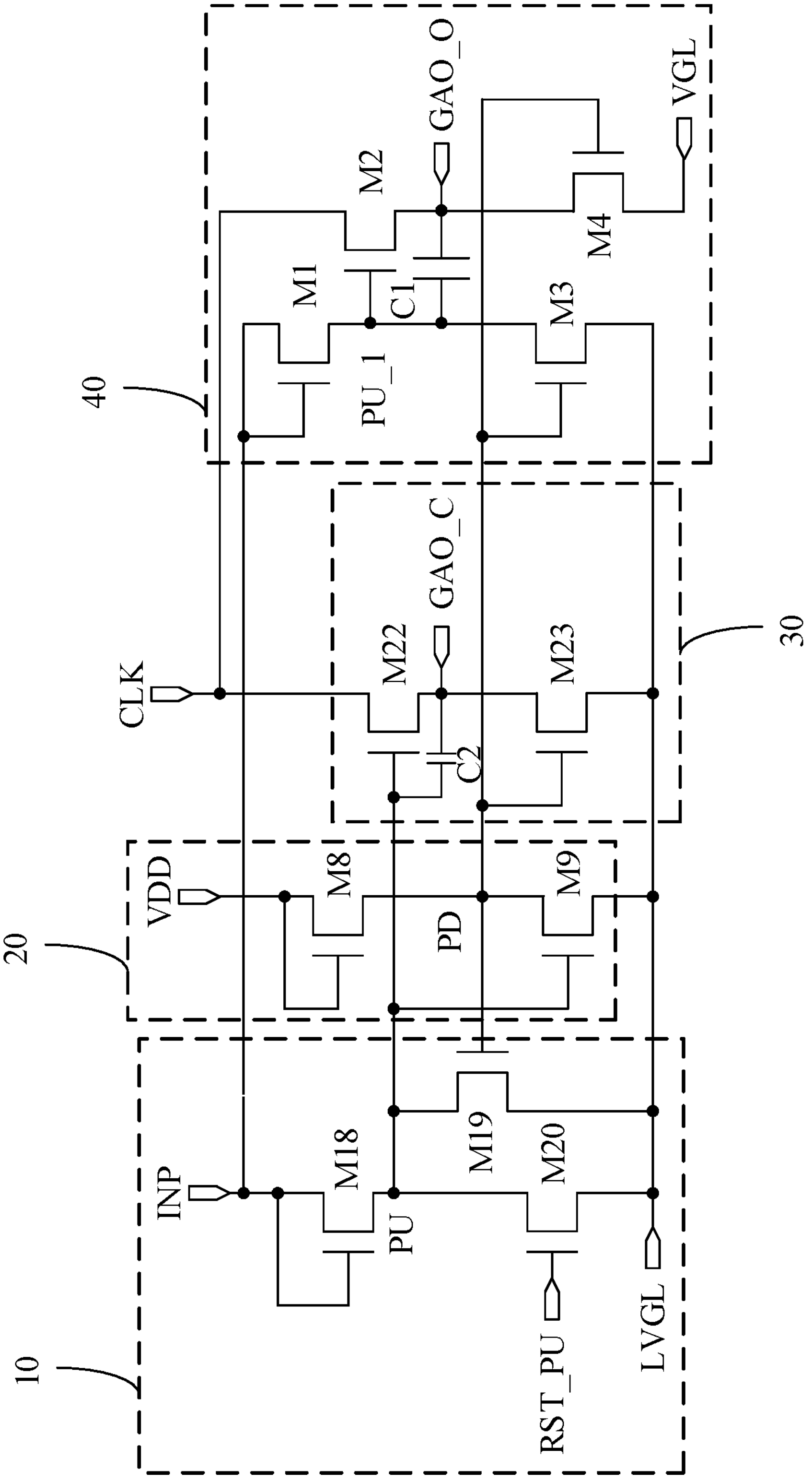
FIG. 23 is a schematic diagram of vet some specific structures of a shifting register circuit in an embodiment of the present disclosure.

In some embodiments of the present disclosure, as shown in FIG. 23, the pull-up circuit 10 includes an eighteenth transistor M18, a nineteenth transistor M19 and a twentieth transistor M20. A gate and a first electrode of the eighteenth transistor M18 are connected to the input signal terminal INP, and a second electrode of the eighteenth transistor M18 is connected to the master pull-up node PU. A gate of the nineteenth transistor M19 is connected to the pull-down node, a first electrode of the nineteenth transistor M19 is connected to a reference signal terminal (e.g. a first reference signal terminal LVGL) of the shifting register circuit, and a second electrode of the nineteenth transistor M19 is connected to the master pull-up node PU. A gate of the twentieth transistor M20 is connected to the reset signal terminal RST_PU of the shifting register circuit, a first electrode of the twentieth transistor M20 is connected to the reference signal terminal (e.g. the first reference signal terminal LVGL), and a second electrode of the twentieth transistor M20 is connected to the master pull-up node PU.

In some embodiments of the present disclosure, as shown in FIG. 23, the control circuit 20) may include an eighth transistor M8 and a ninth transistor M9. A gate and a first electrode of the eighth transistor M8 are connected to a power signal terminal VDD of the shifting register circuit, and a second electrode of the eighth transistor M8 is connected to the pull-down node PD. A gate of the ninth transistor M9 is connected to the master pull-up node PU, a first electrode of the ninth transistor M9 is connected to the reference signal terminal (e.g. the first reference signal terminal LVGL) of the shifting register circuit, and a second electrode of the ninth transistor M9 is connected to the pull-down node PD.

In some embodiments of the present disclosure, as shown in FIG. 23, the cascade circuit 30 may include a twenty-second transistor M22, a twenty-third transistor M23 and a second capacitor C2. A gate of the twenty-second transistor M22 is connected to the master pull-up node PU, a first electrode of the twenty-second transistor M22 is connected to the clock signal controlling terminal CLK_C, and a second electrode of the twenty-second transistor M22 is connected to GAO_C. A gate of the twenty-third transistor M23 is connected to the pull-down node PD, a first electrode of the twenty-third transistor M23 is connected to the reference signal terminal (e.g. the first reference signal terminal LVGL) of the shifting register circuit, and a second electrode of the twenty-third transistor M23 is connected to GAO_C. A first terminal of the second capacitor C2 is connected to the gate of the twenty-second transistor M22, and a second terminal of the second capacitor C2 is connected to GAO_C.

In some embodiments of the present disclosure, as shown in FIG. 23, the output circuit 40 may include a first transistor M1, a second transistor M2, a third transistor M3, a fourth transistor M4 and a first capacitor C1. A gate of the first transistor M1 and a first electrode of the first transistor M1 are connected to the input signal terminal INP, and a second electrode of the first transistor M1 is connected to the sub-pull-up node PU_1. A gate of the second transistor M2 is connected to the sub-pull-up node PU_1, a first electrode of the second transistor M2 is connected to the clock signal output terminal CLK_1, and a second electrode of the second transistor M2 is connected to the output signal terminal GAO. A gate of the third transistor M3 is connected to the pull-down node PD, a first electrode of the third transistor M3 is connected to the reference signal terminal (e.g. the first reference signal terminal LVGL) of the shifting register circuit, and a second electrode of the third transistor M3 is connected to the sub-pull-up node PU_1. A gate of the fourth transistor M4 is connected to the pull-down node PD, a first electrode of the fourth transistor M4 is connected to the reference signal terminal (e.g. a second reference signal terminal VGL) of the shifting register circuit, and a second electrode of the fourth transistor M4 is connected to the output signal terminal GAO. A first terminal of the first capacitor C1 is connected to the sub-pull-up node PU_1, and a second terminal of the first capacitor C1 is connected to the output signal terminal GAO.

In combination with FIG. 14, FIG. 21 and FIG. 23, when a signal timing shown in FIG. 14 is input to the gate driving circuit, the output signal terminal GAO of the shifting register circuit SR1 may output the signal ga1_1. The output signal terminal GAO of the shifting register circuit SR2 may output the signal ga2_1. The output signal terminal GAO of the shifting register circuit SR3 may output the signal ga3_1. . . . The output signal terminal GAO of the shifting register circuit SR9 may output the signal ga9_1. The output signal terminal GAO of the shifting register circuit SR10 may output the signal ga10_1. The output signal terminal GAO of the shifting register circuit SR11 may output the signal ga11_1. The output signal terminal GAO of the shifting register circuit SR12 may output the signal ga12_1. The remaining is in the same way, which is not repeated here.

In combination with FIG. 4, FIG. 21 and FIG. 23, when a signal timing shown in FIG. 4 is input to the gate driving circuit, the output signal terminal GAO of the shifting register circuit SR1 may output the signal ga1_2. The output signal terminal GAO of the shifting register circuit SR2 may output the signal ga2_2. The output signal terminal GAO of the shifting register circuit SR3 may output the signal ga3_2. . . . The output signal terminal GAO of the shifting register circuit SR9 may output the signal ga9_2. The output signal terminal GAO of the shifting register circuit SR10 may output the signal ga10_2. The output signal terminal GAO of the shifting register circuit SR11 may output the signal ga11_2. The output signal terminal GAO of the shifting register circuit SR12 may output the signal ga12_2. The remaining is in the same way, which is not repeated here.

In the embodiment of the present disclosure, through combination with the shifting register circuits, the gate driving circuit may implement working processes corresponding to the signal sequence diagram shown in FIG. 4 and FIG. 14, and the specific process is not repeated here. Of course, in practical applications, shifting register circuits of other structures may also be adopted to implement the working processes corresponding to the signal sequence diagram shown in FIG. 4 and FIG. 14, which is not limited here.

Those skilled in the art will appreciate that the embodiments of the present disclosure may be provided as methods, systems, or computer program products. Therefore, the present disclosure may take the form of a full hardware embodiment, a full software embodiment, or an embodiment combining software and hardware. Besides, the present disclosure may adopt the form of a computer program product implemented on one or more computer available storage media (including, but not limited to, a disk memory, a CD-ROM, an optical memory and the like) containing computer available program codes.

The present disclosure is described with reference to the flow diagrams and/or block diagrams of the method, device (system), and computer program product according to the embodiments of the present disclosure. It should be understood that each flow and/or block in the flow diagram and/or block diagram and the combination of flows and/or blocks in the flow diagram and/or block diagram can be implemented by computer program instructions. These computer program instructions can be provided to processors of a general-purpose computer, a special-purpose computer, an embedded processor or other programmable data processing devices to generate a machine, so that instructions executed by processors of a computer or other programmable data processing devices generate an apparatus for implementing the functions specified in one or more flows of the flow diagram and/or one or more blocks of the block diagram.

These computer program instructions can also be stored in a computer-readable memory capable of guiding a computer or other programmable data processing devices to work in a specific manner, so that instructions stored in the computer-readable memory generate a manufacturing product including an instruction apparatus, and the instruction apparatus implements the functions specified in one or more flows of the flow diagram and/or one or more blocks of the block diagram.

These computer program instructions can also be loaded on a computer or other programmable data processing devices, so that a series of operation steps are executed on the computer or other programmable devices to generate computer-implemented processing, and thus, the instructions executed on the computer or other programmable devices provide steps for implementing the functions specified in one or more flows of the flow diagram and/or one or more blocks of the block diagram.

Although the preferred embodiments of the present disclosure have been described, those skilled in the art can make additional changes and modifications on these embodiments once they know the basic creative concept. So the appended claims are intended to be construed to include the preferred embodiments and all changes and modifications that fall into the scope of the present disclosure.

Apparently, those skilled in the art can make various modifications and variations to the embodiments of the present disclosure without departing from the spirit and scope of the embodiments of the present disclosure. In this way, under the condition that these modifications and variations to the embodiments of the present disclosure fall within the scope of the claims of the present disclosure and their equivalent technologies, the present disclosure is also intended to include these modifications and variations.

What is claimed is:

1. A driving method for a display panel, comprising:

obtaining original display data of a current display frame; and loading first gate scanning signals to gate lines in the display panel in a condition that it is determined to adopt a first driving mode, and loading a data voltage to data lines in the display panel according to target display data obtained by removing a part of data from the original display data, so as to charge each sub-pixel in the display panel with the data voltage; wherein the display panel comprises a plurality of gate lines, for at least one gate line of the plurality of gate lines, an effective pulse of a first gate scanning signal loaded to the gate line is provided with a first overlapping duration with an effective pulse of a first gate scanning signal loaded to a previous gate line adjacent to the gate line, the effective pulse of the first gate scanning signal loaded to the gate line is provided with a second overlapping duration with an effective pulse of a first gate scanning signal loaded to a next gate line adjacent to the gate line, and the first overlapping duration is different from the second overlapping duration;

wherein the display panel comprises a plurality of sub-pixel rows; the plurality of sub-pixel rows are divided into a plurality of sub-pixel row groups, and each of the sub-pixel row groups comprises sub-pixel rows spaced by N sub-pixel rows; N is an integer greater than 0; and the target display data comprises display data corresponding to sub-pixels in one sub-pixel row group.

2. The driving method for the display panel according to claim 1, wherein for a $2k^{th}$ gate line, the first overlapping duration corresponding to the $2k^{th}$ gate line is less than the second overlapping duration corresponding to the $2k^{th}$ gate line; wherein k is an integer greater than 0.

3. The driving method for the display panel according to claim 2, wherein first overlapping durations corresponding to gate lines of $\mathbf{2}k$ numbers are the same; and/or, second overlapping durations corresponding to gate lines of $\mathbf{2}k$ numbers are the same.

4. The driving method for the display panel according to claim 3, wherein the second overlapping duration corresponding to the $2k^{th}$ gate line is an even multiple of the first overlapping duration corresponding to the $2k^{th}$ gate line.

5. The driving method for the display panel according to claim 1, wherein for a $(2m+1)^{th}$ gate line, the first overlapping duration corresponding to the (2m+1) th gate line is greater than the second overlapping duration; wherein m is an integer greater than 0.

6. The driving method for the display panel according to claim 5, wherein first overlapping durations corresponding to gate lines of (2m+1) numbers are the same; and/or, second overlapping durations corresponding to gate lines of (2m+1) numbers the same.

7. The driving method for the display panel according to claim 1, wherein the display panel comprises a plurality of gate lines, at least four gate lines in the plurality of gate lines are one gate line group, and starting time points of effective pulses of first gate scanning signals loaded to gate lines in each gate line group sequentially occur according to an order of a first gate line, a third gate line, a second gate line and a fourth gate line in the gate line group.

8. The driving method for the display panel according to claim 1, wherein N=1, and the plurality of sub-pixel row groups comprise a first sub-pixel row group and a second sub-pixel row group; the first sub-pixel row group comprises the sub-pixel rows of odd numbers, and the second sub-pixel row group comprises the sub-pixel rows of even numbers;

the current display frame is an $(\text{odd number})^{th}$ display frame in a plurality of consecutive display frames, and the target display data comprises display data corresponding to sub-pixels in the first sub-pixel row group or the second sub-pixel row group; and/or, the current display frame is an $(\text{even number})^{th}$ display frame in the plurality of consecutive display frames, and the target display data comprises display data corresponding to sub-pixels in the first sub-pixel row group or the second sub-pixel row group.

9. The driving method for the display panel according to claim 8, wherein every two adjacent sub-pixels in the same column share one data voltage.

10. The driving method for the display panel according to claim 7, wherein the loading first gate scanning signals to gate lines in the display panel comprises:

inputting a plurality of different first clock signals to a gate driving circuit in the display panel to load effective pulses in the first clock signals as the effective pulses of the first gate scanning signals to the gate lines.

11. The driving method for the display panel according to claim 10, wherein the gate driving circuit comprises a plurality of shifting register circuits; the shifting register circuits are provided with clock signal output terminals; and the plurality of different first clock signals are divided into three clock signal groups; and in three adjacent gate line groups, a clock signal output terminal of a shifting register circuit corresponding to a first gate line group is coupled with a first clock signal group in the three clock signal groups, a clock signal output terminal of a shifting register circuit corresponding to a second gate line group is coupled with a second clock signal group in the three clock signal groups, and a clock signal output terminal of a shifting register circuit corresponding to a third gate line group is coupled with a third clock signal group in the three clock signal groups.

12. The driving method for the display panel according to claim 11, wherein the plurality of different first clock signals comprise 12 first clock signals; the 12 first clock signals are divided into the three clock signal groups, and in each clock signal group, an effective pulse of each of first clock signals sequentially occurs according to an order of a $1^{st}$ first clock signal, a $3^{rd}$ first clock signal, a $2^{nd}$ first clock signal and a 4th first clock signal in the clock signal group; and a starting time point of an effective pulse of a $4^{th}$ first clock signal in the first clock signal group is earlier than a starting time point of an effective pulse of a $1^{st}$ first clock signal in the second clock signal group; and a starting time point of an effective pulse of a $4^{th}$ first clock signal in the second clock signal group is earlier than a starting time point of an effective pulse of a $1^{st}$ first clock signal in the third clock signal group.

13. The driving method for the display panel according to claim 12, wherein in the same clock signal group, the $1^{st}$ first clock signal and the $4^{th}$ first clock signal are opposite in phase.

14. The driving method for the display panel according to claim 12, wherein each shifting register circuit is further provided with a clock signal controlling terminal; and in three adjacent gate line groups, a clock signal controlling terminal of the shifting register circuit corresponding to the first gate line group is coupled with a $1^{st}$ first clock signal in the first clock signal group, a clock signal controlling terminal of the shifting register circuit corresponding to the second gate line group is coupled with the $1^{st}$ first clock signal in the second clock signal group, and a clock signal controlling terminal of the shifting register circuit corresponding to the third gate line group is coupled with the $1^{st}$ first clock signal in the third clock signal group.

15. The driving method for the display panel according to claim 12, wherein each shifting register circuit further is further provided with a clock signal controlling terminal; and the driving method further comprises:

inputting a plurality of different first clock control signals into clock signal controlling terminals of the gate driving circuit while inputting a plurality of different first clock signals into the gate driving circuit in the display panel.

16. The driving method for the display panel according to claim 15, wherein in three adjacent gate line groups, a clock signal controlling terminal of the shifting register circuit corresponding to the first gate line group is coupled with a $1^{st}$ first clock control signal in the plurality of different first clock control signals, a clock signal controlling terminal of the shifting register circuit corresponding to the second gate line group is coupled with a $2^{nd}$ first clock control signal in the plurality of different first clock control signals, and a clock signal controlling terminal of the shifting register circuit corresponding to the third gate line group is coupled with a $3^{rd}$ first clock control signal in the plurality of different first clock control signals; and the $1^{st}$ first clock control signal is the same as a $1^{st}$ first clock signal in the first clock signal group in timing, the $2^{nd}$ first clock control signal is the same as the $1^{st}$ first clock signal in the second clock signal group in timing, and the $3^{rd}$ first clock control signal is the same as the $1^{st}$ first clock signal in the third clock signal group in timing.

17. The driving method for the display panel according to claim 1, further comprising:

loading second gate scanning signals to the gate lines in the display panel in a condition that it is determined to adopt a second driving mode, and loading a data voltage to the data lines directly according to the original display data to charge each sub-pixel in the display panel with the data voltage; wherein starting time points of effective pulses of second gate scanning signals loaded to every two adjacent gate lines are provided with the same difference.

18. A display apparatus, comprising:

a display panel; and a controller, configured to: obtain original display data of a current display frame; and load, in a condition that it is determined to adopt a first driving mode, first gate scanning signals to gate lines in the display panel, and load a data voltage to data lines in the display panel according to target display data obtained by removing a part of data from the original display data, so as to charge each sub-pixel in the display panel with the data voltage; wherein the display panel comprises a plurality of gate lines, for at least one gate line of the plurality of gate lines, an effective pulse of a first gate scanning signal loaded to the gate line is provided with a first overlapping duration with an effective pulse of a first gate scanning signal loaded to a previous gate line adjacent to the gate line, the effective pulse of the first gate scanning signal loaded to the gate line is provided with a second overlapping duration with an effective pulse of a first gate scanning signal loaded to a next gate line adjacent to the gate line, and the first overlapping duration is different from the second overlapping duration;

wherein the display panel comprises a plurality of sub-pixel rows; the plurality of sub-pixel rows are divided into a plurality of sub-pixel row groups, and each of the sub-pixel row groups comprises sub-pixel rows spaced by N sub-pixel rows; N is an integer greater than 0; and the target display data comprises display data corresponding to sub-pixels in one sub-pixel row group.

19. The display apparatus according to claim 18, wherein the controller comprises: a system controller and a timing controller;

the system controller is configured to: obtain the original display data of the current display frame; and send, in the condition that it is determined to adopt the first driving mode, the target display data obtained by removing a part of data from the original display data to the timing controller;

the timing controller is configured to send the received target display data to a source driving circuit; and the source driving circuit is configured to load the data voltage to the data lines in the display panel according to the received target display data;

or, the system controller is configured to: obtain the original display data of the current display frame; and send the original display data to the timing controller;

the timing controller is configured to send, in the condition that it is determined to adopt the first driving mode, the target display data obtained by removing a part of data from the original display data to a source driving circuit; and the source driving circuit is configured to load the data voltage to the data lines in the display panel according to the received target display data;

or, the system controller is configured to obtain the original display data of the current display frame; and send the original display data to the timing controller;

the timing controller is configured to send the received original display data to a source driving circuit; and the source driving circuit is configured to load, in the condition that it is determined to adopt the first driving mode, the data voltage to the data lines in the display panel according to the target display data obtained by removing a part of data from the original display data.

20. The display apparatus according to claim 18, wherein the display panel further comprises: a gate driving circuit receiving a plurality of different first clock signals;

the plurality of different first clock signals are divided into three clock signal groups;

the gate driving circuit comprises a plurality of shifting register circuits; wherein one shifting register circuit is coupled with a plurality of adjacent gate lines; and in every three adjacent shifting register circuits, a clock signal output terminal of a first shifting register circuit is coupled with a first clock signal group in the three clock signal groups, a clock signal output terminal of a second shifting register circuit is coupled with a second clock signal group in the three clock signal groups, and a clock signal output terminal of a third shifting register circuit is coupled with a third clock signal group in the three clock signal groups;

in every three adjacent shifting register circuits, a clock signal controlling terminal of the first shifting register circuit is coupled with a $1^{st}$ first clock signal in the first clock signal group, a clock signal controlling terminal of the second shifting register circuit is coupled with a $1^{st}$ first clock signal in the second clock signal group, and a clock signal controlling terminal of the third shifting register circuit is coupled with a $1^{st}$ first clock signal in the third clock signal group.

* * * * *